(12) United States Patent
Yoshida et al.

(10) Patent No.: US 6,463,132 B1
(45) Date of Patent: *Oct. 8, 2002

(54) COMMUNICATION SYSTEM HAVING THE CAPABILITY OF SELECTING AN OPTIMUM COMMUNICATION MODE FROM A PLURALITY OF MODES, DEPENDING ON THE TYPE OF EQUIPMENT AT A PARTY TO BE COMMUNICATED WITH

(75) Inventors: Takehiro Yoshida, Tokyo; Sadasuke Kurahayashi, Niiza; Naoji Hayakawa, Tokyo; Toshio Kenmochi, Yokohama; Shigeki Ohno, Tokyo; Yoshio Yoshiura, Ninomiya-machi; Kazutaka Matsueda, Yokohama; Motoaki Yoshino, Fujisawa; Fumiyuki Takiguchi, Yokohama; Kazuto Yanagisawa, Toride; Hideki Shimizu, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/426,972

(22) Filed: Apr. 24, 1995

(30) Foreign Application Priority Data

Apr. 27, 1994 (JP) .............................. 6-112232
Apr. 27, 1994 (JP) .............................. 6-112233
Apr. 28, 1994 (JP) .............................. 6-114130

(51) Int. Cl.$^7$ .......................... H04M 1/64; H04M 11/80
(52) U.S. Cl. .................... 379/93.09; 379/67.1; 379/82; 379/93.01; 379/100.01; 379/100.15; 379/201.01
(58) Field of Search .................. 379/67, 88, 89, 379/96, 97, 98, 99, 93.01, 100.01, 67.1, 88.13, 88.17, 92.01, 93.08, 93.09, 93.23, 100.05, 201, 70, 79, 82, 88.08, 93.28, 93.33, 100.15, 201.01; 370/14, 31, 32, 276–282, 296, 202; 375/222, 231; 358/432, 434, 435

(56) References Cited

U.S. PATENT DOCUMENTS

| | | | | |
|---|---|---|---|---|
| 4,734,780 A | * | 3/1988 | Iwata et al. ................ 358/257 |
| 4,814,894 A | | 3/1989 | Yoshida ...................... 358/298 |
| 4,897,831 A | | 1/1990 | Negi et al. .................. 370/249 |
| 4,905,282 A | * | 2/1990 | McGlynn et al. ............. 380/48 |
| 4,910,610 A | | 3/1990 | Utsugi ........................ 388/435 |
| 4,931,250 A | * | 6/1990 | Greszczuk .................... 375/8 |
| 4,970,603 A | * | 11/1990 | Kanai ......................... 358/400 |
| 4,974,097 A | * | 11/1990 | Kaneko et al. ............. 358/400 |
| 5,075,783 A | | 12/1991 | Yoshida et al. ............. 358/439 |
| 5,142,568 A | * | 8/1992 | Ogata et al. ................ 379/100 |
| 5,182,762 A | * | 1/1993 | Shirai et al. ................ 375/122 |
| 5,208,681 A | | 5/1993 | Yoshida ...................... 358/404 |
| 5,220,439 A | * | 6/1993 | Yoshida ...................... 358/404 |
| 5,438,436 A | * | 8/1995 | Harris ......................... 358/500 |
| 5,493,609 A | * | 2/1996 | Winseck, Jr. et al. ......... 379/96 |
| 5,544,234 A | * | 8/1996 | Terajima et al. ............. 379/100 |
| 5,550,881 A | * | 8/1996 | Sridhar et al. .............. 375/377 |
| 5,553,609 A | * | 9/1996 | Chen et al. ................. 128/630 |
| 5,696,598 A | | 12/1997 | Yoshida et al. ............. 358/434 |
| 5,721,731 A | * | 2/1998 | Yoshida ...................... 370/296 |
| 5,982,504 A | | 11/1999 | Yoshida ...................... 358/402 |

* cited by examiner

Primary Examiner—Allan Hoosain
(74) Attorney, Agent, or Firm—Fitzpatrick, Cella, Harper & Scinto

(57) ABSTRACT

A communication system in which when an incoming call has arrived, a communication line having the capability of a high sampling rate is automatically selected without assistance of an exchange operator by transmitting an ultra high speed modem indication signal indicating the capability of data communication at an ultra high speed modem rate among the capabilities of a called terminal, and receiving an ultra high speed modem capability signal indicating the capability of an ultra high speed modem of a calling terminal.

38 Claims, 30 Drawing Sheets

FAX/TEL AUTOMATIC SELECTION MODE

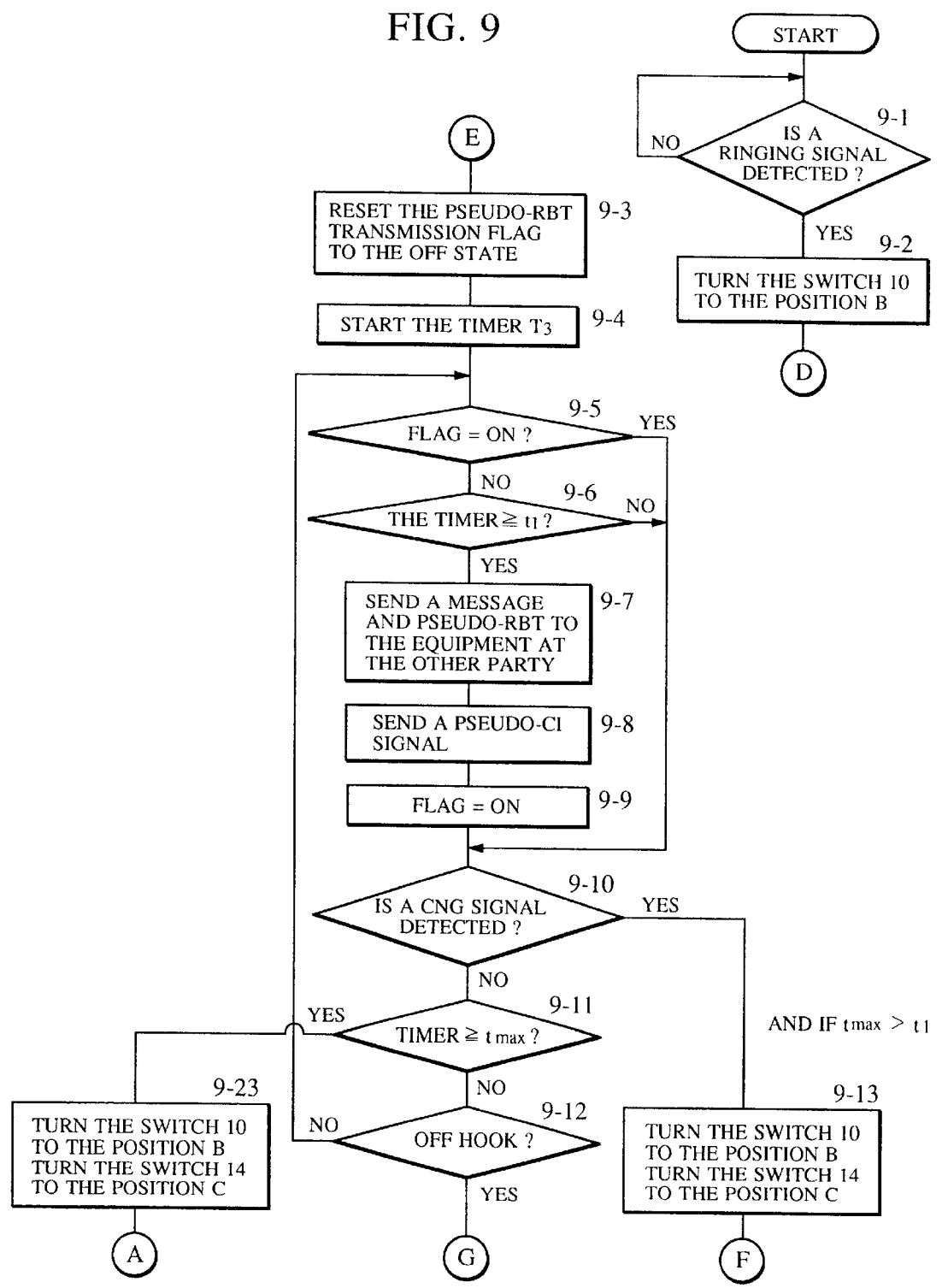

COMMUNICATION SYSTEM HAVING THE CAPABILITY OF SELECTING AN OPTIMUM COMMUNICATION MODE FROM A PLURALITY OF MODES, DEPENDING ON THE TYPE OF EQUIPMENT AT A PARTY TO BE COMMUNICATED WITH

BACKGROUND OF THE INVENTION

1. Field of the Invention

The present invention relates to a communication system having the capability of selecting a communication mode from a plurality of modes so that communication is performed in the optimum mode that best matches the equipment at a party to be communicated with.

2. Description of the Related Art

An example of communication equipment of this type is a facsimile machine, in which communication is performed at a modem speed selected from available values including 14.4 kbps, 9.6 kbps, 7.2 kbps, 4.8 kbps, 2.4 kbps, etc. The modem rate is optimally selected taking into account various factors such as the capability of the modem at the party to be communicated with, the condition of the communication line evaluated by training or TCF, and the history of communication performed in the past. In recent years, techniques to achieve a higher speed of up to 28.8 kbps in data communication have been developed. However, if the communication is performed via a modem at an ultra high rate such as 28.8 kbps, 26.4 kbps, 242.2 kbps, 16.8 kbps, various problems occur as described below.

First, to achieve data transmission at an ultra high speed, it is required to select a transmission line having the capability of a high sampling rate so as to prevent signals from being distorted. To achieve this requirement, a user at a calling end has to ask an exchange operator to select a high sampling rate transmission line before starting the ultra high speed data communication, which is a tedious job.

In some cases, a call to be transmitted is tried at an ultra high speed via a rather low-seed communication line. However, signals will be distorted and thus transmission will fail. As a result, even conventional-type high-speed modems will fall back repeatedly, which results in an increase in communication time.

Furthermore, if a high sampling rate transmission line is selected according only to the convenience of the caller, then a high sampling rate transmission line is used even when the modem of a facsimile machine at a receiving end does not have the capability of ultra high speed communication. This results in a waste of resources.

Even if the modem of the equipment at the called end has the capability of ultra high speed communication, the communication via the ultra high speed modem requires a tedious procedure before starting actual communication. That is, the user has to tell an operator of the called party that he or she desires communication at an ultra high speed rate. The operate at the called party then sets the equipment in the ultra high speed communication mode. Finally, ultra high speed data communication starts.

Furthermore, if the equipment at the called end is set in an operation mode such as an automatic receiving mode, automatic FAX-TEL selection mode, or answering machine mode, and if there is no operator near the equipment, then there is a possibility that the communication in the ultra high speed mode is impossible.

Furthermore, various conditions (for example detection of a CNG signal, pressing of a starting, key, detection of a silent state, detection of a predefined DTMF, detection of a predefined hooking operation, expiration of a predefined time after the arrival of a call), that may occur in a time period from the arrival of a call until the transition to a facsimile operation, can make it impossible to perform communication in the ultra high speed mode unless an operator is present near the equipment at the called end, even if the equipment of the called party has the capability of ultra high speed communication.

In conventional techniques, when equipment operates in an automatic FAX-TEL selection mode, transition to a voice communication mode needs 2 to 5 sec after a call has arrived, which thus results in a delay in communication. Furthermore, if a facsimile machine is set in an automatic receiving mode or in the case where a CNG signal is detected, there is a possibility that transition to a telephone mode becomes impossible. Another problem is that the increase in the type of modem transmission rates results in an increase in the probability that; there is inconsistency in the modem type between calling and called ends. To achieve proper connection between modems of various new types without problems, a new communication protocol (ITU Recommendation V.8) is expected to be established.

However, even if the protocol according to the recommendation V.8 is employed, V.8-equipment will not be able to be properly connected to equipment that has no capability of V.8, although V.8-equipment can be connected satisfactorily to another V.8-equipment.

SUMMARY OF THE INVENTION

In view of the above, it is an object of the present invention to provide an improved communication equipment.

It is another object of the present invention to provide a technique by which a proper communication line having the capability of a high sampling rate can be automatically selected without assistance of an exchange operator.

It is further object of the present invention to provide a technique for avoiding a possibility that communication via an ultra high speed modem starts before acquiring a proper communication line having the capability of a high sampling rate and thus preventing unnecessary fall-back operations that would result in a delay in communication.

It is still another object of the present invention to provide a technique by which when called equipment has a modem with the capability of ultra high speed communication, ultra high speed communication can be started without assistance of an operator at a called party.

It is another object of the present invention to provide a technique by which communication via an ultra high speed modem is possible in whatever receiving operation mode equipment at a called party is set.

It is still another object of the present invention to provide a technique by which communication via an ultra high speed modem is possible regardless of various conditions (for example detection of a CNG signal, pressing of a starting key, detection of a silent state, detection of a DTMF in a predefined fashion, detection of a hooking operation in a predefined fashion, expiration of a predefined time after the arrival of a call), that may occur during a time period from the arrival of a call till the transition to a facsimile operation.

It is another object of the present invention to provide a technique by which the operation mode can be switched quickly to a voice communication mode from any modes including an automatic FAX-TEL selection mode.

It is further object of the present invention to provide a technique by which an optimum communication line having the capability of a high sampling rate can be selected taking into account the capability of equipment at a called party thereby preventing resources from being wasted.

It is another object of the present invention to provide a technique that is compatible with existing communication equipment (G3-facsimile, for example). These and other objects and features of the present invention will be more readily apparent from the following detailed description when read in connection with the accompanying drawings.

BRIEF DESCRIPTION OF THE DRAWINGS

FIG. 9 is a flow chart illustrating a process performed in an automatic FAX-TEL selection mode according to the second embodiment of the present invention;

DESCRIPTION OF THE PREFERRED EMBODIMENTS

Figure 1:
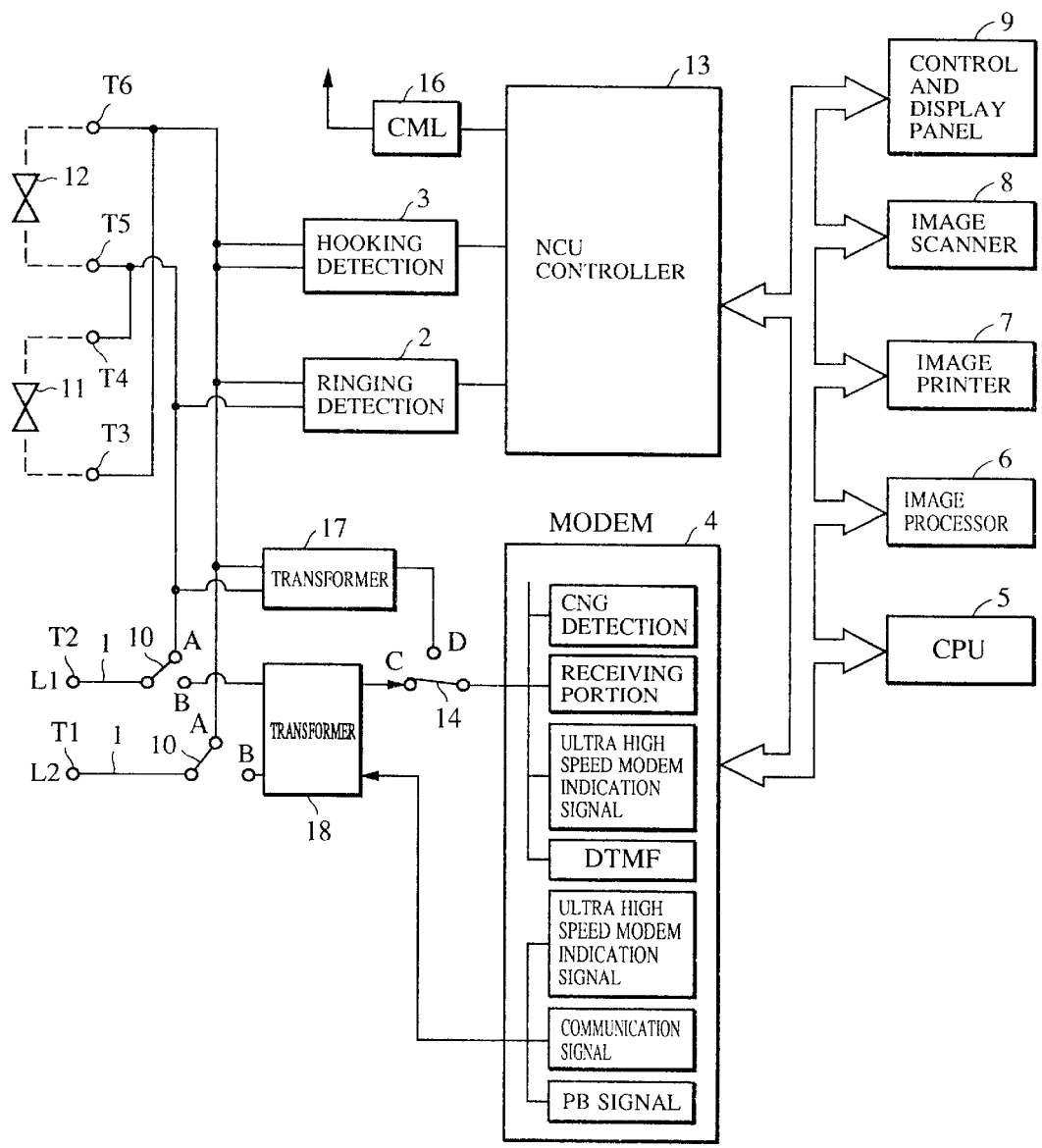
FIG. 1 is a block diagram illustrating the structure of a facsimile machine according to first and second embodiments of the present invention.

Referring to the accompanying drawings, embodiments of the present invention will be described in detail below wherein a facsimile machine will be taken as an example of a communication equipment. FIG. 1 is a block diagram illustrating the structure of a facsimile machine according to the first embodiment of the present invention.

In this figure, a connector 1 ($T_1$, $T_2$) is used to connect the facsimile machine to a telephone line $L_1$, $L_2$. A ringing signal detection circuit 2 detects a ringing signal coming via the line.

A hooking detection circuit 3 is used to detect the hooking state of telephones 11 and 12. A modem 4 is a circuit for modulating and demodulating a facsimile signal thereby transmitting and receiving it. The modem 4 has capabilities of performing modulation and demodulation according to V.8, V.17, V.21, V.27ter, V.29, V.34, etc. It also has the capability of detecting a CNG signal or an ultra high speed capability signal (V.8) transmitted from a facsimile machine at a calling end. Furthermore, the modem 4 has the capability of detecting a DTMF signal transmitted from the calling party or generated by a telephone 11 or 12.

A CPU 5 controls the operation of the entire equipment. An image processor 6 performs various image processing on image data. An image printer 7 prints data such as a received image on recording paper. An image scanner 8 scans a document to be transmitted thereby reading the corresponding data. A control and display panel 9 includes a keyboard via which an operator can input various kinds of information and also includes a LCD for displaying various kinds of information.

Telephones 11 and 12 are external telephones or answering machine telephones. There are also provided connectors $T_3, T_4, T_5, T_6$ for, connecting the equipment to the telephone or answering machine telephone. A NCU controller 13 controls the switching operation of a switch 10 via a CML relay 16. An incoming signal received via the telephone line is input to the modem 4 via the switch 10 and a switch 14. When switch 10 is at position A and switch 14 is at position D, the telephone line is connected to modem 4 by transformer 17. When switch 10 is at position B and switch 14 is at position C, the telephone line is connected to modem 4 by transformer 18.

A ROM is a memory for storing a program that controls the operation of the CPU 5 and also stores various messages that will be transmitted to a caller as required. Alternatively, the above messages may be stored in a RAM (not shown) so that the messages can be modified if necessary.

In this embodiment of the invention, the equipment has four receiving modes as described below. First, there is a manual receiving mode in which an incoming call is handled manually via a handset-type telephone. A second mode is an automatic FAX/TEL selection mode in which the equipment automatically responds to an incoming call. In this mode, the called equipment judges-whether the calling equipment is a facsimile machine or a telephone, and turns the switch 10 to the position B for a call from a facsimile machine and to the position A for a call from a telephone. In a third mode or an automatic receiving mode, all incoming calls are automatically connected to a facsimile machine. The fourth mode is an answering machine mode in which an incoming call is connected to an answering machine telephone. The equipment can be set in a desired mode selected from these four modes via the keyboard of the control and display panel 9. Now, a receiving operation according to the present embodiment of the invention will be described below.

In the following discussion, it is assumed that the switch 10 is at the position A when the equipment is in a waiting state.

Referring to the flow charts shown in FIGS. 2 and 3, the manual receiving mode will be described first.

The CPU 5 monitors the output of a ringing signal detection circuit 2. If a ringing signal has arrived via the line $L_1, L_2$ (2-1), then the CPU 5 starts monitoring the output of a hooking detection circuit 3 via the NCU controller 13. Then, in response to detection of an off-hook operation (2-2), the switch 14 is turned to the position D (2-3) so that communication with a caller becomes possible (2-4). In this mode, the line is not captured unless an off-hook operation is performed at the handset-type telephone 12. During the operation in step 2-4, the CPU 5 does not monitor either the ringing signal detection output signal of the ringing signal detection circuit 2 or the CNG detection output signal of the modem 4.

In this state, if a user at either a calling end or a called end desires to perform facsimile data transmission, the user can press a starting key (not shown) on the control and display panel 9 thereby starting a transmission operation (2-5). In response to the detection of the pressing of starting key, the CPU 5 turns the switch 10 to the position B and the switch 14 to the position C (2-10).

In the case where an off-hook operation has occurred at the telephone 11 located far from the facsimile machine, and if it turns out that the calling party desires to make facsimile communication, then the called party can receive the facsimile data in the remote receiving mode. In the remote receiving mode, the receiving operation of the facsimile machine starts in response to a command issued by a telephone connected the facsimile machine. The equipment can operate in this mode only in the case where the equipment has been set in this mode via the control and display panel 9 when the equipment has been installed. If the equipment is set in the remote receiving mode (2-6), the following operation is monitored to determine whether a predefined operation is performed (2-7). In this case, the predefined operation is a hooking operation of a predesignated sub-telephone 11, or generation of a predefined DTMF signal. If it is concluded from the detection result of the hooking detection circuit 3 or the DTMF detection circuit of the modem 4 that a predefined operation has been performed, then the switch 10 is turned to the position B and the switch 14 to the position C (2-10). If the equipment is not set in the remote receiving mode (2-6), or if the operation performed is not a predefined one (2-7), then it is judged whether the telephone 11 or 12 is in an on-hook state (2-8). If no telephone is in an on-hook state, then the process returns to step (2-5). If either telephone is in an on-hook state, the switch 14 is turned to the position C (2-9), and then the process is completed.

In the manual receiving mode, the operation of receiving facsimile data is performed according to the process steps described below.

First, an ultra high speed capability indication signal (according to the V.8 protocol) is sent from the modem 4 to a facsimile machine at a calling end thereby notifying that the modem of a facsimile machine at a called end has the capability of operating at an ultra high speed (28.8 kbps) (2-11).

An ultra high speed capability signal detection timer $T_1$ is then started thereby starting an operation of monitoring the arrival of a signal indicating whether the facsimile machine at the calling end has a modem with the ultra high speed capability (2-12).

Thus, the modem 4 monitors the arrival of an ultra high speed capability signal (signal according to the V.8 protocol) generated by the calling end (2-13). If the signal is detected, the modem capability of the calling equipment is then determined from the detected signal, and then the modem 4 transmits an ultra high speed capability signal indicating the optimum mode available in the ultra high speed modem of the called equipment (2-19). Image data transmission is then performed (2-20). When all data has been received, the switch 10 is turned to the position A and the switch 14 is turned to the position C (2-21), and thus the communication is completed. Exchanges detect the ultra high speed capability signal and select proper communication lines having the capability of a high sampling rate.

In the case where an ultra high speed capability signal has not been detected during the above time period $T_1$ (2-14), it is assumed that the facsimile machine at the calling end is conventional-type equipment having no capability of ultra high speed communication :and that it can operate only at a modem speed of 14.4 kbps or 9600 bps. Thus, a CED or DIS signal (initial identification signal) is sent to the facsimile machine at the;calling end according to the conventional G-3 facsimile standards (2-15). The above initial identification signal notifies the calling party of the capability such as a modem rate at which the called equipment can operate.

Then, a timer $T_2$ is started thereby starting an operation of detecting transmission and reception command signals (DTS, DCS) generated by the facsimile machine at the calling end (2-16). If either a transmission command signal or reception command signal transmitted from the facsimile machine at the calling end is detected (2-17), a precursory procedure is performed according to a protocol known as T.30 of ITU-T (2-22), and image data transmission is then performed (2-23). After the completion of the communication the switch 10 is turned to the position A and the switch 14 to the position C (2-24), and thus all procedures are completed.

In the case where the above-described timer $T_2$ has expired, the switch 10 is turned to the position A and the switch 14 to the position C (2-25), and thus all procedures are completed.

Figure 4:
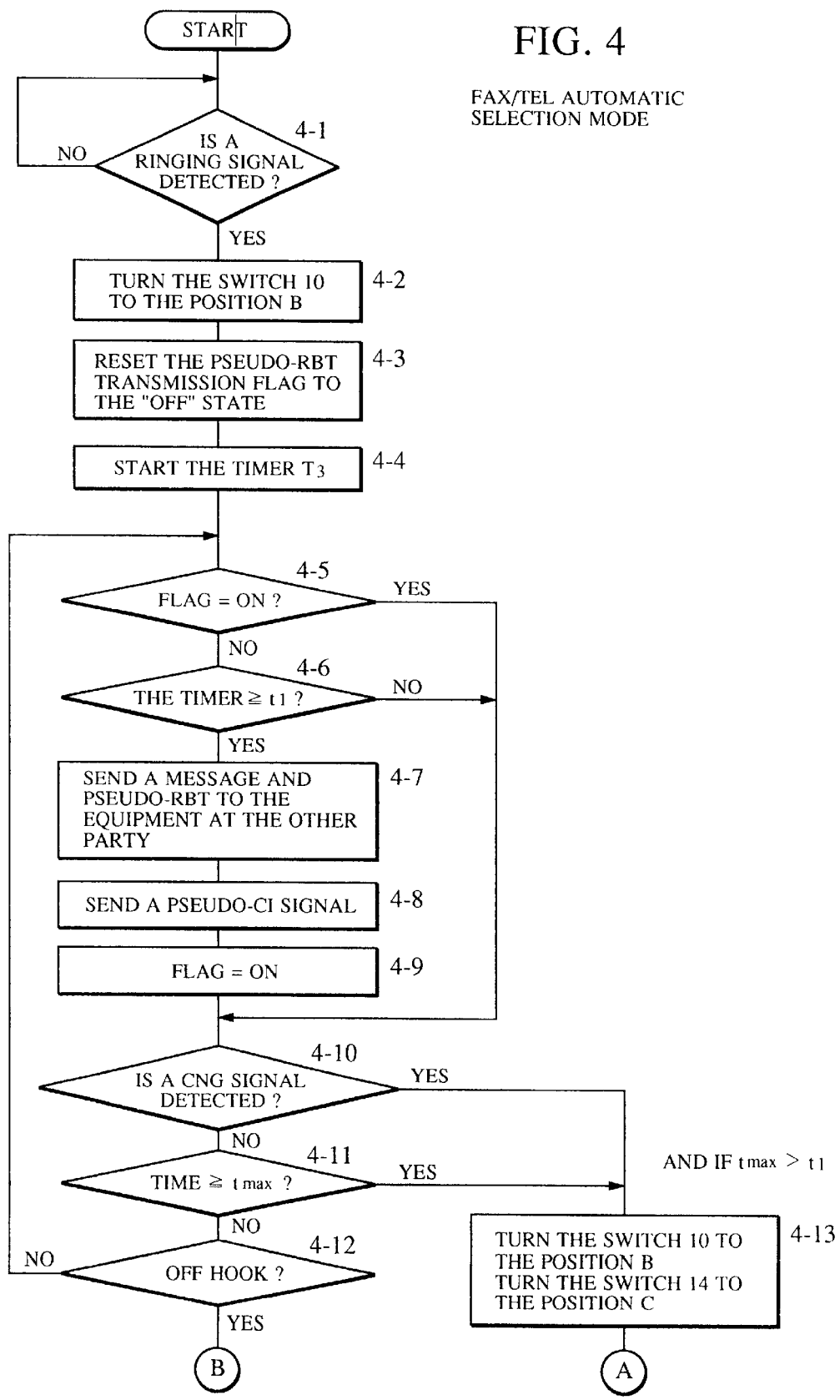
FIG. 4 is a flow chart illustrating a process performed in an automatic FAX-TEL selection mode according to the first embodiment of the present invention.
Figure 5:
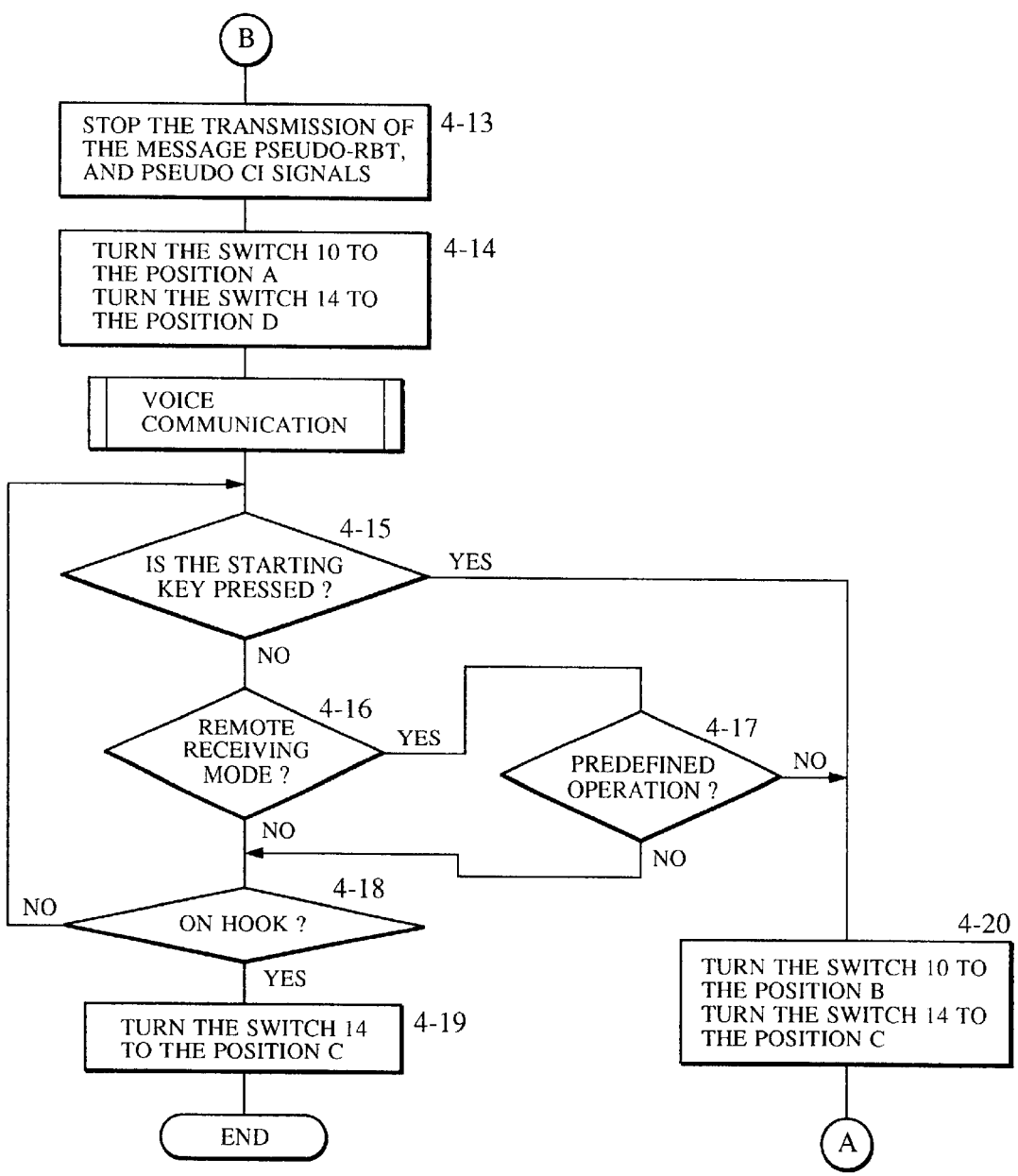
FIG. 5 is a flow chart illustrating a process in the automatic FAX-TEL selection mode according to the first embodiment of the present invention.

Referring to the flow charts shown in FIGS. 4 and 5, the automatic FAX-TEL selection mode will be described.

When a ringing signal has arrived via the line $L_1$, $L_2$ (4-1), the CPU 5 detects a ringing signal via the ringing signal detection circuit 2. If the ringing signal detection circuit 2 has detected a ringing signal, it notifies the NCU controller 13 of the detection of the ringing signal. Thus, the CPU 5 detects the arrival of the ringing signal via the NCU controller 13, and resets the flag to an OFF state for the sake of the processing described later (4-2). The CPU 5 then starts the timer and turns the switch 10 to the position B via the NCU controller 13 (4-2). As a result of the above process, a DC loop is formed. This can be achieved without an off-hook operation of a handset.

Then the pseudo-ring back tone (RBT) transmission flag is reset to an off state (4-3), and the timer $T_3$ is started (4-4). Then it is judged whether the RBT transmission flag is in a ON state (4-5). If it is not in a ON state, then it is judged whether the count of the timer $T_3$ has reached $t_1$ (2 to 5 sec) (4-6). If the timer has not yet expired, then it is determined whether a CNG signal has been transmitted from the calling party (4-10). In the above procedure, a pseudo-RBT signal is not sent until the timer $t_1$ has expired so that a CNG signal can be detected more easily.

Figure 3:
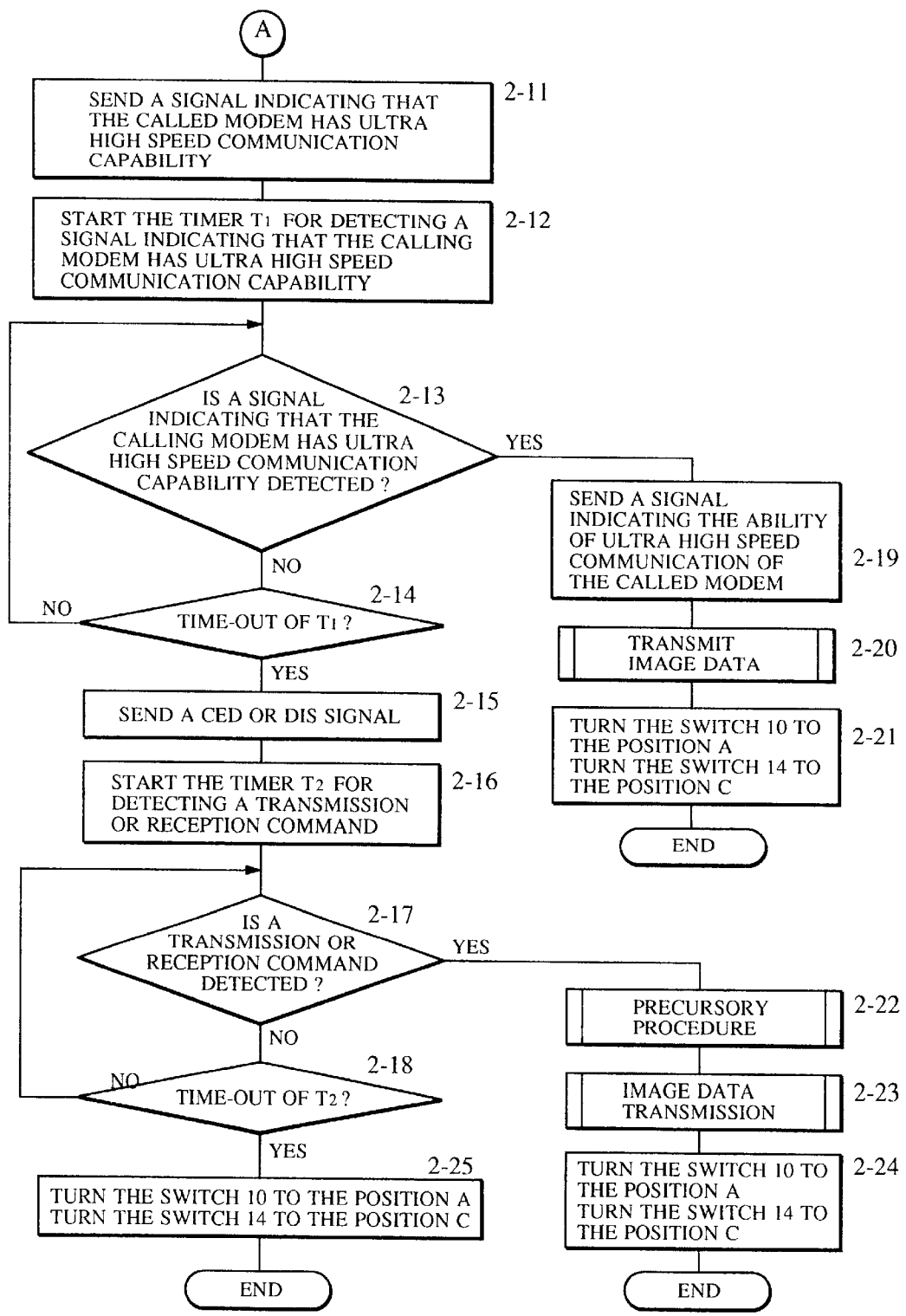
FIG. 3 is a flow chart illustrating a process performed in the manual receiving mode according to the first and second embodiments of the present invention.

If the CNG detection circuit of the modem 4 detects a CNG signal (4-10), then the switch 10 is turned to the position B and the switch. 14 to the position C (4-13), and the operation shown in FIG. 3 is performed. In the case where a CNG signal has not been detected, it is checked whether the count of the timer $T_3$ has reached $t_{max}$ (for example 35 sec to 40 sec) (4-11). If the count has reached $t_{max}$, the switch 10 is turned to the position B and the switch 14 to the position C (4-13), and then the operation shown in FIG. 3 is performed. Before the above switching operation, a message stating "There is no response. If you want to transmit some facsimile data, you can start the operation now." may be transmitted to the caller.

If the count has not reached $t_{max}$ yet, the off-hook operation of the telephones 11 and 12 is monitored (4-11).

If no off-hook operation is detected, the procedure goes to step 4-5.

If the timer $T_3$ has counted $t_1$ (2–5 sec) (4-6), a message saying "Wait a moment, please. If you want to transmit some facsimile data, you can start the operation now." is sent to the caller and a pseudo-ring back tone is also transmitted (4-7). Alternatively, however, only either the message or the pseudo-ring back tone may be transmitted.

A pseudo-ringing signal is then generated to ring a bell of the telephone 11 or 12 thereby notifying an operator at the called party of the arrival of a call that is requesting an off-hook operation of the telephone 11 or 12 (4-8). During the ringing operation, a message saying "Now Calling" may be sent to the caller. Alternatively, a bell may be provided in the main portion of the facsimile machine so that a bell may be ringed without generating a pseudo-ringing signal.

After that, the pseudo-RBT transmission flag is set to a ON state (4-9), and then the procedure goes to step 4-10 in which a CNG or off-hook signal is monitored until $t_{max}$. If an off-hook operation at the telephone 11 or 12 is detected, the transmission of the message, the pseudo-ring back tone, and the pseudo-ringing signal are stopped (4-13). Then the switch 10 is turned to the position A and the switch 14 to the position D (4-14) so that voice communication can be performed.

Figure 2:
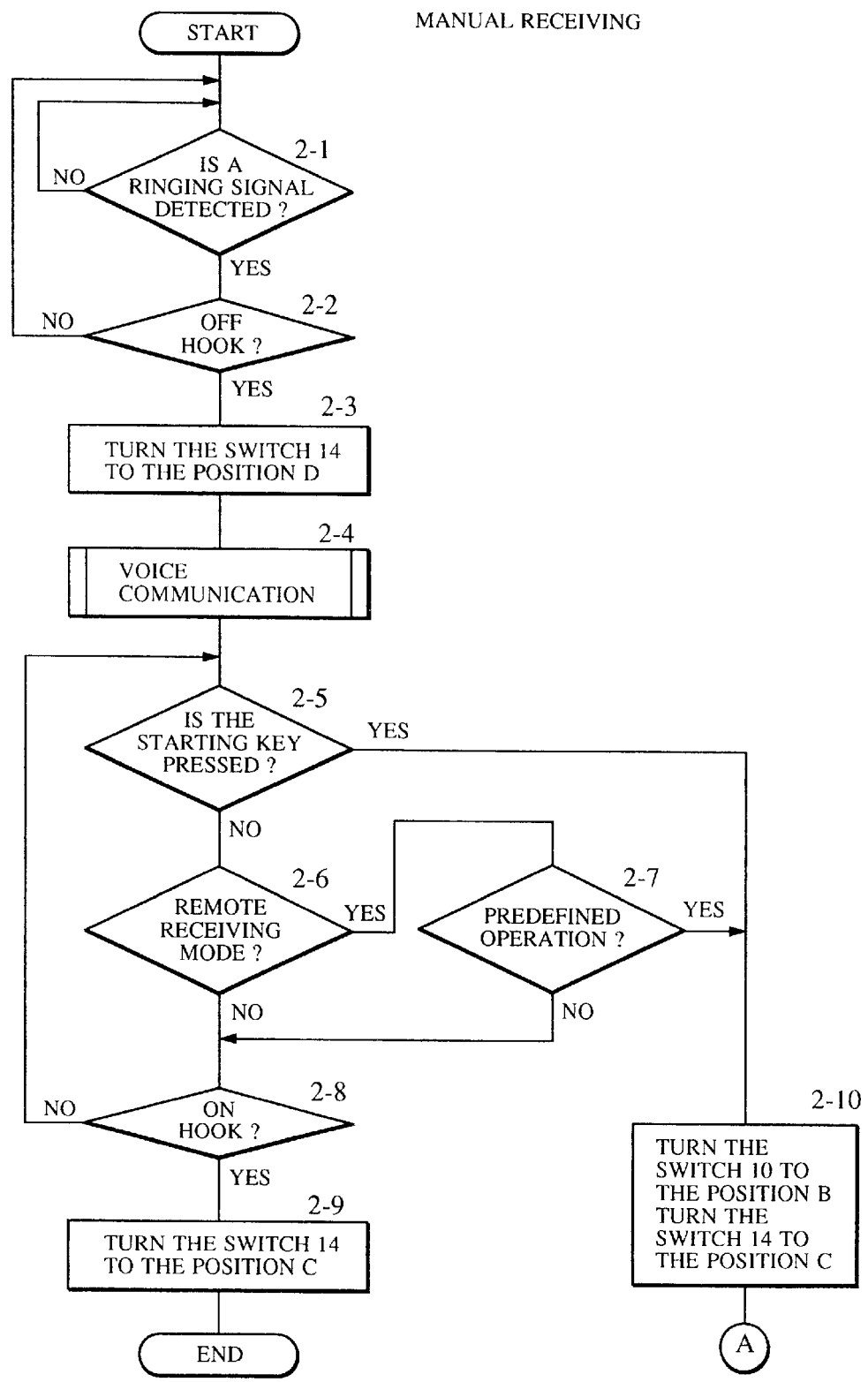
FIG. 2 is a flow chart illustrating a process performed in a manual receiving mode according to the first and second embodiments of the present invention.

If it is desired to start a facsimile operation during or after the voice communication, the operation can be performed in the same manner as in the manual receiving mode (steps 2-5 to 2-10 of FIG. 2). These operation steps having been described above, will not be described again.

When an operator at a calling party desires voice communication, the above-described operation mode has an advantage that when the call is received, a ultra high speed capability indication signal that will be uncomfortable for the operator at the calling party is not transmitted from the called end, and voice communication can be started after some message. Thus, the operator at the calling party never misunderstands that the equipment at the called party is a facsimile machine having no capability of voice communication. In this mode, if facsimile communication is desired after the voice communication, the facsimile operation via the ultra high speed modem can be readily started.

Figure 6:
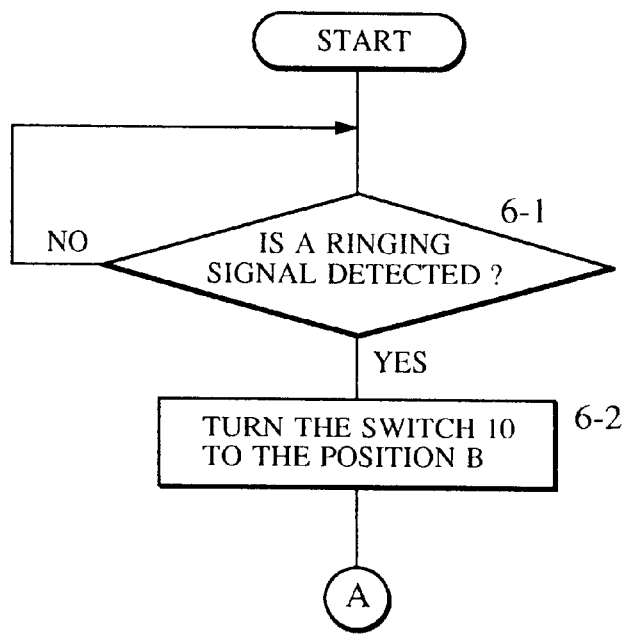
FIG. 6 is a flow chart illustrating a process performed in an automatic receiving mode according to the first and second embodiments of the present invention.

Now, referring to the flow chart of FIG. 6, the automatic receiving mode will be described.

When the CPU 5 detects a ringing signal (6-1), the switch 10 is turned to the position B and then the following procedure is performed according to the flow chart of FIG. 3.

Figure 8:
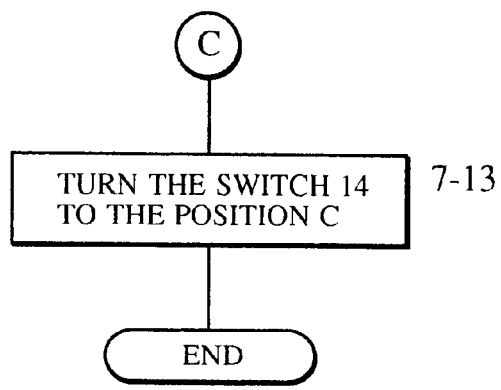
FIG. 8 is a flow chart illustrating a process performed in the external answering machine telephone mode according to the first embodiment of the present invention.
Figure 7:
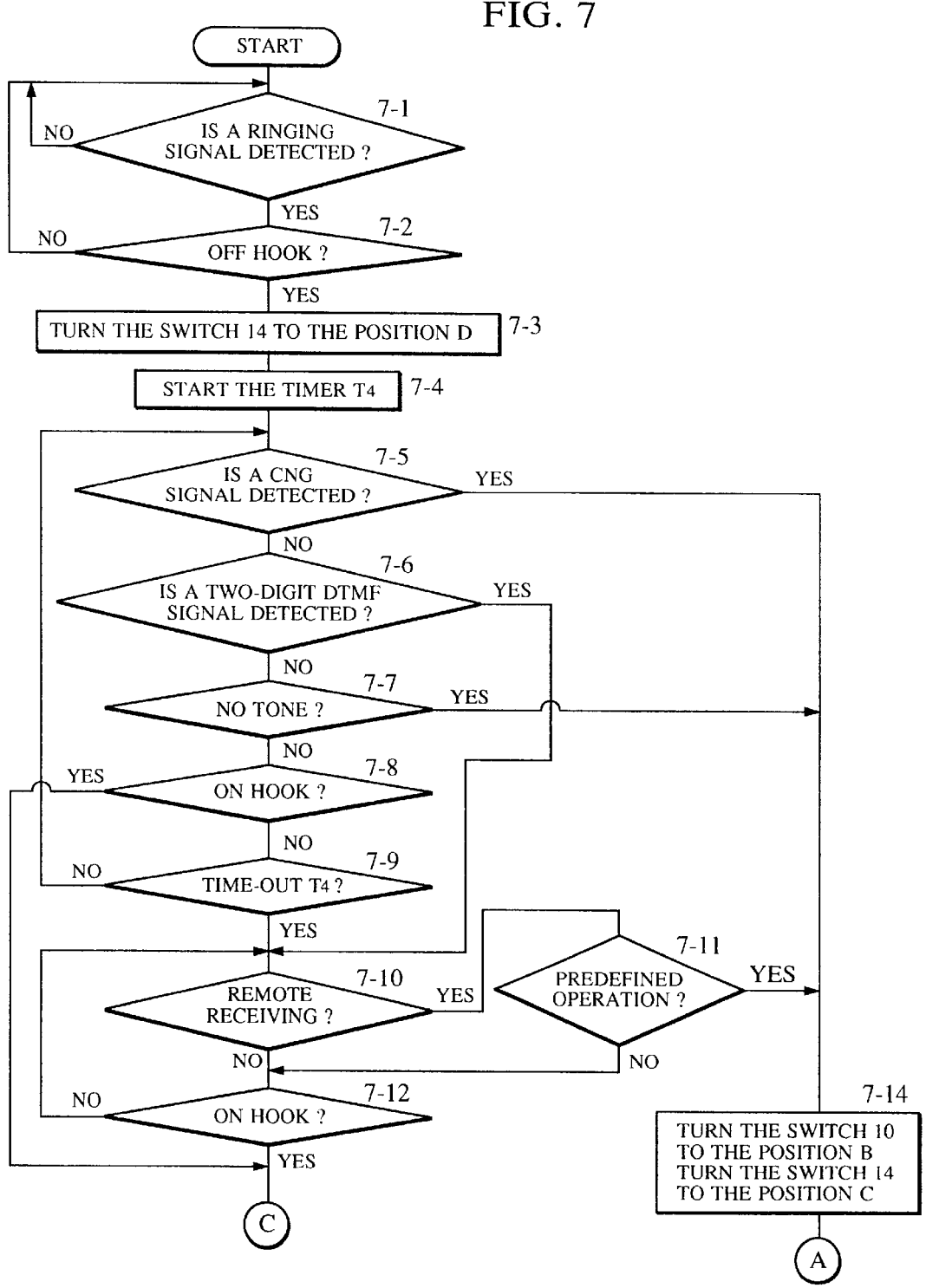
FIG. 7 is a flow chart illustrating a process performed in an external answering machine telephone mode according to the first embodiment of the present invention.
Figure 10:
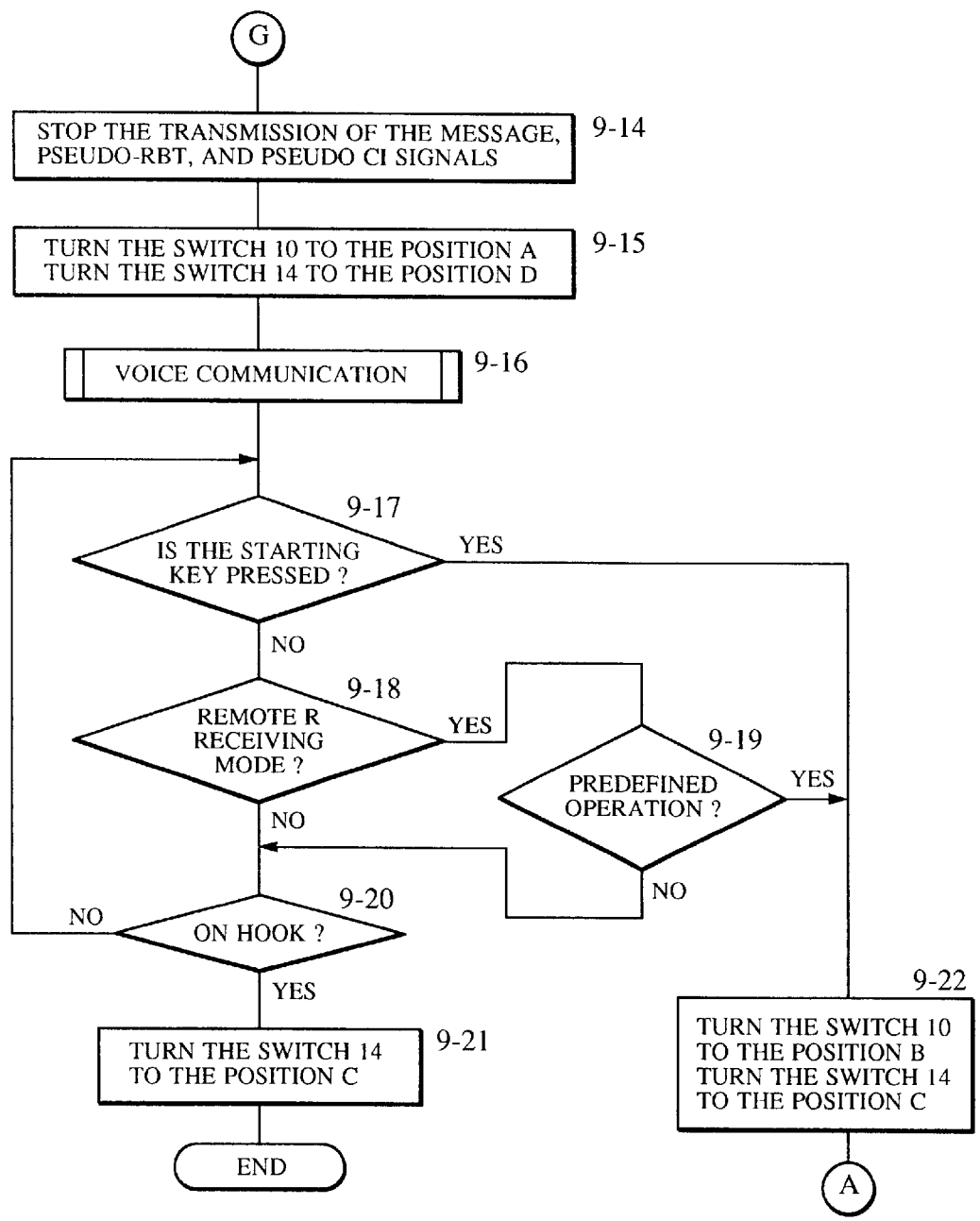
FIG. 10 is a flow chart illustrating a process performed in the automatic FAX-TEL selection mode according to the second embodiment of the present invention.
Figure 11:
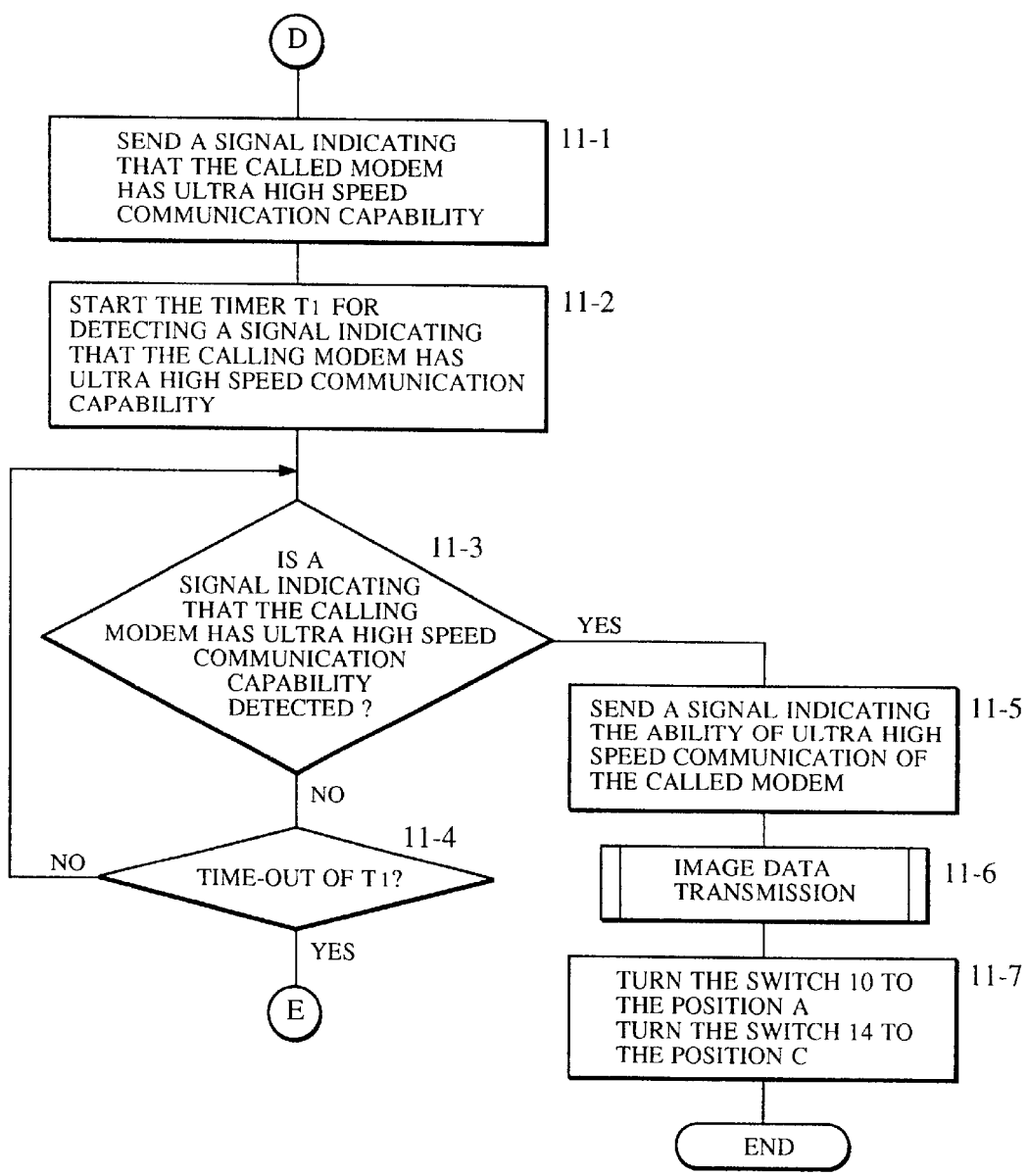
FIG. 11 is a flow chart illustrating a communication process via an ultra high speed modem according to the second embodiment of the present invention.
Figure 12:
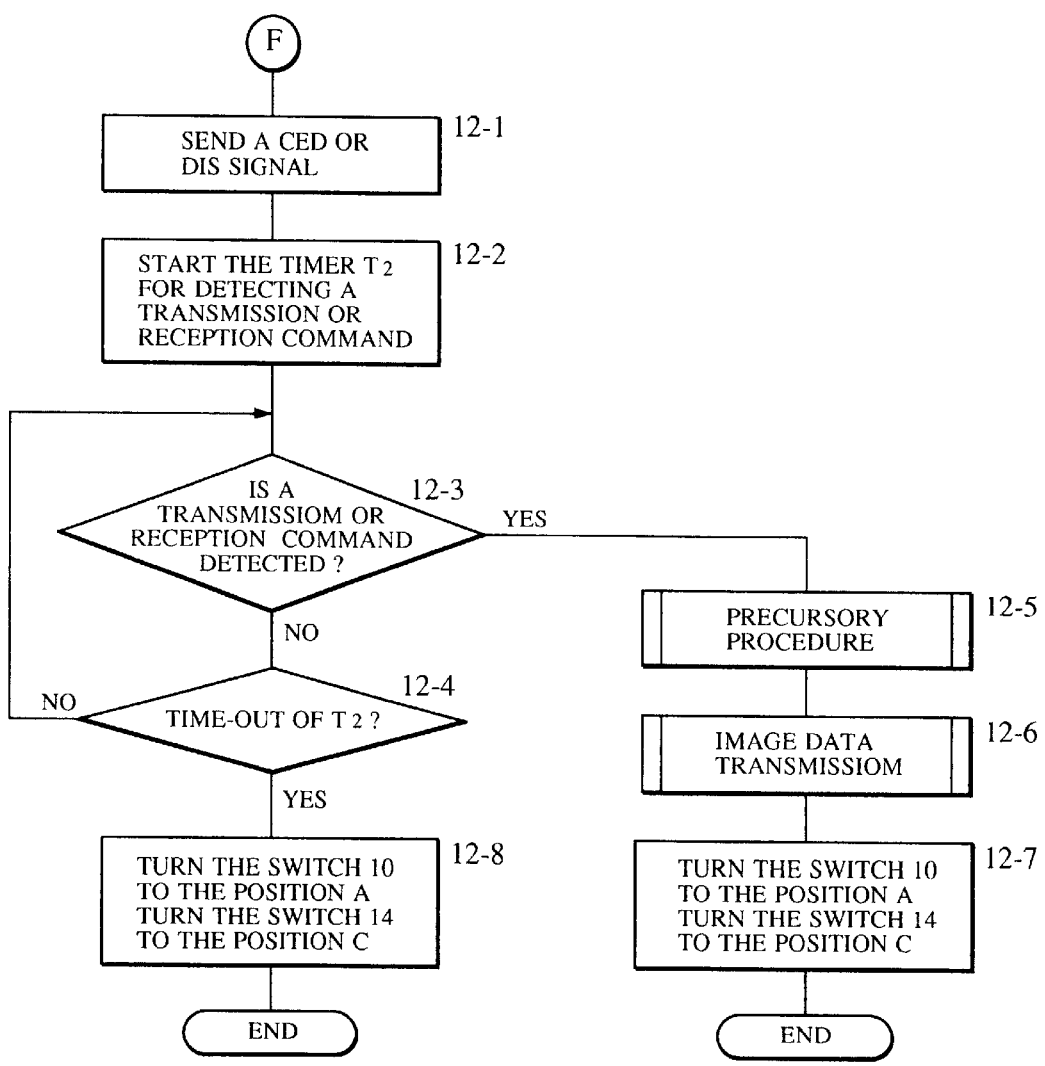
FIG. 12 is a flow chart illustrating a communication process via a high speed modem according to the second embodiment of the present invention.
Figure 13:
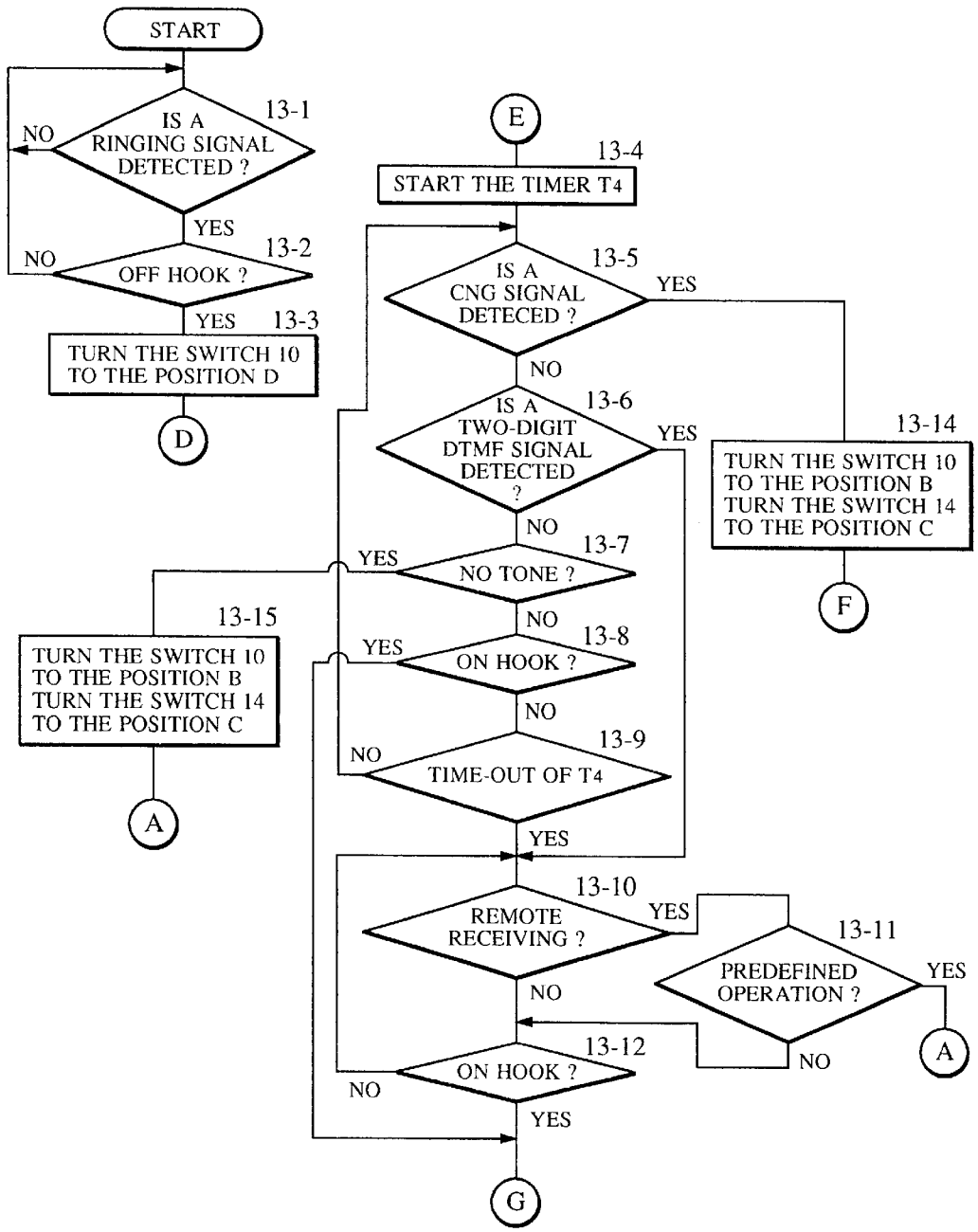
FIG. 13 is a flow chart illustrating a process performed in an external answering machine telephone mode according to the second embodiment of the present invention.
Figure 14:
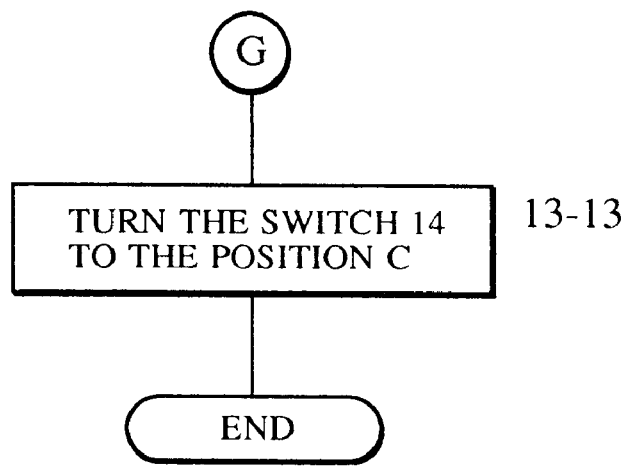
FIG. 14 is a flow chart illustrating a process performed in the external answering machine telephone mode according to the second embodiment of the present invention.

Referring to the flow charts shown in FIGS. 7 and 8, the external answering machine telephone mode will be described.

In this mode, it is assumed that either the telephone 11 or 12 acts as an answering machine telephone and that the answering machine mode has been selected via the control panel 9. The CPU 5 monitors the output of the ringing signal detection circuit 2. If the CPU 5 detects a ringing signal coming via the line $L_1$, $L_2$ (7-1), then the CPU 5 starts monitoring, via the hooking detection circuit 3, the off-hook operation of the telephone or the answering machine telephone. (7-2).

If an off-hook operation is detected, the switch 14 is turned to the position D (7-3) so that a CNG signal can be detected. The timer $T_4$ is then started (7-4), and the arrival of a CNG signal is-monitored via the CNG detection circuit of the modem 4 (7-5). If a CNG signal is detected the switch 10 is turned to the position B and the switch 14 to the position C (7-14), and the process shown in FIG. 3 is performed.

If a CNG signal has not been detected, it is determined whether the DTMF detection circuit of the modem 4 has received a two-digit DTMF signal generated by the calling end (7-6). If it turns out that a two-digit DTMF signal has been received, the signal is considered to be either an answering machine telephone command or a remote receiving command, and thus the monitoring of the CNG signal is no longer performed. The monitoring of the CNG signal is stopped so as to prevent a possible problem that when the answering machine telephone command that has been received is such a command requesting reproduction of the contents recorded in an answering machine telephone, if the contents recorded in the telephone include a CNG signal then the modem 4 will detect the reproduced CNG signal and, as a result, the operation mode will be switched to the facsimile mode.

Then it is determined whether the equipment is set in the remote receiving mode (7-10). If yes, then it is judged whether the operation is performed according to the predefined procedure (7-11). If it is concluded that the operation has been performed according to the predefined procedure, then the switch 10 is turned to the position B and the switch 14 to the position C so that the facsimile operation can be started. After that, the process shown in FIG. 3 is performed.

If the equipment is not set in the remote receiving mode or if the operation performed is not consistent with the predefined procedure, then it is determined from the output of the hooking detection circuit 3 whether an on-hook operation has been performed at the answering machine telephone or the other telephone (7-12). If no on-hook operation is detected, then the procedure returns to step 7-10. On the other hand, if an on-hook operation is detected, the switch 14 is turned to the position C, and the procedure is completed.

In the case where a two-digit DTMF signal has not been detected (7-6), it is checked whether no tone is present. If it is concluded that there is no tone, the switch 10 is turned to the position B and the switch 14 to the position C. Then the process for receiving facsimile data is performed according to the flow chart shown in FIG. 3. If there is some tone, it is judged whether the telephones are in an on-hook state (7-8). If the telephones are in an on-hook state, then the procedure goes to step 7-13. If either telephone is in an off-hook state, the process returns to step 7-5 so as to repeatedly perform the above steps until the timer $T_4$ has expired. If the timer has expired the process goes to step (7-10).

The answering machine telephone 11 or 12 has a ringing signal detection circuit disposed separately from the ringing signal detection circuit 2. If this ringing signal detection circuit has detected a ringing signal, the line is closed and thus a DC loop is formed. Thus, the hooking detection circuit 3 monitors the off-hook operation.

When the DC loop has been formed, a message stating "This is *****. The machine is now answering. You can leave a message or if you want to transmit some facsimile data, you can start the operation" is sent to a caller.

In the external answering machine telephone mode, an external telephone operates as an answering machine telephone, and the CPU 5 cannot not know the operation status of the answering machine telephone. Therefore, if the answering machine telephone cuts off the line after recording a received message, the CPU 5 cannot know this fact. For this reason, the CPU 5 does not switch the operation mode into a facsimile receiving mode after the completion of the recording operation.

When an operator at a calling party desires voice communication, the above-described operation mode has an advantage that when the call is received a ultra high speed capability indication signal that will be uncomfortable for the operator at the calling party is not transmitted from the called end, and voice communication can be started after some message. Thus, the operator at the calling party never misunderstands that the equipment at the called party is a facsimile machine having no capability of voice communication.

Alternatively, a voice communication request signal together with the ultra high speed capability indication signal may be transmitted to the caller so that the operation mode can be switched quickly to the telephone mode.

If the voice communication request signal is employed, quick switching to the voice communication mode can be achieved regardless of the current operation mode (automatic receiving mode, automatic FAX-TEL selection mode, answering machine telephone mode) of the facsimile machine.

A second embodiment of the present invention will be now described below.

The first embodiment, as,described above, has an advantage that when equipment is set in an automatic FAX-TEL selection mode or an answering machine mode, if a call from an operator who desires voice communication has arrived, the operation mode of the called equipment can be switched to the voice communication mode without sending an ultra high speed capability indication signal to the calling equipment, and thus the operator at the calling end does not encounter an uncomfortable signal tone and there occurs no misunderstanding that might otherwise arise from the signal tone.

However, in this first embodiment, the switching to the facsimile mode is performed after having detected a CNG signal generated from the calling equipment, and thus there occurs a certain time delay in the transition to the facsimile mode.

In view of the above, in this second embodiment, an ultra high speed capability indication signal is transmitted to the calling equipment on reception of a call. Although this arrangement has a disadvantage that an operator at the calling end encounters an uncomfortable signal tone, it has an advantage that communication can be performed at a lower cost.

The operation in the manual receiving mode and automatic receiving mode is performed in the same manner as in the first embodiment, and thus these are not described here again. Furthermore, the structure of the equipment is also the same as that used in the first embodiment (refer to FIG. 1), and thus no duplicated description will be given here.

Referring to the flow charts shown in FIGS. 9 to 12, the automatic FAX-TEL selection mode will be described.

When a ringing signal has arrived via the line $L_1, L_2$ (9-1), the CPU 5 detects the ringing signal via the ringing signal detection circuit. If a ringing signal has been detected, the ringing signal detection circuit 2 notifies the NCU controller 13 of the arrival of the call.

If the CPU 5 detects the arrival of the ringing signal via the NCU controller 13, the CPU 5 resets the flag to a OFF state for the sake of the process described later, and starts the timer. Furthermore, the CPU 5 turns the switch 10 to the position B via the NCU controller 13 (9-2) so that a DC loop is formed.

After the DC loop has been formed, the modem 4 transmits, to the facsimile machine at the calling end, an ultra high speed capability indication signal indicating that the called facsimile machine can transmit data via an ultra high speed modem (at 28.8 kbps according to V.34) (11-1).

To determine whether the calling facsimile machine has the capability of an ultra high speed modem, the ultra high speed capability signal detection timer $T_1$ is started thereby starting an operation of detecting a signal representing the capability of the ultra high speed modem of the calling equipment (11-2).

Thus, the modem 4 detects an ultra high speed capability signal generated by the calling end (11-3). If the above signal has been detected, the capability of the ultra high speed modem at the calling end is determined, and the modem 4 transmits an ultra high speed capability signal indicating the optimum mode available in the ultra high speed modem at the called end (11-5). Then, image data communication is performed (11-6). After completion of the communication, the switch 10 is turned to the position A and the switch 14 to the position C (11-7), and thus all procedures are completed.

In the above procedure, the output of the CNG signal detection circuit is neglected during a time period in which the timer $T_1$ is active. The neglecting of the CNG signal during that time period is required for the following reason. During a certain time period just after the arrival of a call, the calling equipment transmits a CNG signal probably before detecting an ultra high speed capability indication signal transmitted from the called end. If it is determined erroneously from this CNG signal that the calling equipment is a conventional-type high speed modem machine, then ultra high speed communication becomes impossible even if the calling equipment actually has the capability of ultra high speed communication.

Exchanges detect this ultra high speed capability signal and select proper communication lines having the capability of a high sampling rate.

In the case where an ultra high speed capability signal has not been detected during the time period $T_1$ (7-14), the pseudo-ring back tone transmission flag is reset to an off state (9-3). The timer $T_3$ is then started (9-4). It is determined whether the transmission flag is in a ON state (9-4). If the flag is not in a ON state, then it is judged whether the count of the timer $T_3$ has reached $t_1$ (2 to 5 sec) (9-5). If the timer has not expired yet, then it is determined whether a CNG signal from the calling party has arrived (4-10). In the above procedure, a pseudo-RBT signal is not sent until the timer $t_1$ has expired so that a CNG signal can be detected more easily.

If the CNG detection circuit of the modem 4 detects a CNG signal (9-10), then the switch 10 is turned to the position B and the switch 14 to the position C (9-13), and the operation shown in FIG. 3 is performed.

In this example, the calling facsimile machine does not respond to the ultra high speed capability signal, and thus it is assumed that the facsimile machine at the calling end is conventional-type equipment that operates at a modem speed of 14.4 kbps according to V.17 or at 9600 bps according to V.29 or V.17. Thus, a CED or DIS signal (initial identification signal) is sent to the facsimile machine at the calling end according to the conventional G-3 facsimile standards (8-1).

Then, a timer $T_2$ is started thereby starting an operation of detecting transmission and reception command signals (DTS, DCS) generated by the; facsimile machine at the calling end (12-2). If either a transmission command signal or reception command signal transmitted from the facsimile machine at the calling end is detected (12-3), a precursory procedure is performed according to a protocol known as T.30 of ITU-T (12-5), and image data transmission is then performed (12-6). After the completion of the communication the switch 10 is turned to the position A and the switch 14 to the position C (12-7), and thus all procedures are completed.

In the above procedure, even in the case in which calling equipment is set in a mode other than an automatic calling mode, there is a possibility that a CNG signal is transmitted. If a CNG signall arrives after a rather long time has passed since the call was received, that CNG signal was generated probably because the operator of the calling party pressed the starting key of his/her facsimile machine after he/she received an ultra high speed capability indication signal. In this case, the calling facsimile machine can be such a machine having an ultra high speed modem. Thus, the procedure may be modified such that if the first CNG signal arrives when 5 sec or a longer time has passed since the start of the call, an ultra high speed capability indication signal may be transmitted again.

In step 12-3, if the signal has not been detected, the switch 10 is turned to the position A and the switch 14 to the position C (8-8). In the case where a CNG signal has not been detected, it is checked whether the count of the timer $T_2$ has reached $t_{max}$ (for example 35 sec to 40 sec) (9-11). If the count has reached $t_{max}$, the switch 10 is turned to the position B and the switch 14 to the position C (10-23), and then the operation shown in FIG. 3 is performed.

Before the above switching operation, a message stating "There is no response. If you want to transmit some facsimile data, you can start the operation now." may be transmitted to the caller.

An ultra high speed capability indication signal is transmitted again because there is a possibility that the operator of the calling party may press the starting key of his/her facsimile machine having the capability of an ultra high speed modem after he/she receive this message.

If the count has not reached $t_{max}$ yet, the off-hook operation of the telephones 11 and 12 is monitored (9-12). If no off-hook operation is detected, the procedure goes to step 9-5. If the timer $T_3$ has counted $t_1$ (2–5 sec) (9-6), a message saying "Wait a moment, please. If you want to transmit some facsimile data, you can start the operation now." is sent to the caller and a pseudo-ring back tone is also transmitted (9-7). Alternatively, however, only either the message or the pseudo-ring back tone may be transmitted.

A pseudo-ringing signal is then generated to ring a bell of the telephone 11 or 12 thereby notifying an operator of the called party of the arrival of a call that is requesting an off-hook operation of the telephone 11 or 12 (9-8). During the ringing operation, a message saying "Now Calling" may be sent to the caller. Alternatively, a bell may be provided in the main portion of the facsimile machine so that a bell may be rung without generating a pseudo-ringing signal. After that, the pseudo-RBT transmission flag is set to a ON state (9-9), and then the procedure goes to step 4-10 in which a CNG or off-hook signal is monitored until $t_{max}$.

If an off-hook operation at the telephone 11 or 12 is detected, the transmission of the message, the pseudo-ring back tone, and the pseudo-ringing signal are stopped (9-14). Then the switch 10 is turned to the position A and the switch 14 to the position D (9-15) so that voice communication can be performed.

If it is desired to start a facsimile operation during or after the voice communication, the operation can be performed in the same manner as in the manual receiving mode (steps 2-5 to 2-10 of FIG. 2). These operation steps having been described before, will not be described again.

In this technique, a quick start of the ultra high speed modem communication is possible because an ultra high speed capability indication signal is transmitted immediately after a call has been received. As a result, the communication cost can be reduced.

Alternatively, a voice communication request signal together with the ultra high speed capability indication signal may be transmitted to the caller so that the operation mode can be switched quickly to the telephone mode.

Referring to the flow charts shown in FIGS. 11 to 14, the external answering machine telephone mode will be described.

In this mode, it is assumed that either the telephone 11 or 12 acts as an answering machine telephone and that the answering machine mode has been selected via the control panel 9. The CPU 5 monitors the output of the ringing signal detection circuit 2. If the CPU 5 detects a ringing signal coming via the line $L_1$, $L_2$ (13-1), then the CPU 5 starts monitoring, via the hooking detection circuit 3, the off-hook operation of the telephone or the answering machine telephone. (13-2). If an off-hook operation is detected, the switch 14 is turned to the position D (13-3) so that a CNG signal can be detected.

An ultra high speed capability indication signal is sent to the facsimile machine at the calling end to notify it that the called facsimile machine can transmit data via an ultra high speed modem (at 28.8 kbps) (11-1).

To determine whether the calling facsimile machine has the capability of an ultra high speed modem, the ultra high speed capability signal detection timer $T_1$ (3 to 8 sec) is started (11-2) thereby starting an operation of detecting a signal representing the capability of the ultra high speed modem of the calling equipment (11-3).

If the signal is detected, the modem capability of the calling equipment is then determined from the detected signal, and an ultra high speed capability signal is transmitted so as to notify the calling equipment of the optimum mode available in the ultra high speed modem of the called equipment (11-5). Image data transmission is then performed (11-6). When all data has been received, the switch 10 is turned to the position A and the switch 14 is turned to the position C (11-7), and thus the communication is completed.

In the above procedure, the output of the CNG signal detection circuit is neglected during a time period in which the timer $T_1$ is active. The neglecting of the CNG signal during that time period is required for the following reason. During a certain time period just after the arrival of a call, the calling equipment transmits a CNG signal probably before detecting an ultra high speed capability indication signal transmitted from the called end. If it is determined erroneously from this CNG signal that the calling equipment is a conventional-type high speed modem machine, then ultra high speed communication becomes impossible even if the calling equipment actually has the capability of ultra high speed communication.

Exchanges detect this ultra high speed capability signal according to the V.8 protocol and select proper communication lines having the capability of a high sampling rate.

In the case where an ultra high speed capability signal has not been detected during the time period $T_1$ (11-14), the switch is turned to the other position so that the arrival of a CNG signal can be monitored. The timer $T_4$ is then started (13-4), and the arrival of a CNG signal is monitored via the CNG detection circuit of the modem 4 (13-5). If a CNG signal is detected the switch 10 is turned to the position B and the switch 14 to the position C (13-14).

In this example, however, the calling facsimile machine does not respond to the ultra high speed capability signal, and thus it is assumed that the facsimile machine at the calling end is conventional-type equipment that operates at a modem speed of 14.4 kbps or at 9600 bps. Thus, a CED or DIS signal (initial identification signal) is sent to the facsimile machine at the calling end according to the conventional G-3 facsimile standards (12-1).

Then, a timer $T_2$ is started thereby starting an operation of detecting transmission and reception command signals (DTS, DCS) generated by the facsimile machine at the calling end (12-2). If either a transmission command signal or reception command signal transmitted from the facsimile machine at the calling end is detected (12-3), a precursory procedure is performed according to a protocol known as T.30 of ITU-T (12-5), and image data transmission is then performed (12-6). After the completion of the communication the switch 10 is turned to the position A and the switch 14 to the position C (12-7), and thus all procedures are completed.

In the above procedure, leven in the case in which calling equipment is set in a mode other than an automatic calling mode, there is a possibility that a CNG signal is transmitted. If a CNG signal arrives after a rather long time has passed since the start of the call, that CNG signal was probably generated because the operator of the calling party pressed the starting key of his/her facsimile machine after he/she received an ultra high speed capability indication signal. In this case, the calling facsimile machine can be such a machine having an ultra high speed modem. Thus, the procedure may be modified such that if the first CNG signal arrives when 5 sec, for example, has passed since the start of the call, an ultra high speed capability indication signal may be transmitted again.

If a CNG signal has not been detected, it is determined whether the DTMF detection circuit of the modem 4 has received a two-digit DTMF signal generated by the calling end. If a two-digit DTMF signal has been received, the signal is considered to be either an answering machine telephone command or a remote receiving command, and thus the monitoring of the CNG signal is no longer performed. The monitoring of the CNG signal is stopped so as to prevent a possible problem that when the answering machine telephone command that has been received is such a command requesting reproduction of the contents recorded in an answering machine telephone, if the contents recorded in-the telephone include a CNG signal then the modem 4 will detect the reproduced CNG signal and, as a result, the operation mode will be switched to the facsimile mode.

Then it is determined whether the equipment is set in the remote receiving mode (13-10). If yes, then it is judged whether the operation is performed according to the predefined procedure (13-11). If it is concluded that the operation has been performed according to the predefined procedure, then the switch 10 is turned to the position B and the switch 14 to the position C so that the facsimile operation can be started. After that, the process shown in FIG. 3 is performed.

An ultra high speed capability indication signal is transmitted again because there is a possibility that the operator of the calling party may press the starting key of his/her facsimile machine having the capability of an ultra high speed modem after a certain time has passed since the start of the call.

If the equipment is not set in the remote receiving mode or if the operation performed is not consistent with the predefined procedure, then it is determined from the output of the hooking detection circuit 3 whether an on-hook operation has been performed at the answering machine telephone or the other telephone (13-12). If no on-hook operation is detected, then the procedure returns to step 13-10. On the other hand, if an on-hook operation is detected, the switch 14 is turned to the position C, and the procedure is completed.

In the case where a two-digit DTMF signal has not been detected (13-7), it is checked whether no tone is present. If it is concluded that there is no tone, the switch 10 is turned to the position B and the switch 14 to the position C. Then the process for receiving facsimile data is performed according to the flow chart shown in FIG. 3. If there is some tone, it is judged whether the telephones are in an on-hook state (13-8). If the telephones are in an on-hook state, then the procedure goes to step 13-13. If either telephone is in an off-hook state, the process returns to step 13-9 so as to repeatedly perform the above steps until the timer $T_4$ has expired. If the timer has expired the process goes to step (13-10).

In the above procedure, an ultra high speed capability indication signal is transmitted again because the calling facsimile machine can be such a machine having the capability of an ultra high speed modem as discussed above.

The answering machine telephone 11 or 12 has a ringing signal detection circuit disposed separately from the ringing signal detection circuit 2. If this ringing signal detection circuit has detected a ringing signal, the line is closed and thus a DC loop is formed. Thus, the hooking detection circuit 3 monitors the off-hook operation. When the DC loop has been formed, a message stating "This is *****. The machine is now answering. You can leave a message or if you want to transmit some facsimile data, you can start the operation" is sent to a caller, wherein the message has been recorded beforehand in the answering machine.

In the external answering machine telephone mode, an external telephone operates as an answering machine telephone, and the CPU 5 cannot not know the operation status of the answering machine telephone. Therefore, if the answering machine telephone cuts off the line after recording a received message, the CPU 5 cannot know this fact. For this reason, the CPU 5 does not switch the operation mode into a facsimile receiving mode after the completion of the recording operation. In this operation mode, the facsimile machine issues no message because there is a possibility that if a message is issued by the facsimile machine the message may collide with a message issued by the answering machine telephone, or the message from the facsimile machine may be recorded erroneously by the answering machine telephone.

In this technique, a quick start of the ultra high speed modem communication is possible because an ultra high speed capability indication signal is transmitted immediately after a call has been received. As a result, the communication cost can be reduced. Furthermore, if the calling equipment has the capability of an ultra high speed modem, the ultra high speed communication results in a further reduction in the communication cost.

Alternatively, a voice communication request signal together with the ultra high speed capability indication signal may be transmitted to the caller so that the operation mode can be switched quickly to the telephone mode. If the voice communication request signal is employed, quick switching to the voice communication mode can be achieved regardless of the current operation mode (automatic receiving mode, automatic FAX-TEL selection mode, answering machine telephone mode) of the facsimile machine.

As can be seen from the above discussion, the first and second embodiments have their own advantages and disadvantages. However, these first and second embodiments may be combined in such a manner that a user can select desired functions via keys (not shown) on the control panel 9.

A third embodiment of the present invention will be described below.

In this third embodiment, a facsimile machine with a built-in telephone having an answering machine capability will be discussed.

In the first and second embodiments described above, an answering machine telephone,is connected to a facsimile machine via terminals $T_3$, $T_4$, $T_5$, $T_6$ and thus the facsimile machine cannot control the external answering machine telephone. In contrast, in this third embodiment, the answering machine telephone is provided in the facsimile machine so that the CPU of the facsimile machine can control the telephone.

Figure 15:
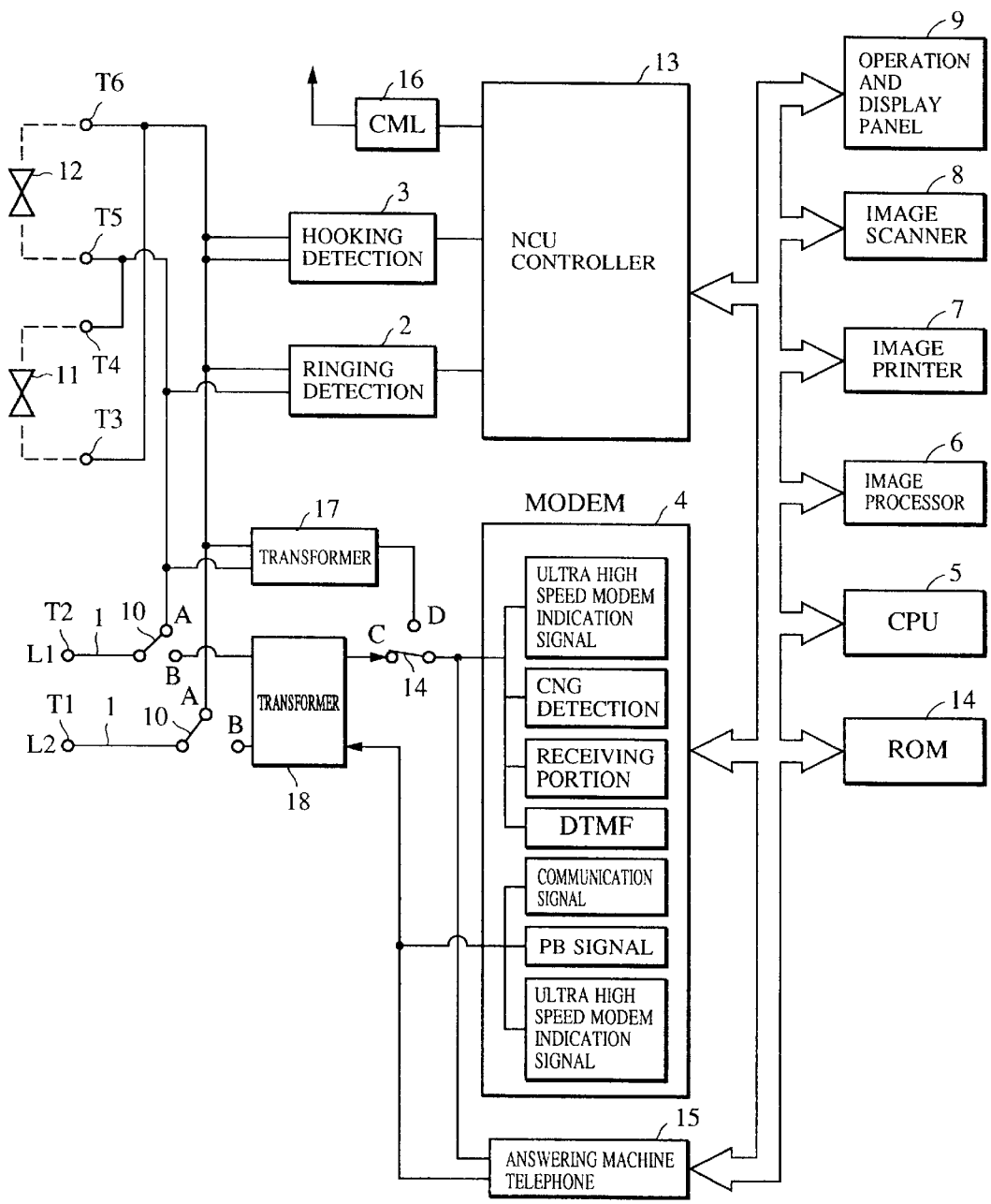
FIG. 15 is a block diagram illustrating the structure of a facsimile machine according to third and fourth embodiments of the present invention.

FIG. 15 is a block diagram illustrating the facsimile machine with the telephone having the answering machine capability according to the third embodiment.

In this figure, a connector 1 ($T_1$, $T_2$) is used to connect the facsimile machine to a telephone line $L_1$, $L_2$. A ringing signal detection circuit 2 detects a ringing signal coming via the line. A hooking detection circuit 3 is used to detect the hooking state of telephones 11 and 12. A modem 4 is a circuit for modulating and demodulating a facsimile signal thereby transmitting and receiving it. It also has the capability of detecting a CNG signal or an ultra high speed capability signal generated by a facsimile machine at a calling end. Furthermore, the modem 4 has the capability of detecting a DTMF signal transmitted from the calling party or generated by the telephone 11 or 12.

A CPU 5 controls the operation of the entire equipment. An image processor 6 performs various image processing on image data. An image printer 7 prints data such as a received image on recording paper. An image scanner 8 scans a document to be transmitted thereby reading the corresponding data. A control and display panel 9 includes a keyboard via which an operator can input various kinds of information and also includes a LCD for displaying various kinds of information. Telephones 10 and 11 are an external telephone or an answering machine telephone. There are also provided connectors $T_3$, $T_4$, $T_5$, $T_6$ for connecting the equipment to the telephone or answering machine telephone.

An NCU controller 13 controls the switching operation of a switch 10 via a CML relay 16. An incoming signal received via the telephone line is input to the modem 4 via the switch 10 and a switch 14. When switch 10 is at position A and switch 14 is at position D, the telephone line is connected to modem 4 by transformer 17. When switch 10 is at position B and switch 14 is at position C, the telephone line is connected to modem 4 by transformer 18.

A ROM is a memory for storing a program that controls the operation of the CPU 5 and also storing various messages that will be transmitted to a caller as required. Alternatively, the above messages may be stored in a RAM (not shown) so that the message can be modified if necessary.

Reference numeral 15 designates the answering machine telephone provided in the facsimile machine. The answering machine telephone 15 is connected to the telephone line as is the modem 4.

In this third embodiment of the invention, the equipment has four receiving modes as described below. First, there is a manual receiving mode in which an incoming call is handled manually via a handset-type telephone. A second mode is an automatic FAX/TEL selection mode in which the equipment automatically responds to an incoming call. In this mode, the called equipment judges whether the calling equipment is a facsimile machine or a telephone, and turns the switch 10 to the position B for a call from a facsimile machine and to the position A for a call from a telephone. In a third mode or an automatic receiving mode, all incoming calls are automatically connected to a facsimile machine. The fourth mode is an answering machine mode in which an incoming call is connected to the built-in answering machine telephone. The equipment can be set in a desired mode selected from these four modes via the keyboard of the control and display panel 9.

Now, the receiving operation according to the third embodiment of the invention will be described below. In this embodiment, operations in modes other than the answering machine mode are performed in the same manner as in the first and second embodiments, and thus only the operation in the answering machine mode will be described below.

In the following discussion, it is assumed that the switch 10 is at the position A when the equipment is in a waiting state. It is also assumed that the answering machine mode has been selected via the control panel 9.

Figure 16:
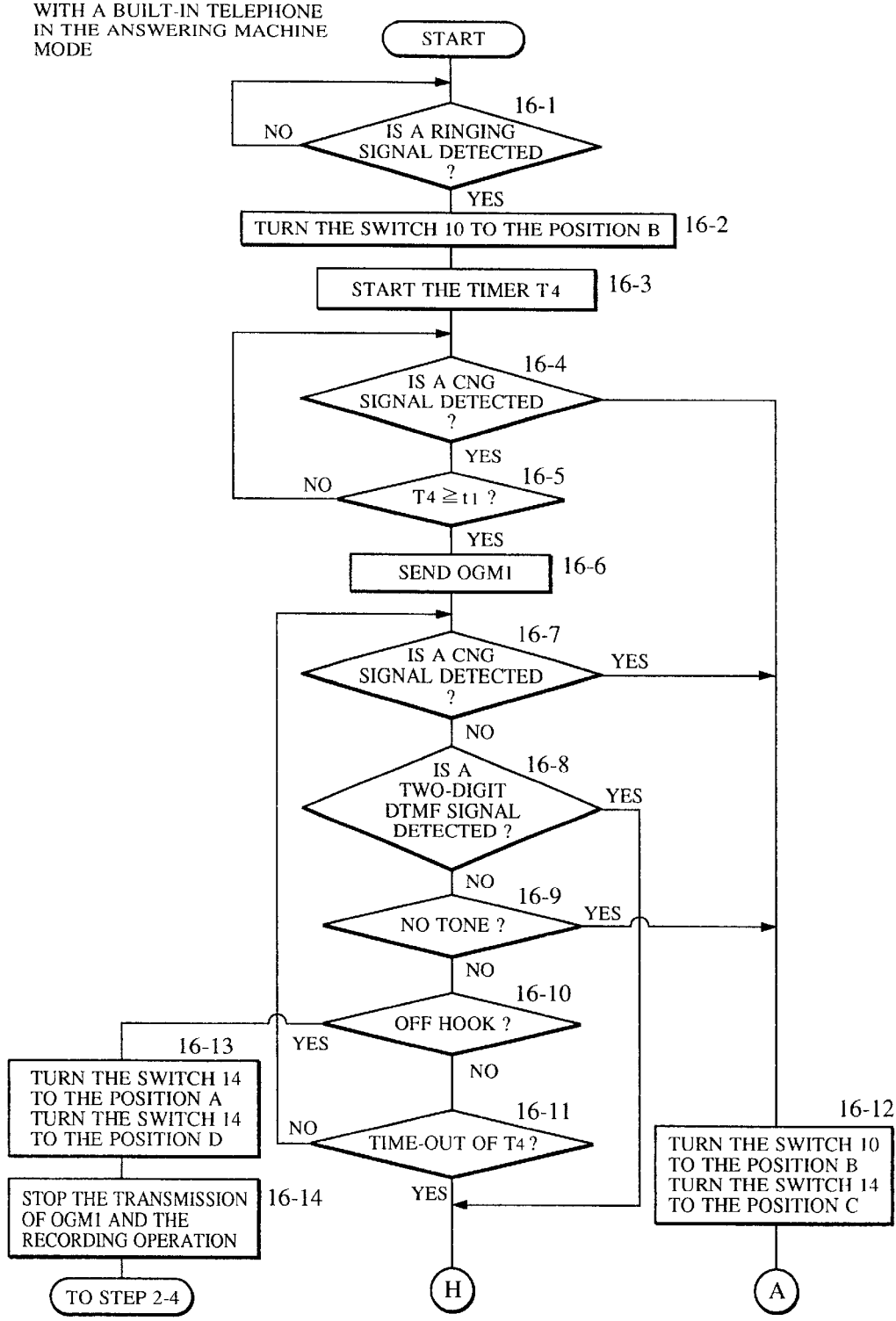
FIG. 16 is a flow chart illustrating a process performed in an internal answering machine telephone mode according to the third embodiment of the present invention.
Figure 17:
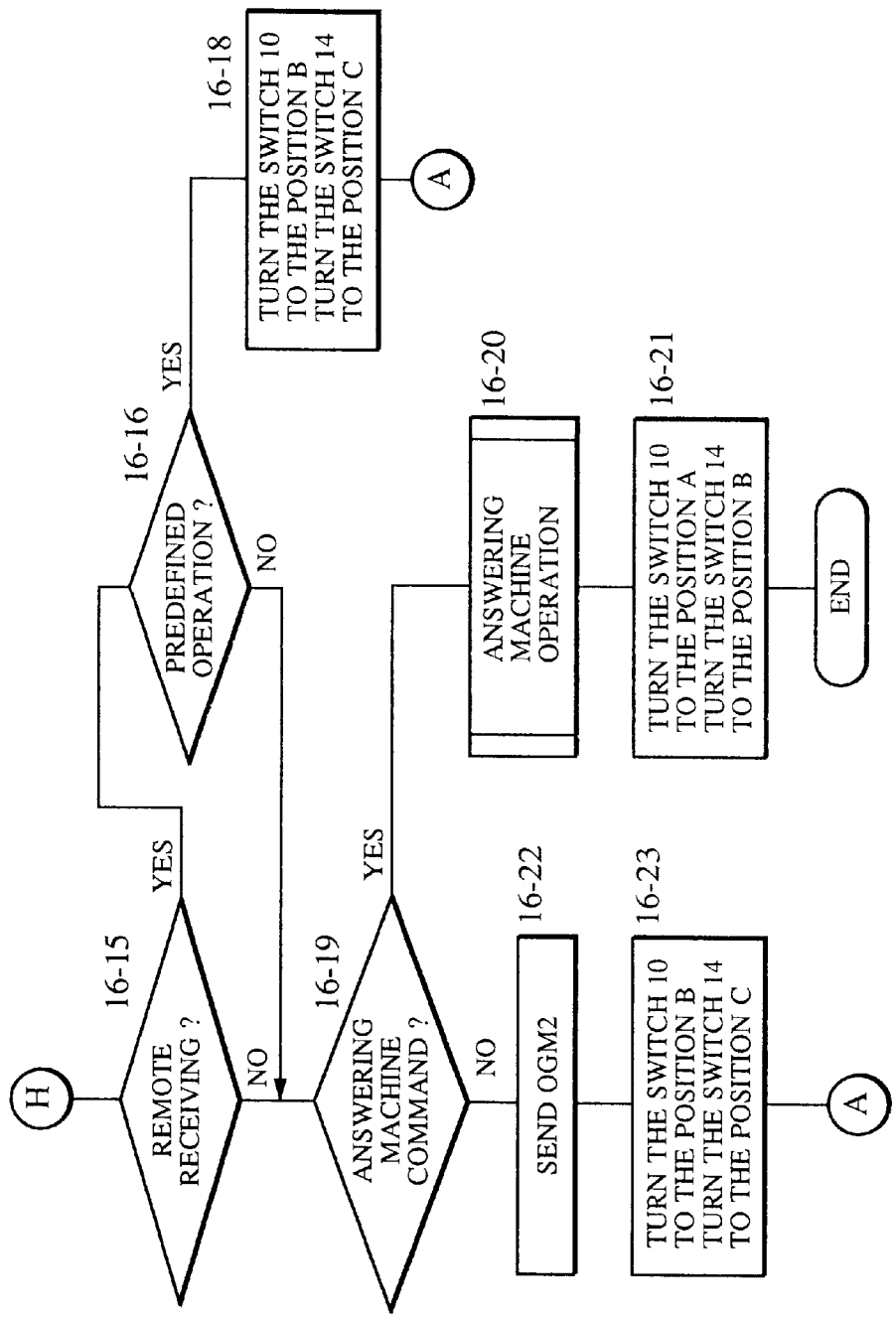
FIG. 17 is a flow chart illustrating a process performed in the internal answering machine telephone mode according to the third embodiment of the present invention.
Figure 18:
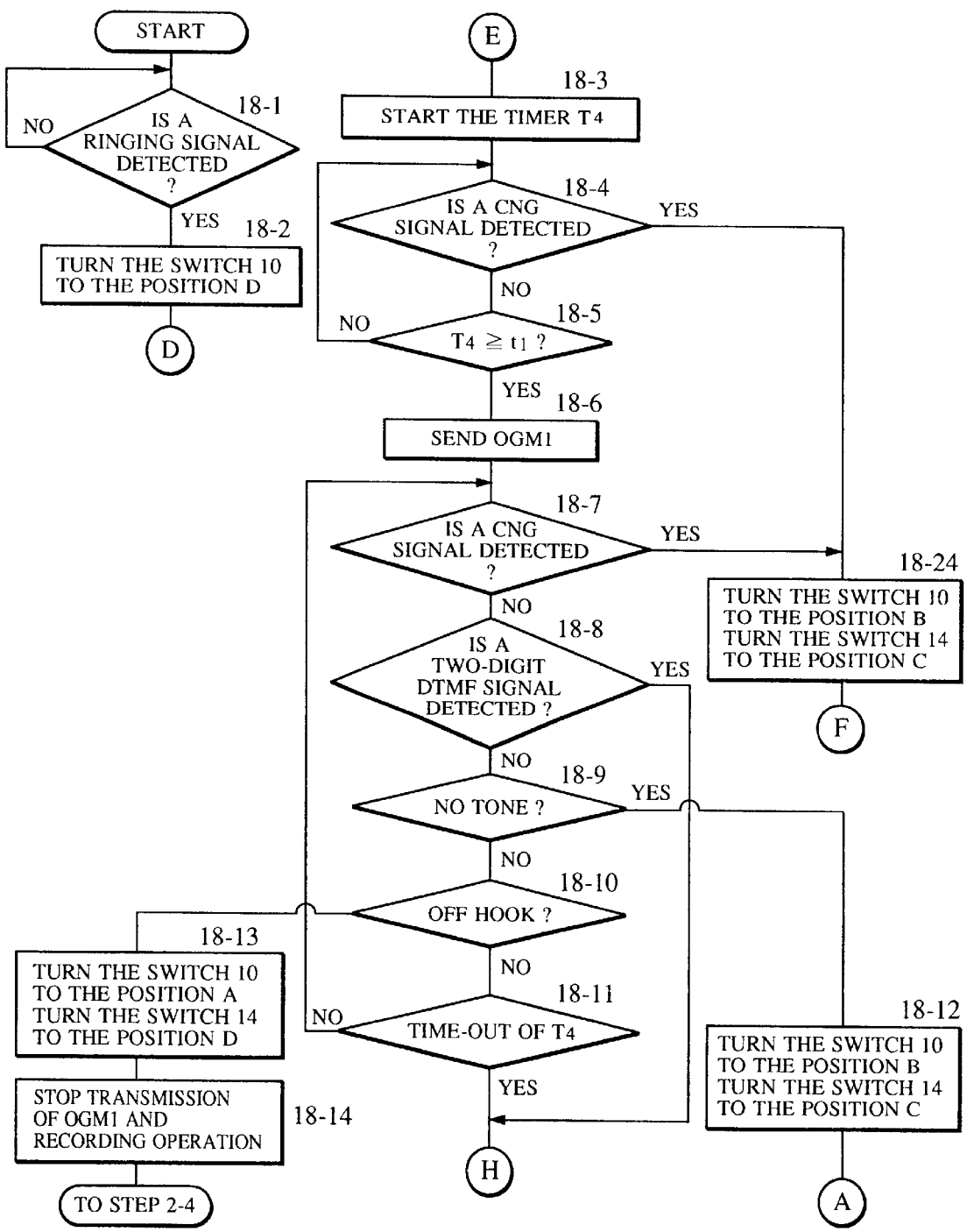
FIG. 18 is a flow chart illustrating a process performed in an internal answering machine telephone mode according to the fourth embodiment of the present invention.
Figure 19:
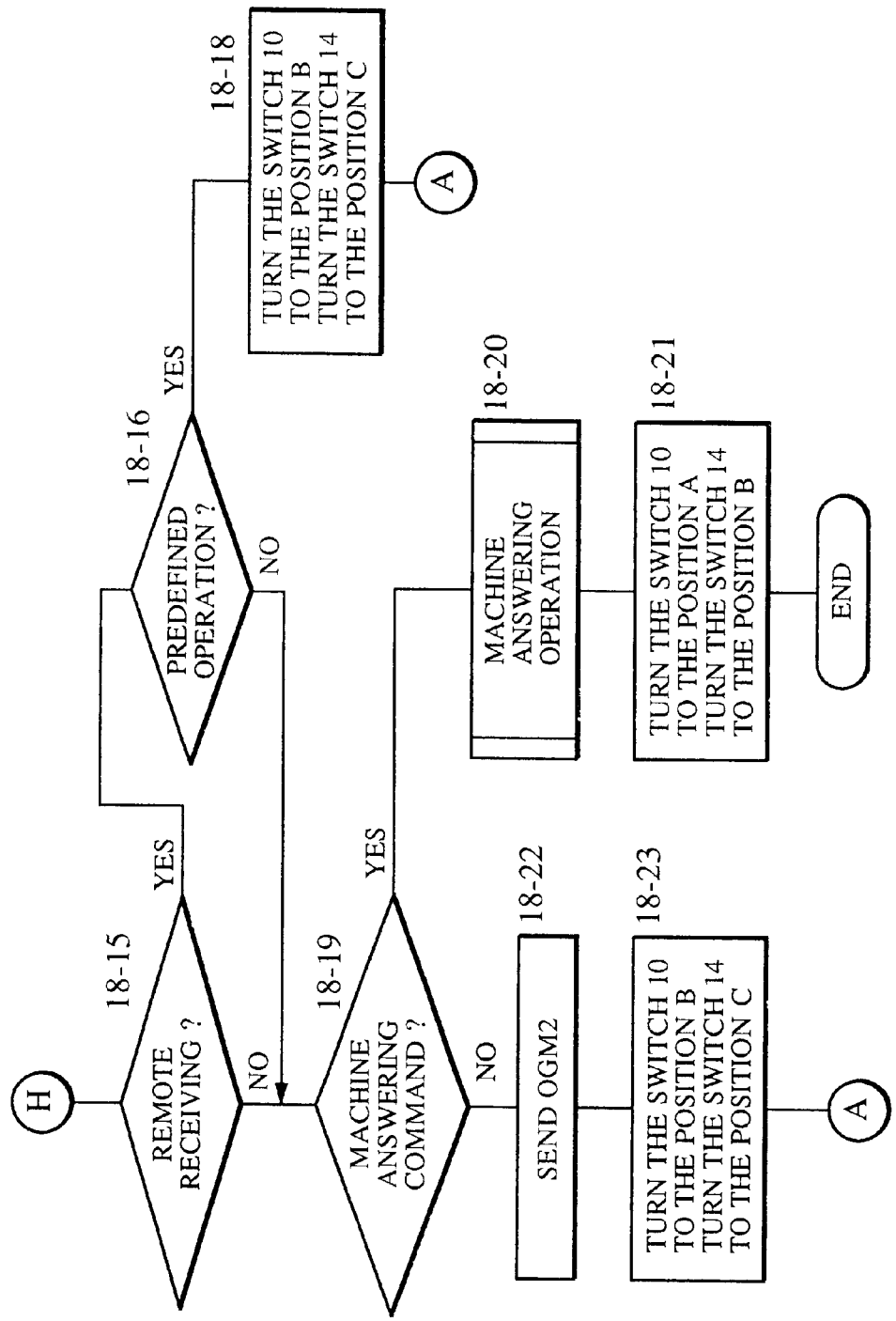
FIG. 19 is a flow chart illustrating a process performed in the internal answering machine telephone mode according to the fourth embodiment of the present invention.

Referring to the flow charts shown in FIGS. 16 and 17, the internal answering machine telephone will be described.

The CPU 5 monitors the output of the ringing signal detection circuit 2. If the CPU 5 detects a ringing signal coming via the line $L_1$, $L_2$ (16-1), the CPU 5 turns the switch 10 to the position B The timer $T_4$ is then started (16-4), thereby starting an operation of monitoring the arrival of a CNG signal via the CNG detection circuit of the modem 4 (16-4). If a CNG signal is detected the switch 10 is turned to the position B and the switch 14 to the position C (19-12), and the process shown in FIG. 3 is performed.

If the count of the timer has reached $t_1$ (1.8 sec to 3 sec) (16-5), the built-in answering machine telephone 15 transmits an OGM1 to an operator at a calling end (16-6). This message states for example "This is *****. The machine is now answering. You can leave a message or if you want to transmit some facsimile data, you can start the operation."

The CNG signal is monitor,ed again (16-7), and if a CNG signal is detected, the procedure goes to step 16-12.

If a CNG signal has not be en detected, it is determined whether the DTMF detection circuit of the modem 4 has received a two-digit DTMF signal generated by the calling end (16-8). If a two-digit DTMF signal has been received, the signal is considered to be either an answering machine telephone command or a remote receiving command, and thus the monitoring of the CNG signal is no longer performed.

The monitoring of the CNG signal is stopped so as to prevent a possible problem that when the answering machine telephone command that has been received is such a command requesting reproduction of the contents recorded in an answering machine telephone, if the contents recorded in the telephone include a CNG signal then the modem 4 will detect the reproduced CNG signal and, as a result, the operation mode will be switched to the facsimile mode.

Then it is determined whether the equipment is set in the remote receiving mode (16-15). If yes, then it is judged whether the operation is performed according to the predefined procedure (16-16). If it is concluded that the operation has been performed according to the predefined procedure, then the switch 10 is turned to the position B and the switch 14 to the position C so that the facsimile operation can be started. After that, the process shown in FIG. 3 is performed.

If the equipment is not set in the remote receiving mode or if the operation performed is not consistent with the predefined procedure, then it is judged whether the command is a remote control command associated with the answering machine telephone (16-19). If yes, the answering machine telephone is controlled according to the contents of the command (16-20). After that, the switch 10 is turned to the position A and the switch 14 is turned to the position B (16-21) so that the line is released, and thus the procedure is completed.

In the case where a two-digit DTMF signal has not been detected (16-8), it is checked whether no tone is present (16-9). If it is concluded that there is no tone, the switch 10 is turned to the position B and the switch 14 to the position C (16-12). Then the process for receiving facsimile data is performed according to the flow chart shown in FIG. 3. If there is some tone, the message is recorded and it is judged whether either external telephone is in an off-hook state (16-10). If either external telephone is in an off-hook state, the switch 10 is turned to the position A and the switch 14 to the position D. Furthermore, in this case, If the operation is in the middle of transmission of the OGM1, then the transmission of the OGM1 is stopped. If the operation is in the middle of recording of a received message, the recording operation is stopped (16-14). Then, the procedure goes to step 2-4 so that the operation mode is switched to the voice communication mode.

If no telephone is in an off-hook state, the process returns to step 16-9 so as to repeatedly perform the above steps until the timer $T_4$ has expired. If the timer has expired the process goes to step 16-15.

If the decision results in steps 16-15, 16-16, 16-17 are all no, then a OGM2 is transmitted. The OGM2 states for example "There is no response. If you want to transmit some facsimile data, you can start the operation now.", or "If you want to transmit some facsimile data, you can start the operation now." Furthermore, the switch 10 is turned to the position B and the switch 14 to the position C (16-23), and then the process shown in FIG. 3 is performed.

When an operator at a calling party desires voice communication, the above-described operation mode has an advantage that when the call is;received an ultra high speed capability indication signal that will be uncomfortable for the operator at the calling party is not transmitted from the called end, and voice communication can be started after some message. Thus, the operator at the calling party never misunderstands that the equipment at the called party is a facsimile machine having no capability of voice communication. Furthermore, after the completion of the recording operation of a message, if it is desired to perform facsimile transmission operation under the conditions in which the answering machine telephone no longer responds, the facsimile data can be transmitted via the ultra high speed modem.

If a voice communication request signal together with the ultra high speed capability indication signal is transmitted to the caller, then the called equipment can respond quickly to a request issued by the calling party and thus the operation mode can be switched quickly to the telephone mode. Furthermore, if the voice communication request signal is employed, quick switching to the voice communication mode can be achieved regardless of the current operation mode (automatic receiving mode, automatic FAX-TEL selection mode, answering machine telephone mode) of the facsimile machine.

A fourth embodiment of the present invention will be described below.

The third embodiment, as described above, has an advantage that when the receiving operation mode is set in the answering machine mode, if a call from an operator who desires voice communication has-arrived, the operation mode of the called equipment can be switched to the voice communication mode without sending an ultra high speed capability indication signal to the calling equipment, and thus the operator at the calling end does not encounter an uncomfortable signal tone and there occurs no misunderstanding that might otherwise arise from the signal tone. However, in this third-embodiment, the switching to the facsimile mode is performed after having detected a CNG signal generated from the calling equipment, and thus there occurs a certain time delay in the transition to the facsimile mode, which causes an increase in the communication cost for the calling party.

In view of the above, in this fourth embodiment, an ultra high speed capability indication signal is transmitted to calling equipment immediately after the reception of a call. Although this arrangement has a disadvantage that an operator at the calling end encounters an uncomfortable signal tone, it has an advantage that communication can be performed at a lower cost.

In this fourth embodiment, the operations in the manual receiving mode and automatic receiving mode are performed in the same manner as in the first embodiment, and the operation in the automatic FAX-TEL selection mode is performed in the same manner as in the second embodiment, and thus these operation modes are not discussed here again. Furthermore, the structure of the equipment is also the same as that used in the third embodiment (refer to FIG. 15), and thus no duplicated description will be given here.

Referring to the flow charts shown in FIGS. 11, 12, 18, and 19, the answering machine mode according to the fourth embodiment will be described.

In this discussion, it is assumed that the answering machine mode has been selected via the control panel 9.

In this state, the CPU 5 monitors the output of the ringing signal detection circuit 2. If the CPU 5 detects a ringing signal coming via the line $L_1$, $L_2$ (18-1), the CPU 5 turns the switch 10 to the position B (18-2).

An ultra high speed capability indication signal is then transmitted to the facsimile machine at the calling end to notify it that the called facsimile machine can transmit data via an ultra high speed modem (at 28.8 kbps) (11-1).

To determine whether the calling facsimile machine has the capability of an ultra high speed modem, the ultra high speed capability signal detection timer $T_1$ is started (11-2) thereby starting an operation of detecting a signal representing the capability of the ultra high speed modem of the calling equipment (11-3). If the signal is detected, the modem capability of the calling equipment is then determined from the detected signal, and an ultra high speed capability signal is transmitted so as to notify the calling equipment of the optimum mode available in the ultra high speed modem of the called equipment (11-5). Image data transmission is then performed (11-6). When all data has been received, the switch 10 is turned to the position A and the switch 14 is turned to the position C (11-7), and thus the communication is completed. Exchanges detect this ultra high speed capability signal and select proper communication lines having the capability of a high sampling rate.

In the above procedure, the output of the CNG signal detection circuit is neglected during a time period in which the timer $T_1$ is active. The neglecting of the CNG signal during that time period is required for the following reason. During a certain time period just after the arrival of a call, the calling equipment transmits a CNG signal probably before detecting an ultra high speed capability indication signal transmitted from the called end. If it is determined erroneously from this CNG signal that the calling equipment is a conventional-type high speed modem machine, then ultra high speed communication becomes impossible even if the calling equipment actually has the capability of ultra high speed communication.

In the case where an ultra high speed capability signal has not been detected during the time period $T_1$ (11-14), the switching operation is performed so that the arrival of a CNG signal can be monitored. The timer $T_4$ is then started (18-4), and the arrival of a CNG signal is monitored via the CNG detection circuit of the modem 4 (18-4). If a CNG signal is detected the switch 10 is turned to the position B and the switch 14 to the position C (18-24).

In this example, however, the calling facsimile machine does not respond to the ultra high speed capability signal, and thus it is assumed that the facsimile machine at the calling end is conventional-type equipment that operates at a modem speed of 14.4 kbps or. at 9600 bps. Thus, a CED or DIS signal (initial identification signal) is sent to the facsimile machine at the calling end according to the conventional G-3 facsimile standards (12-1).

Then, a timer $T_2$ is started, thereby starting an operation of detecting transmission and reception command signals (DTS, DCS) generated by the facsimile machine at the calling end (12-2). If either a transmission command signal or reception command signal transmitted from the facsimile machine at the calling end is detected (12-3), a precursory procedure is performed according to a protocol known as T.30 of ITU-T (12-5), and image data transmission is then performed (12-6). After the completion of the communication the switch 10 is turned to the position A and the switch 14 to the position C (12-7), and thus all procedure is completed.

In the above procedure, even in the case in which calling equipment is set in a mode other than an automatic calling mode, there is a possibility that a CNG signal is transmitted. If a CNG signal arrives after a rather long time has passed since the start of the call, that CNG signal was generated probably because the operator of the calling party pressed the starting key of his/her facsimile machine after he/she received an ultra high speed capability indication signal. In this case, the calling facsimile machine can be such a machine having an ultra high speed modem. Thus, the procedure may be modified such that if the first CNG signal arrives when 5 sec, for example, has passed since the start of the call, an ultra high speed capability indication signal may be transmitted again.

If the count of the timer has reached $t_1$ (1.8 sec to 3 sec) (18-5), the built-in answering machine telephone 15 transmits an OGM1 to an operator at a calling end (18-6). This message states for example "This is *****. The machine is now answering. You can leave a message or if you want to transmit some facsimile data, you can start the operation."

The CNG signal is monitored again (18-7), and if a CNG signal is detected, the procedure goes to step 18-24.

If a CNG signal has not been detected, it is determined whether the DTMF detection circuit of the modem 4 has received a two-digit DTMF signal generated by the calling end (18-8). If a two-digit DTMF signal has been received, the signal is considered to be either an answering machine telephone command or a remote receiving command, and thus the monitoring of the CNG signal is no longer performed.

The monitoring of the CNG signal is stopped so as to prevent a possible problem that when the answering machine telephone command that has been received is such a command requesting reproduction of the contents recorded in an answering machine telephone, if the contents recorded in the telephone include a CNG signal then the modem 4 will detect the reproduced CNG signal and, as a result, the operation mode will be switched to the facsimile mode.

Then it is determined whether the equipment is set in the remote receiving mode (18-15). If yes, then it is judged whether the operation is performed according to the predefined procedure (18-16). If it is concluded that the operation has been performed according to the predefined procedure, then the switch 10 is turned to the position B and the switch 14 to the position C so that the facsimile operation can be started. After that, the process shown in FIG. 3 is performed.

An ultra high speed capability indication signal is transmitted again because there is a possibility that the operator of the calling party may press the starting key of his/her facsimile machine having the capability of an ultra high speed modem after a certain time has passed since the start of the call.

If the equipment is not set in the remote receiving mode or if the operation performed is not consistent with the predefined procedure, then it is judged whether the command is a remote control command associated with the answering machine telephone (18-19). If yes, the answering machine telephone is controlled according to the contents of the command (18-20). After that, the switch 10 is turned to the position A and the switch 14 is turned to the position B (18-21) so that the line is released, and thus the procedure is completed.

In the case where a two-digit DTMF signal has not been detected (18-8), it is checked whether no tone is present (18-9). If it is concluded that there is no tone, the switch 10 is turned to the position B and the switch 14 to the position C (18-12). Then the process for receiving facsimile data is performed according to the flow chart shown in FIG. 3.

In the above procedure, an ultra high speed capability indication signal is transmitted again because the calling facsimile machine can be such a machine having the capability of an ultra high speed modem as discussed above.

If there is some tone, the message is recorded and it is judged whether either external telephone is in an off-hook state (18-10). If either external telephone is in an off-hook state, the switch 10 is turned to the position A and the switch 14 to the position D (18-13). Furthermore, in the case, If the operation is in the middle of transmission of the OGM1, then the transmission of the OGM1 is stopped. If the operation is in the middle of recording of a message, the recording operation is stopped (18-14). Then, the procedure goes to step 2-4 so that the operation mode is switched to the voice communication mode.

If no telephone is in an off-hook state, the process returns to step 18-11 so as to repeatedly perform the above steps until the timer $T_4$ has expired. If the timer has expired the process goes to step 18-15.

If the decision results in; steps 18-15, 18-16, 18-17 are all no, then a OGM2 is transmitted. The OGM2 states for example "There is no response. If you want to transmit some facsimile data, you can start the operation now.", or "If you want to transmit some facsimile data, you can start the operation now."

Furthermore, the switch 10 is turned to the position B and the switch 14 to the position C (18-23), and then the process shown in FIG. 3 is performed.

An ultra high speed capability indication signal is transmitted again because the calling facsimile machine can be such a machine having the capability of an ultra high speed modem as discussed above.

In this technique, a quick start of the ultra high speed modem communication is possible because an ultra high speed capability indication signal is transmitted immediately after a call has been received. As a result, the communication cost can be reduced. Furthermore, if the calling equipment has the capability of an ultra high speed modem, the ultra high speed communication results in a further reduction in the communication cost. Furthermore, after the completion of the recording operation of a message, if it is desired to perform facsimile transmission operation under the conditions in which the answering machine telephone no longer responds, the facsimile data can be transmitted via the ultra high speed modem.

If a voice communication request signal together with the ultra high speed capability indication signal is transmitted to the caller, then the called equipment can respond quickly to a request issued by the calling party and thus the operation mode can be switched quickly to the telephone mode. Furthermore, if the voice communication request signal is employed, quick switching to the voice communication mode can be achieved regardless of the current operation mode (automatic receiving mode, automatic FAX-TEL selection mode, answering machine telephone mode) of the facsimile machine.

Figure 20:
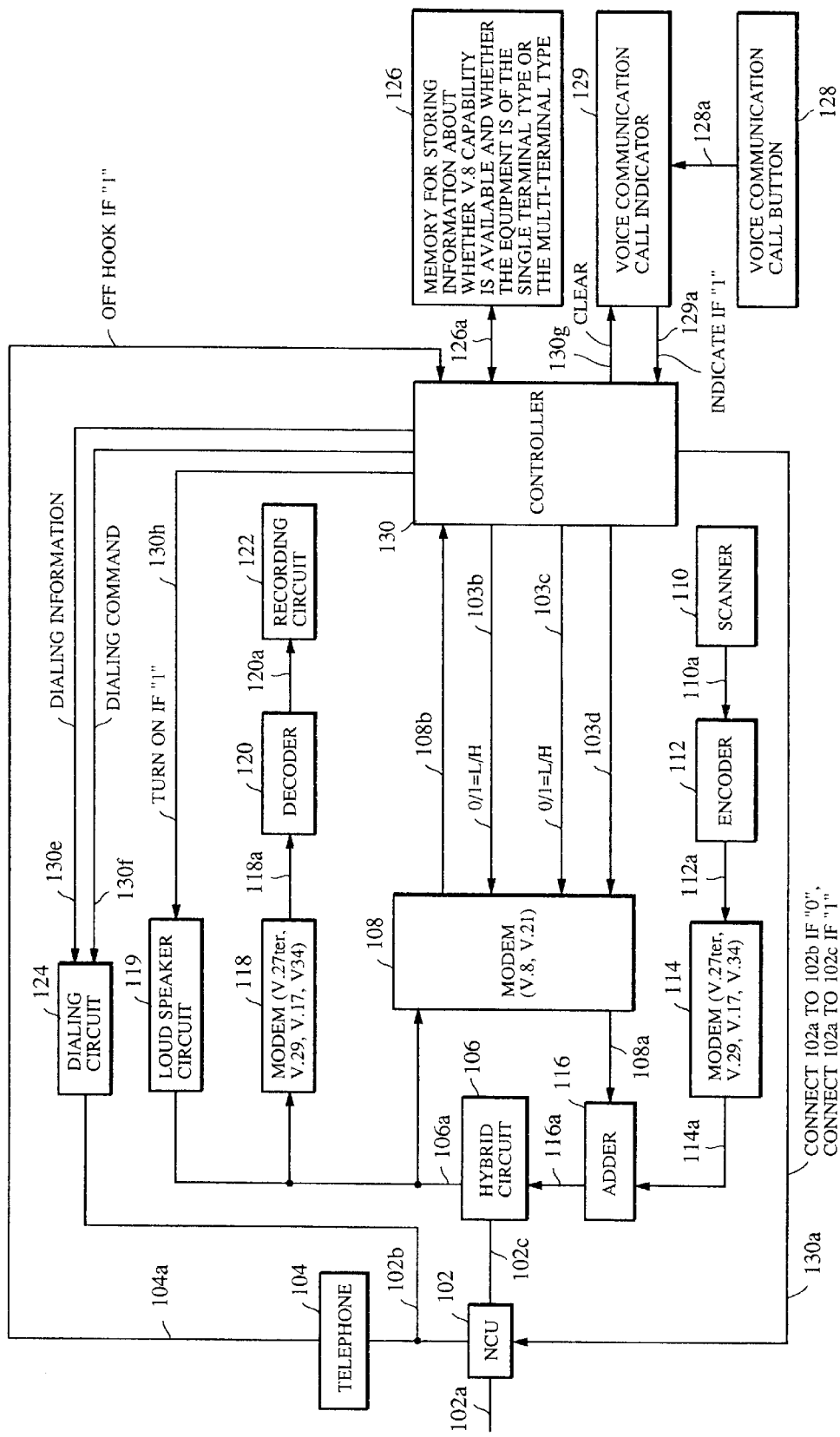
FIG. 20 is a block diagram illustrating the structure of a facsimile machine according to a fifth embodiment of the present invention.

Furthermore, the third and fourth embodiments may be combined in such a manner that a user can select desired functions via keys (not shown) of the control panel 9. In a fifth embodiment of the invention described below, when a facsimile machine is connected to a line, it is judged whether or not a signal according to the V.8 protocol is received, and the following procedure is performed according to either V.8 or the conventional G-3 facsimile scheme depending on the above judging result. FIG. 20 is a block diagram illustrating the structure of a facsimile machine according to the fifth embodiment of the present invention.

In this figure, an NCU (network control unit) 102 is connected to a terminal of a line so as to achieve data communication via a telephone network. The NCU 102 performs various kinds of control regarding the connection via a telephone exchange network, switching to a data communication line, holding a loop, etc. A signal line 102*a* is a telephone line. If the NCU 102 receives a "0" level signal via a signal line 130*a*, the NCU connects the telephone line to a telephone 104, that is, the signal line 102*a* is connected to a signal line 102*b*. On the other hand, if the NCU 102 receives a "1" level signal via the signal line 130*a*, then the NCU connects the telephone line to a facsimile machine, that is, the signal line 102*a* is connected to a signal line 102*c*. In a normal state, the telephone line is connected to the telephone 104.

When the telephone 104 is in an off-hook state, a "1" level signal is output over a signal line 104*a*. If the telephone 104 is in an on-hook state, the signal line 104*a* is at a "0" level. A hybrid circuit 106 isolates a transmission signal from a reception signal. A transmission signal on a signal line 116*a* is transferred onto the signal line 102*c* and then transmitted over the telephone line via the NCU 102. On the other hand, if the hybrid circuit receives an incoming signal via the NCU 102 and the signal line 102*c*, it transfers the received signal onto a signal line 106*a*.

A modem 108 is a V.8-modem, that is, the modem 108 can operate according to the V.8 protocol that is expected to be established as a recommended protocol. This V.8-modem has such a capability that both V.21(L) channel (FSK between 980 Hz and 1180 Hz) and V.21(H) channel (FSK between 1650 Hz and 1850 Hz) can operate in a full-duplex fashion. According to the V.8 procedure, identification of a terminal, negotiation associated with the modem type, and other required processes are performed.

The V.8-modem 108 performs a receiving operation in such a manner that if the signal line 130b is at a "0" level, the V.8-modem 108 demodulates the signal at the signal line 106a using the V.21(L) channel, and if the signal line 130b is at a "1" level, the V.8-modem 108 demodulates the signal at the signal line 106a using the V.21(H) channel, and then V.8-modem 108 outputs demodulated data over the signal line 108b.

Similarly, the V.8-modem 108 performs a transmitting operation in such a manner that if the signal line 130c is at a "0" level, the V.8-modem 108 modulates the signal at the signal line 130d using the V.21(L) channel, and if the signal line 130c is at a "1" level, the V.8-modem 108 modulates the signal at the signal line 130d using the V.21(H) channel, and then V.8-modem 108 outputs modulated data over the signal line 108a. The signal issued by a called party is transmitted to a calling party via the V.21(H) channel, and the signal from the calling party to the called party is received via the V.21(L) channel.

A scanner 110 scans a document to be transmitted in the main scanning direction and thus reads an image signal line to line thereby generating a series of signals each consisting of a binary value representing black or white. The scanner includes an image sensing device such as a CCD (charge coupled device) and an optical system. The series of binary signals each representing white or black is output onto the signal line 110a.

An encoder 112 receives the input data via the signal line 110a and performs coding (MH coding, MR coding, MMR coding) on the received data. The resultant coded data is output over a signal line 112a.

A modulator 114 operates according to a conventional procedure such as ITU-T Recommendation V.27ter (differential phase modulation), V.29 (quadrature modulation), V.17, V.34, etc. The modulator 114 receives a signal via the signal line 112a and performs modulation on it. The modulated signal is output onto a signal line 114a.

An adder 116 receives signals via the signal lines 108a and 114a, and outputs the sum of these signals onto the line 116a.

A demodulator 118 performs demodulation according to a conventional procedure such as ITU-T Recommendation V.27ter (differential phase modulation), V.29 (quadrature modulation), V.17, V.34, etc. The demodulator 118 receives a signal via the signal line 106a and demodulates the received signal. The demodulated signal is then output onto a signal line 118a.

When the signal line 130h is at a "1" level, a loud speaker circuit 119 turns on a loud speaker so that a loud speaker outputs information supplied via the signal line 106a. If the signal line 130h is at a "0" level, the loud speaker circuit 119 turns off the loud speaker.

A decoder 120 receives data via the signal line 118a and performs decoding (MH decoding, MR decoding, MMR decoding) on the received data. The decoded data is output onto a signal line 120a.

A printing circuit 122 receives data via the signal line 120a, and prints the data line to line at a constant rate.

In response to a dialing command pulse on a signal line 130f, a dialing circuit 124 inputs dialing information via a signal line 130e and outputs a selection signal onto the signal line 102b.

A memory 126 stores dialing information associated with, for example, a hundred parties numbered 00 to 99. The memory 126 also stores information representing whether parties corresponding to the above dialing information have the capability of V.8. In the case where a party has the V.8 capability, the memory 126 further stores information representing whether the equipment of that party is of the single-terminal type or of the multi-terminal type. In any case, the information is stored into the memory 126 via a signal line 126a.

A voice communication call button 128 is used to select a normal voice communication call. If this button is pressed, a pulse is output onto a signal line 128a.

An indicator 129 is used to indicate whether a voice communication call is selected or not. When a clear pulse is generated onto a signal line 130g, the indicator 120 is turned off. After that, each time a pulse appears on the signal line 130g, the indicator 129 turns on and off alternatively such as turn on→off→on, . . . , etc. When the indicator 129 is in an on-state, the signal line 129a is at a "1" level. On the other hand, when the indicator is in an off-state, the signal line 129a is at a "0" level.

In this embodiment, when a calling operation is started, a controller 130 determines whether a party to be called has the V.8 capability judging from the information stored in the memory 126. If the party to be called has the V.8 capability, the controller transmits a signal (CI signal) representing the capability of the calling terminal according to the V.8 procedure. If the party does not have the V.8 capability, then the controller transmits a CNG signal instead of a CI signal. If it is not known whether the party to be called has the V.8 capability or not, a CI signal is transmitted first. Judging from the response to this signal, it is determined whether the party has the V.8 capability, and the result is stored. Using the CI signal, the calling party can notify the called party that the calling party has the V.8 capability. A CI signal is a FSK signal whose frequency shifts between 980 Hz and 1180 Hz.

FIGS. 21 to 25 are flow charts illustrating the operation according to the fifth embodiment of the present invention.

In step S42 (FIG. 21), a "0" level signal is supplied on the signal line 130a thereby turning off the CML. In step S43, a "0" level signal is supplied on the signal line 130h so that the loud speaker circuit 119 does not monitor the line.

Then, in step S44, it is judged whether a command is issued via a control panel (not shown), the command requesting to store information representing whether a party corresponding to dialing information has the V.8 capability. (In a modified embodiment described later, if the party has the V.8 capability it is also judged in this step whether or not there is a request to store information representing whether the party has equipment of the single-terminal type or the multi-terminal type.)

If yes, the procedure goes to step S46, and if no, the procedure goes to step S48.

In step S46, the information representing whether the party corresponding to the dialing information has the V.8 capability is stored into the memory 126 via the signal line 126a. For example, this registration is performed in such manner that if a party has the V.8 capability then abbreviated dialing information with a mark "*" following the above dialing information is stored, and if it does not have the V.8 capability then only the abbreviated dialing information with no mark is stored.

In step S48, it is judged whether a request to start a call is issued. If yes, then the procedure goes to step S52, and if no then the procedure goes to step S50 in which other processing will be performed.

In step S52, a dialing operation is performed by the dialing circuit 124 thereby making a call to a specified party. In step S54, it is judged whether the memory 126 includes information regarding the specified party. If the memory 126 includes the information, then it is possible to determine whether the party has the V.8 capability and thus the procedure goes to step S56. If the memory does not have the information regarding that party, then it is impossible to determine whether the party has the V.8 capability, and thus procedure goes to step S110.

In step S56, it is determined whether the party to be called has the V.8 capability judging from the information stored in the memory 126. If it turns out that the party to be called has the V.8 capability, then the procedure goes to step S58. If the party does not have the capability, then the procedure goes to step S78.

In step S58, a timer time of 40 sec is set in the timer T. Then, in step S60, a CI signal is transmitted via V.8-modem. At this stage, the modem 108 is set such that a transmission signal is transmitted via the V.21(L) channel, and a reception signal is received via the V.21(H) channel. The CI signal is transmitted when the called party has the V.8 capability.

In step S62, it is judged whether an ANSam signal according to the V.8 procedure is detected via the detection circuit in the V.8-modem 108. If a ANSam signal has been detected, then the procedure goes to step S70, and if a ANSam signal has not been detected, then the procedure goes to step S64.

In step S64, it is judged whether a CED signal is detected via the detection circuit in the V.8-modem 108. If a CED signal has been detected, then the procedure goes to step S74, and if a CED signal has not been detected, then the procedure goes to step S66.

In step S66, a signal is input via the V.21(H) channel. More specifically, the output signal 108b of the V.8-modem is input to the controller, and then it is judged whether a NSF/CSI/CSI/DIS signal has been detected. If yes, the procedure goes to step S74, and if no then the procedure goes to step S68.

In step S68, it is judged whether the timer $T_1$ has expired. If the timer has expired then the procedure returns to step S42. If the timer has not expired yet then the procedure returns to step S60.

In step S70, since a ANSam signal has been received and thus it has been decided that the following communication should be performed according to the V.8 protocol, a signal (CM signal) indicating the various capabilities of the calling equipment (at the transmitting end) is transmitted via the V.8-modem 108. Thus, in step S72, facsimile data is transmitted. After the completion of the facsimile data transmission, the procedure returns to step S42.

In step S74, since a CED signal or NSF/CSI/DIS signal has been detected in this case, the operation mode is switched such that the following operation will be performed according to the T.30 procedure. Then, in step S76, facsimile data is transmitted, and then the procedure returns to step S42.

In step S78 (refer to FIG. 23), the controller inputs information via the signal-line 129a, and judges whether the call is for voice communication. If it turns out that the call is for voice communication, then the procedure goes to step S94. If it is not for voice communication then the procedure goes to step S79.

In step S78, a timer time of 40 sec is set in the timer T. In step S80, a CNG signal is transmitted via a circuit (not shown). in this case, a CI signal is not transmitted, since the party to be called has not the capability of V.8.

Figure 22:
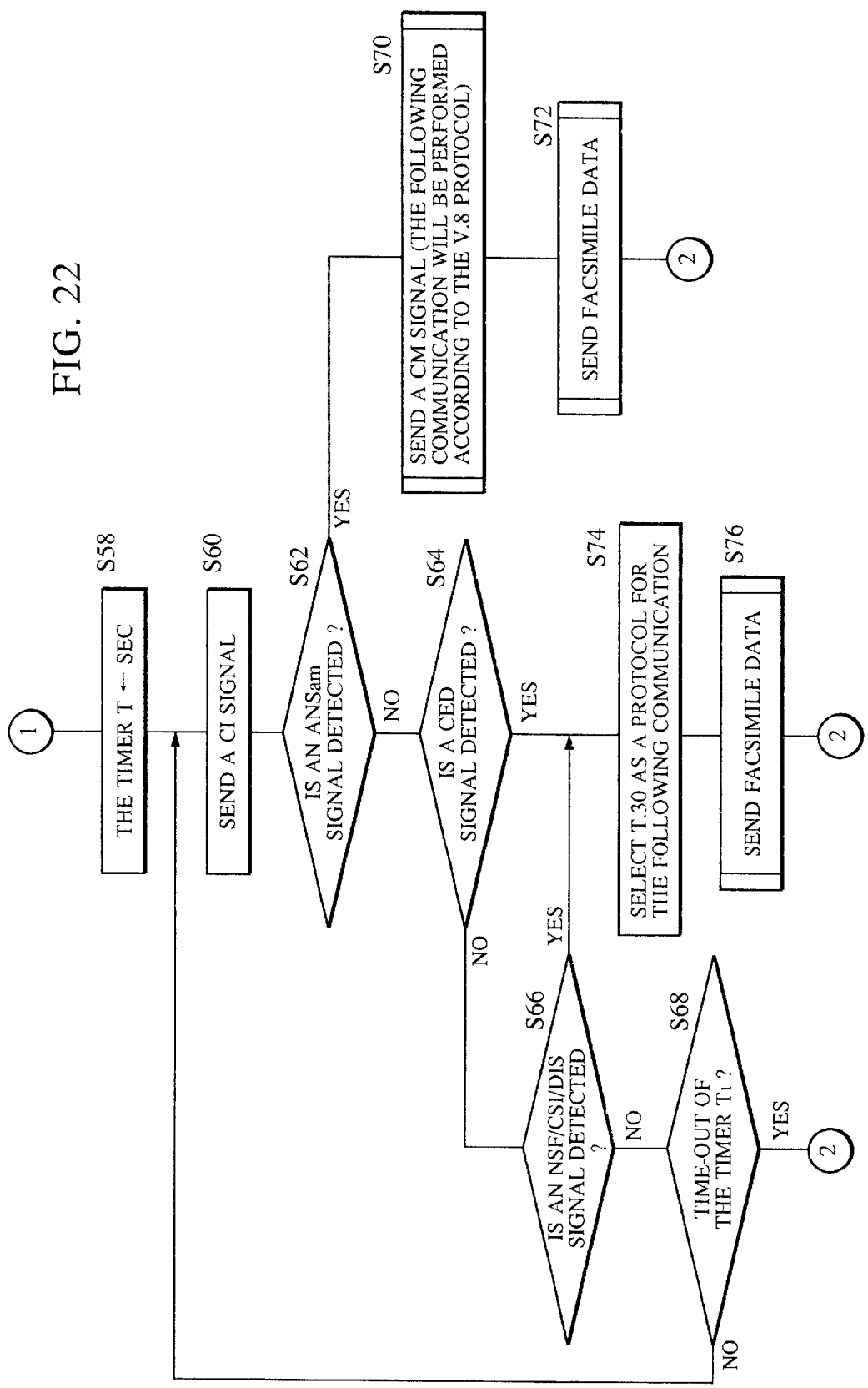
FIG. 22 is a flow chart illustrating an operation according to the fifth embodiment of the present invention.
Figure 23:
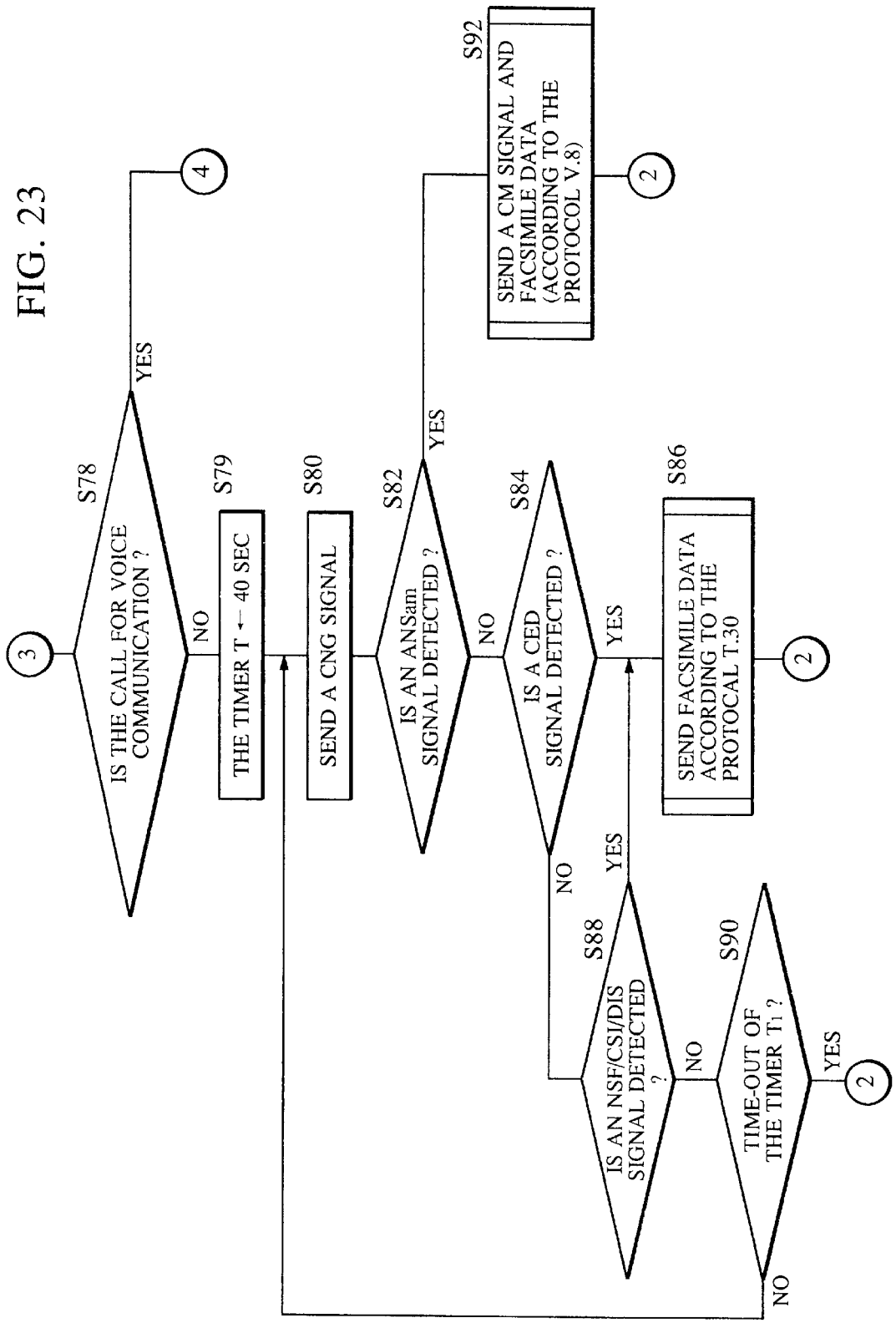
FIG. 23 is a flow chart illustrating an operation according to the fifth embodiment of the present invention.
Figure 24:
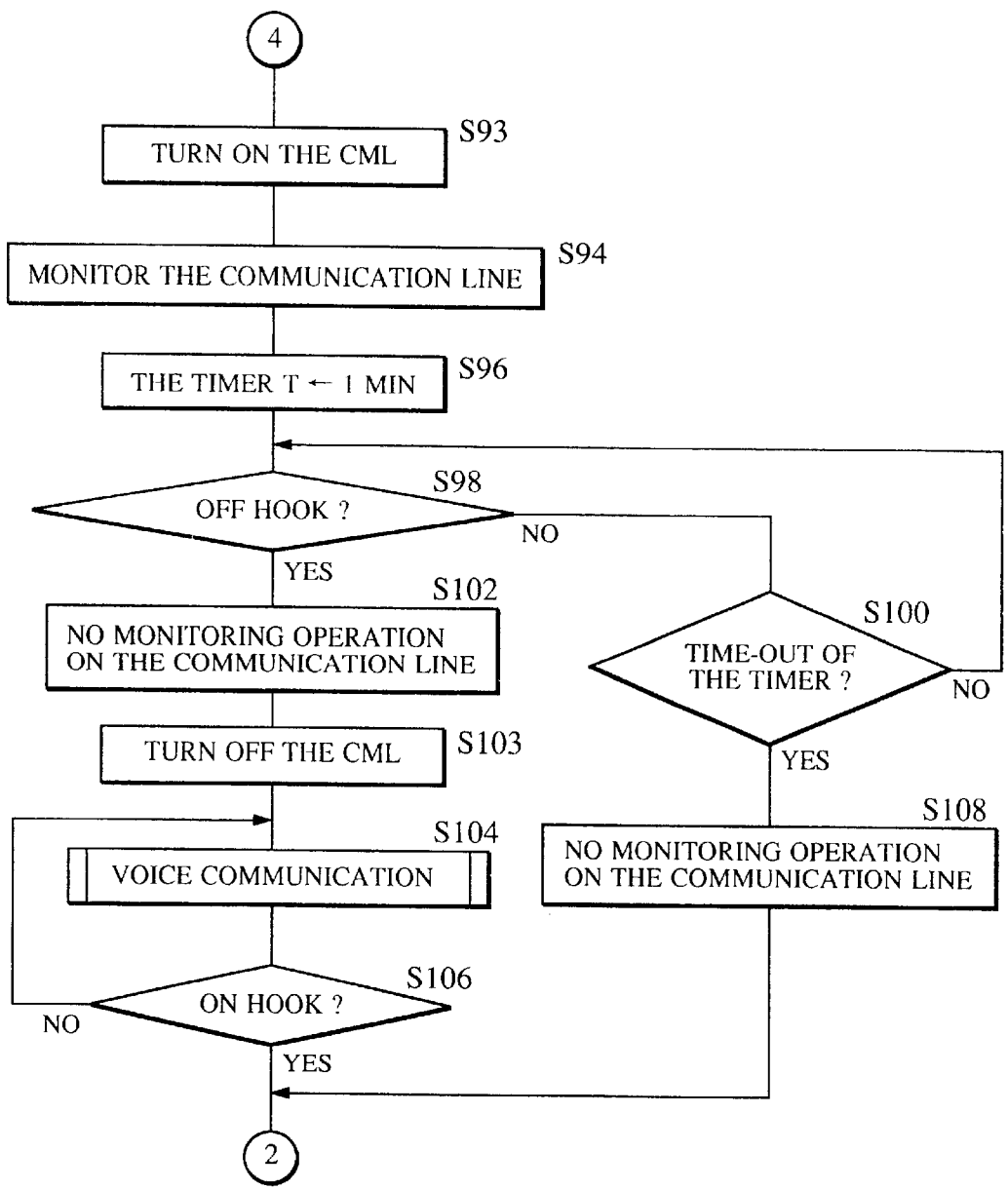
FIG. 24 is a flow chart illustrating an operation according to the fifth embodiment of the present invention.

Steps S82, S84, S86, S88, S90 and S92 correspond to steps S62, S64, S74 and S76, S66, S68, S70 and S72 of FIG. 22, respectively. That is, these steps are the same as those shown in FIG. 22 except that a CNG signal is transmitted instead of a CI signal. After these steps, the procedure returns to step S42. In the above procedure, the detection of a ANSam signal is performed in step S82 because it is required to respond to a ANSam signal which has be transmitted by a called party immediately after the reception of a call. In step S93, a "1" level signal is supplied on the signal line 130a so as to turn on the CML. In step S94, a "1" level signal is supplied on the signal line 130h so as to turn on the loud speaker circuit 119 so that the loud speaker circuit monitors the line signal. In step S96, a timer time of 1 min is set in the timer T.

In step S98, the controller inputs information via the signal line 104a, and judges whether an off-hook operation has occurred at the telephone. If yes, the procedure goes to step S102, and if no the procedure goes to step S100.

In step S100, it is judged whether the timer T has expired. If the timer has expired, the procedure goes to step S108. If the time has not expired yet, then the procedure goes to step S98 to continue the monitoring of the off-hook operation.

In step S102, a "0" level signal is supplied on the signal line 130h so as to turn off the loud speaker circuit 119 so that the loud speaker circuit does not monitor the line signal. In step S103, a "0" level signal is supplied on the signal line 130a so as to turn off the CML. Thus, in step S104, voice communication is performed.

In step S106, the controller inputs information via the signal line 104a, and judges whether an on-hook operation has occurred at the telephone. If yes, the procedure return to step S42. If no, the procedure continues the voice communication in step S104.

In step S110 and the following steps (FIG. 25), the procedure is performed for the case where although the party to be called has the V.8 capability the information associated with this party has not been registered yet. In this case, a CI signal is transmitted only when the communication with that party is performed for the first time. If a ANSam signal is, detected as a response, then the party is considered to have the V.8 capability, and if no ANSam signal is detected, then the party is considered to have no capability of V.8.

Steps S110, S112, and S114 correspond to steps S58, S60, and S62 of FIG. 22, respectively. In step S114, if a ANSam signal is detected, then the procedure goes to step S120 in which the information indicating that the party has the V.8 capability is stored in the memory 126, wherein the information is stored with relation to the dialing information. Then, the procedure goes to step S70.

In the case where an AN am signal is not detected, the procedure goes to step S116 in which information indicating that the party corresponding to the current dial information does not have the capability of V.8 is stored in the memory 126. Then the procedure goes to step S64.

Figure 25:
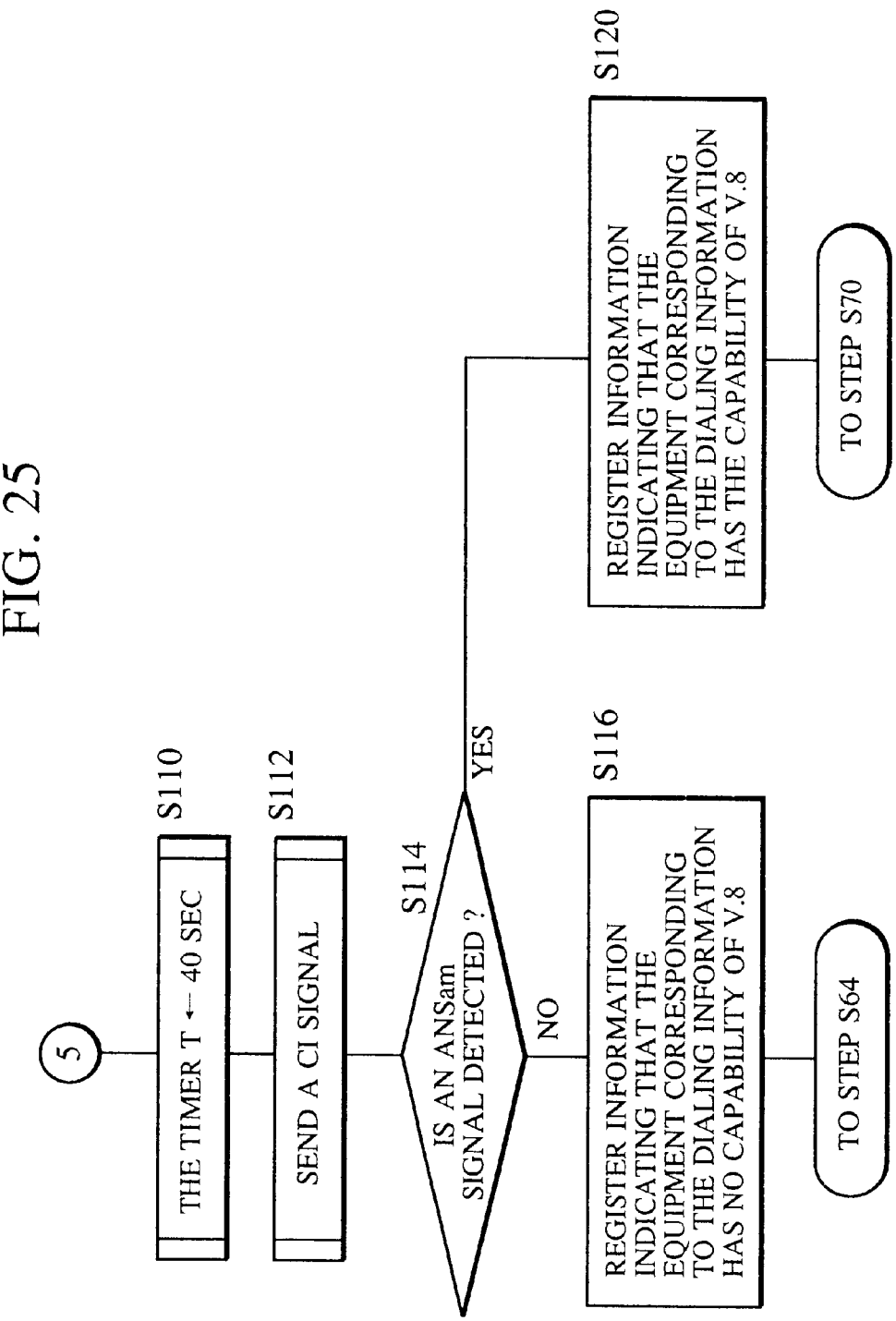
FIG. 25 is a flow chart illustrating an operation according to the fifth embodiment of the present invention.

The procedure shown in FIG. 25 is the same as that shown in FIG. 22 except that there are additional steps S116 and S120. In this case, the memory 126 includes no information about whether the party corresponding to the dial information used in the current call has the capability of V.8, and thus a CI signal is transmitted in the first call to that party. It is judged whether the party has the V.8 capability or not and the result is stored in the memory 126.

Now, a variation of the fifth embodiment will be described below.

In this variation, the above-described fifth embodiment is modified such that when a call for voice communication is performed to a party which has the V.8 capability, if the party has equipment of the multi-terminal type then a CI signal is transmitted, and if the equipment is of the single-terminal type then no CI signal is transmitted.

Figure 26:
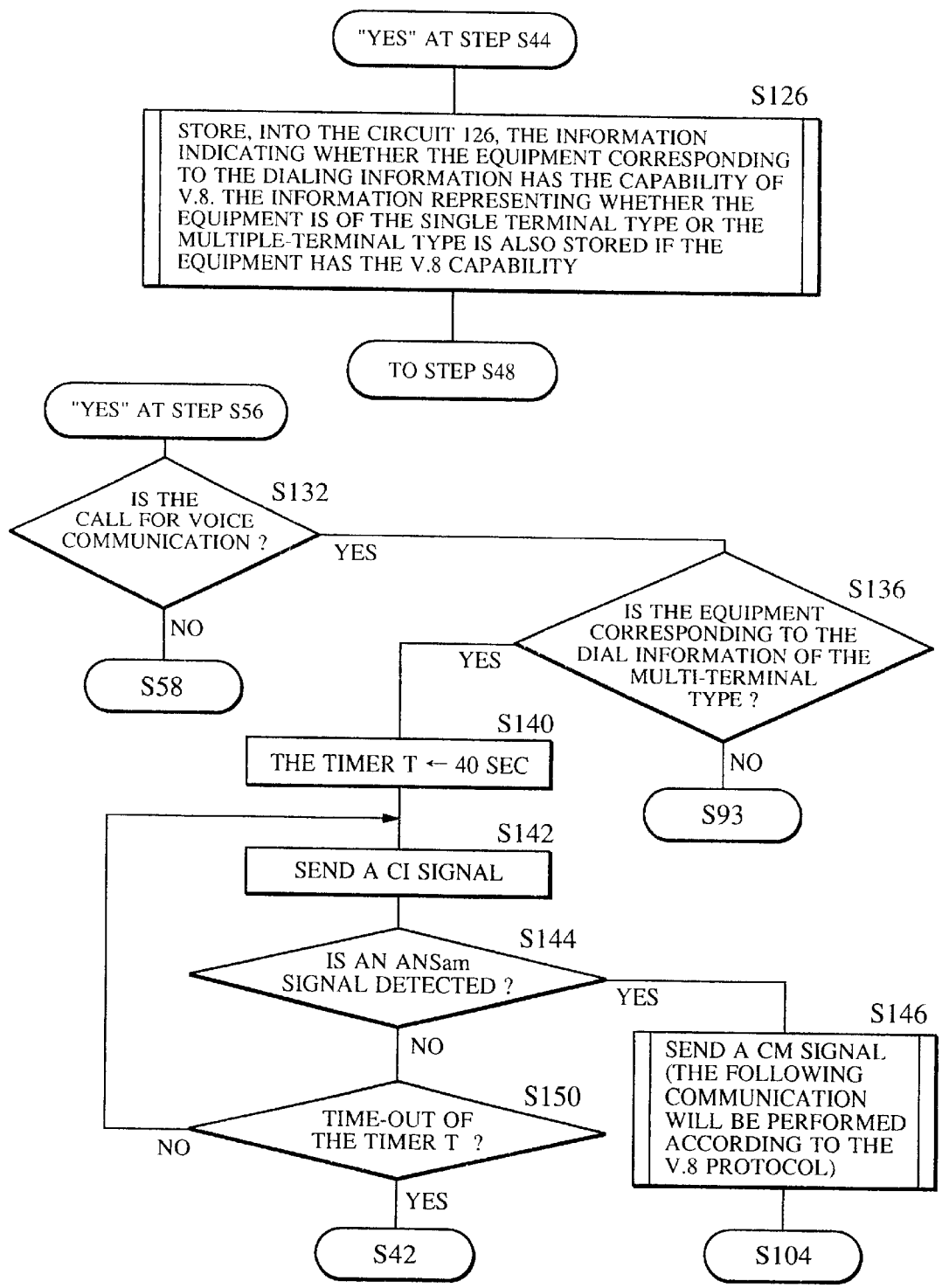
FIG. 26 is a flow chart illustrating an operation according to the fifth embodiment of the present invention.

FIG. 26 is a flow chart illustrating the modified part of the procedure.

Figure 21:
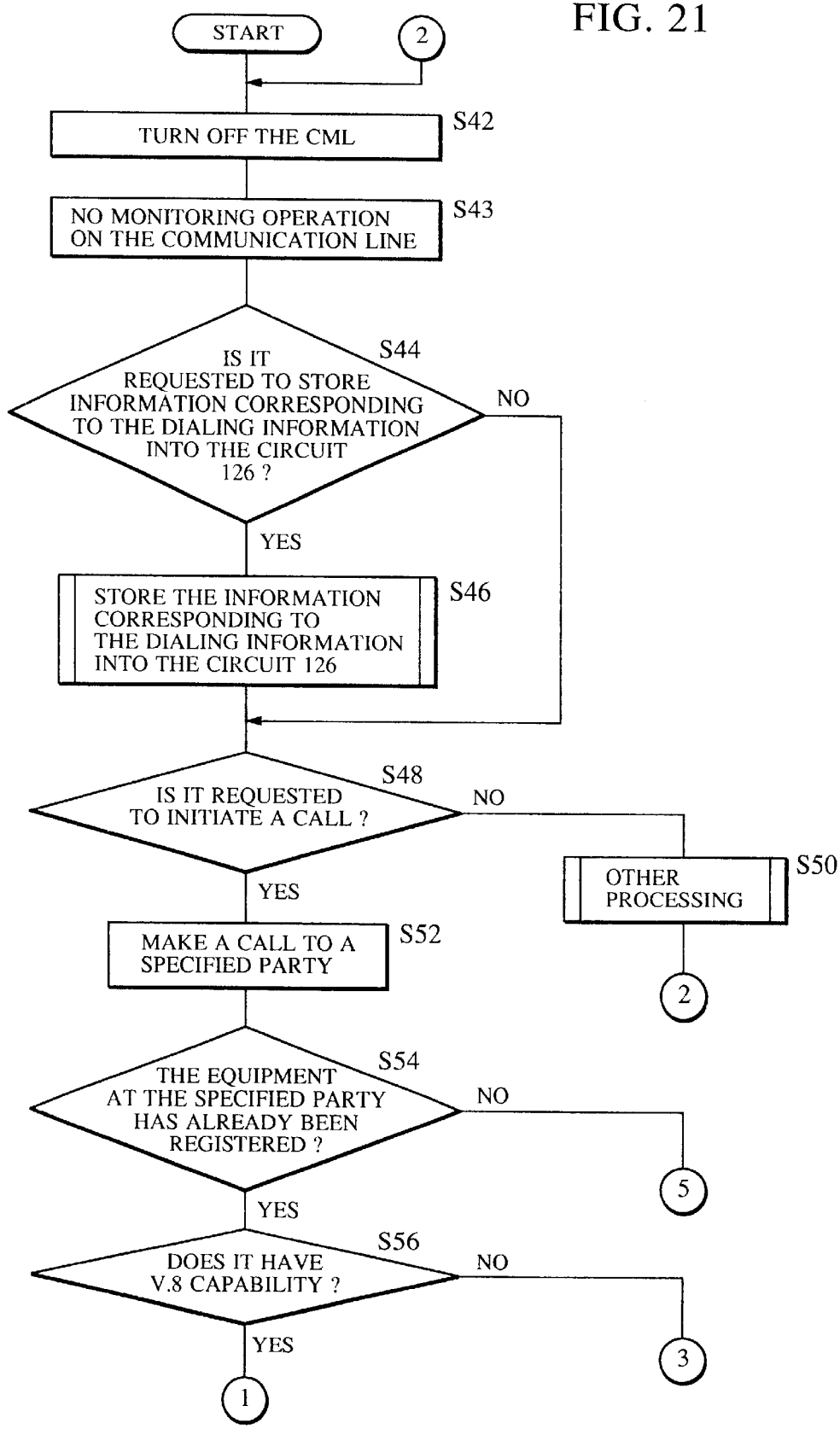
FIG. 21 is a flow chart illustrating an operation according to the fifth embodiment of the present invention.

In step S44 of FIG. 21, if the conclusion is yes, then the procedure goes to step S126 (FIG. 26). In step S126, information indicating whether the party corresponding to the current dialing information has the capability of V.8 or not is stored in the memory 126. In the case in which the party has the capability of V.8, information indicating whether the equipment of that party is of the single-terminal type or of the multi-terminal type is also stored. Then, the procedure goes to step S48 of FIG. 21.

In step S56 of FIG. 21, if the conclusion is yes, then the procedure goes to step S132 (FIG. 26). In step S132, the controller inputs information via the signal line 129a, and judges whether the call is for voice communication. If it turns out that the call is not for voice communication, then the procedure goes to step S58 of FIG. 22. If it is for voice communication then the procedure goes to step S136, and the information stored in the memory 126 is examined so as to judge whether the equipment of that party is of the single-terminal type or of the multi-terminal type. If the equipment is of the multi-terminal type, then the procedure goes to step S140, and a CI signal is transmitted. If the equipment is of the single-terminal type (only one telephone), then the procedure goes to step S93 of FIG. 24. In this case, no CI signal is transmitted. Because the CI signal is not transmitted in the case where called equipment is a conventional telephone, an operator at the called end never encounters uncomfortable signal tones.

In step S140 a timer time of 40 sec is set in the timer T, and then in step S142 a CI signal is transmitted. In step S144, it is judged whether an ANSam signal has been detected. If a ANSam signal has been detected, then the procedure goes to step S146 in which a CM signal is transmitted and the procedure defined by the V.8 is performed. Then, the procedure goes to step S104 of FIG. 24 in which voice communication is performed. In the case where a ANSam signal has not been detected, the procedure goes to step S150 in which it is judged whether the timer T has expired. If the timer has expired, then the process goes to step S42 of FIG. 21. If the timer has not expired, the procedure goes to step S142.

Figure 27:
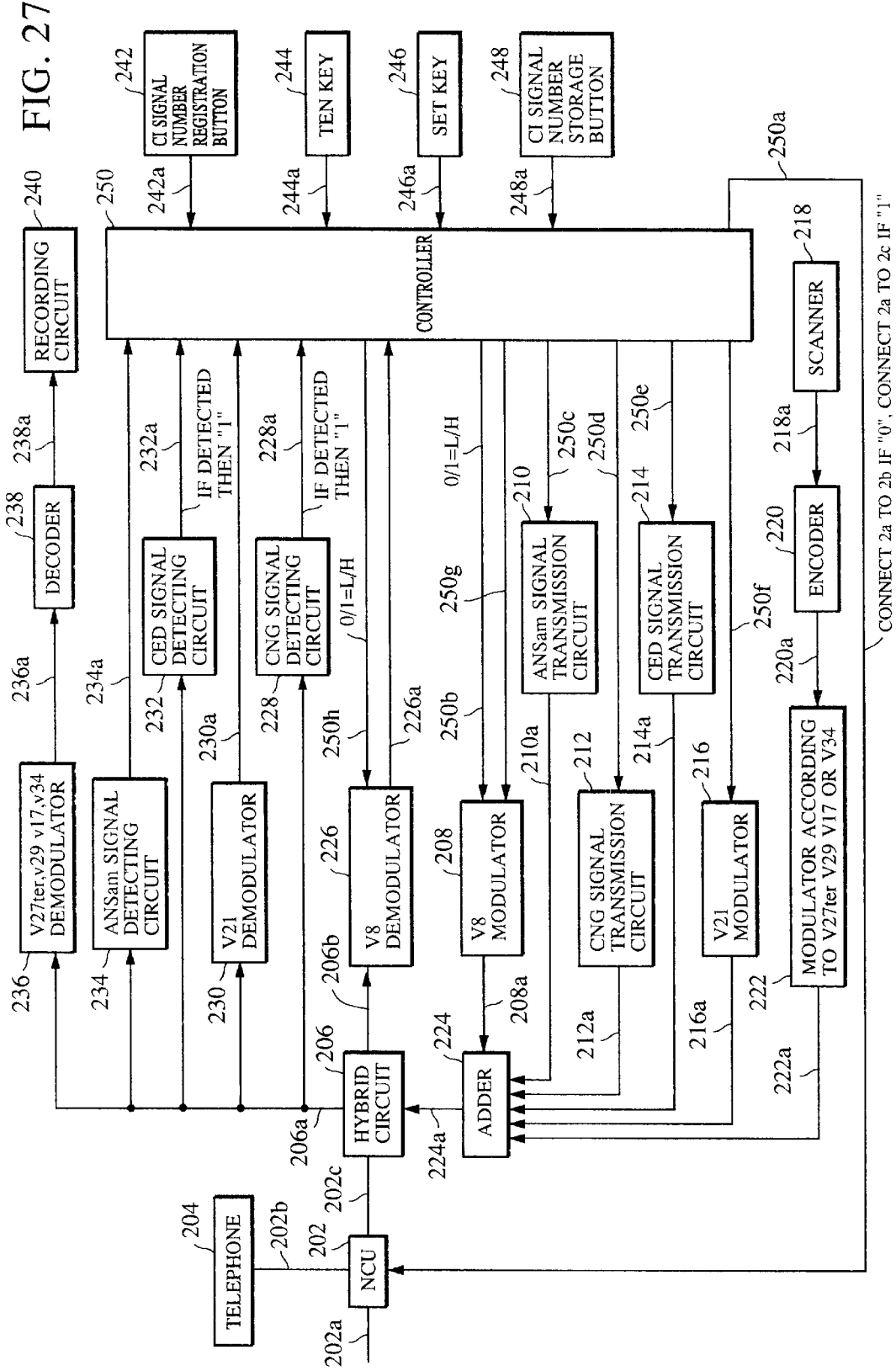
FIG. 27 is a block diagram illustrating the structure of a facsimile machine according to a sixth embodiment of the present invention.

In the fifth embodiment, as described above, a CI signal is transmitted in a more proper fashion depending on whether called equipment has the capability of V.8. More specifically, when a call i,s initiated from V.8-equipment to another V.8-equipment, the communication procedure can be performed quickly. If call ed equipment is a conventional G-3 terminal, then a CNG signal is transmitted directly without transmitting a CI signal. Thus, also in this case, a communication procedure is performed quickly without errors. Thus, the fifth embodiment provides a high-reliability system that can be easily used. Furthermore, it is possible to automatically judge whether a called terminal has the capability of V.8. The result of the judgement is automatically stored, and thus an user does not have to make a registration. In the fifth embodiment, a calling party can select either the procedure of V.8 or the procedure of T.30. On the other hand, when equipment having the V.8 capability is called, if the calling equipment also has the V.8 capability then the called equipment will receive a CI signal, and in the case where the calling equipment is a conventional G-3 facsimile machine (T.30) the called equipment will receive a CNG signal. In contrast, when a conventional G-3 facsimile machine having no capability of V.8 is called, if a CI signal is transmitted to such a machine at the beginning of the call then the called equipment will not be able to understand the received signal and thus there is a possibility that communication becomes impossible. In view of the above, in a sixth embodiment described below, calling equipment transmits a CI signal following a CNG signal so that called equipment can select the V.8 procedure if both CNG and CI signals are detected, and select the T.30 procedure if no CNG signal following a CI signal is detected. FIG. 27 is a block diagram illustrating the structure of a facsimile machine according to the sixth embodiment of the present invention.

In this figure, an NCU (network control unit) 202 is connected to a terminal of a line so as to achieve data communication via a telephone network. The NCU 202 performs various kinds of control regarding the connection via a telephone exchange network, switching to a data communication line, holding a loop, etc. If the NCU 102 receives a "0" level signal from a control circuit 250 (via a signal line 250a), the NCU connects a telephone line 202a to a telephone 204. On the other hand, if the NCU 102 receives a "1" level signal then the NCU connects the telephone line 202a to a facsimile machine. In a normal state, the telephone line 202a is connected to the telephone 204.

A hybrid circuit 206 isolates a transmission signal from a reception signal. A transmission signal supplied by an adder 224 is transferred onto the signal line 202a via the NCU 202. On the other hand, an incoming signal is received via the NCU 202 and transferred onto a signal line 206a.

A modulator 208 is a V.8-modulator that operates according to the V.8 protocol that is expected to be established as a recommended standards. The information is input into the modulator 208 via a signal line 250b. The modulator 208 modulates the input signal using the V.21-L channel if a signal line 250g is at a "0" level, and using the V.21-H channel if the signal line 250g is at a "1" level. The modulated data is output via the signal line 208a.

An ANSam signal transmission circuit 210 transmits a ANSam signal indicating that the calling equipment has the V.8 capability. The ANSam signal is a 2100-Hz signal modulated with a 15 Hz signal. When a signal line 250c is at a "1" level, the ANSam signal transmission circuit 2210 transmits a ANSam signal over a signal line 210a. If the signal line is at a "0" level, the ANSam signal transmission circuit 2210 does not transmit a ANSam signal to the signal line 210a.

When a signal line 250d is at a "1" level, a CNG signal transmission circuit 212 transmits a CNG signal over a signal line 212a. However, if the signal line 250d is at a "0" level, no CNG signal is transmitted over the signal line 212a.

When a signal line 250e is at a "1" level, a CED signal transmission circuit 214 transmits a CED signal over a signal line 214a. However, if the signal line 250e is at a "0" level, no CED signal is transmitted over the signal line 214a.

A modulator 216 performs modulation according to the conventional procedure ITU-T Recommendation V.21. A protocol signal supplied (via a signal line 250f) from the control circuit 250 is modulated by the modulator 216, and output over a signal line 216a.

A scanner 218 scans a document to be transmitted in the main scanning direction and thus reads an image signal line by line thereby generating a series of signals each consisting of a binary value representing black or white. The scanner includes an image sensing device such as a CCD (charge coupled device) and an optical system.

An encoder 220 receives the input data via a signal line 218a and performs coding (MH coding, MR coding, MMR coding) on the received data. The resultant coded data is output over a signal line 220a.

A modulator 222 operates according to a conventional procedure such as ITU-T Recommendation V.27ter (differential phase modulation), V.29 (quadrature modulation), V.17, V.34, etc. The modulator 222 modulates a signal received via the signal line 220a. The modulated signal is output onto a signal line 222a.

An adder 224 receives signals via the signal lines 208a, 210a, 212a, 214a, 216a, and 222a and outputs the sum of these signals onto the line 224a.

A demodulator 226 is a V.8-demodulator that operates according to the V.8 protocol that is expected to be established as a recommended standards. The information is input into the demodulator 226 via a signal line 206b. The demodulator 226 demodulates the input signal using the V.21-L channel if a signal line 250h is at a "0" level, and using the V.21-H channel if the signal line 250h is at a "1" level. The demodulated data is output via a signal line 226a.

A CNG signal detection circuit 228 inputs information via the signal line 206a. The CGN signal detection circuit 228 outputs a "1" level signal over a signal line 228a when a CNG signal is detected, and outputs a "0" level signal when no CNG signal is detected.

A demodulator 230 operates according to the conventional procedure ITU-T Recommendation V.21. The demodulator 230 receives an input signal via the signal line 206a and demodulates it according to, the V.21procedure. The demodulated data is output over a signal line 230a.

A CED signal detection circuit 232 inputs information via the signal line 206a. The CED signal detection circuit 232 outputs a "1" level signal over a signal line 232a when a CED signal is detected and outputs a "0" level signal when no CED signal is detected.

An ANSam signal detection circuit 234 detects a ANSam signal indicating that calling equipment has the V.8 capability. The ANSam signal detection circuit 234 inputs information via the signal line 206a. The ANSam signal detection circuit 234 outputs a "1" level signal over a signal line 234a when a ANSam signal is detected and outputs a "0" level signal when no ANSam signal is detected.

A demodulator 236 operates according to a conventional procedure such as ITU-T Recommendation V.27ter (differential phase modulation), V.29 (quadrature modulation), V.17, V.34, etc. The demodulator 236 receives an input signal via the signal line 206a and demodulates it. The demodulated data is output over a signal line 236a.

A decoder 238 receives data via the signal line 236a and performs decoding (MH decoding, MR decoding, MMR decoding) on the received data. The decoded data is output onto a signal line 238a.

A recording circuit such as printing circuit 240 receives data via the signal line 238a, and prints the data.

A CI signal number registration button 242 is used to register the number of CI signals that will be transmitted immediately after the transmission of a CNG signal. If this button is pressed, a pulse is generated on a signal line 242a.

A ten-key keyboard 244,is used to input a dialing number and other information. The information input via the ten-key keyboard is transferred onto a signal line 244a.

A set key 246 is used to set various input information. If this key is pressed, a pulse is generated on a signal line 246a.

A storage circuit 248 stores the number of CI signals that will be transmitted immediately after the transmission of a CNG signal. The information representing the number of CI signals is input to the storage circuit via a signal line 248a, wherein up to three different numbers can be stored.

The controller 250 is composed of a microcomputer and other components. In the sixth embodiment, calling equipment transmits n CI signals immediately after having transmitted a CNG signal. At predetermined time A, the calling equipment detects an ANSam signal, a NSF/CSI/DIS, or a signal (AI signal) indicating the capability of called equipment according to the V.8 procedure. If a AI signal or a ANSam signal is detected, the calling equipment transmits a CM signal, and then the procedure according to V.8 is performed. If a NSF/CSI/DIS signal is detected, an NSS/TSI/DCS signal is transmitted and the procedure according to T.30 is then performed. If no signal is detected during a predetermined time period, then a CNG signal is transmitted again and then n CI signals are transmitted following the CNG signal with no break (n designates the number of the CI signals stored in the storage circuit 48), wherein this signal transmission is performed repeatedly until the predetermined time B has expired.

At a receiving end, on the other hand, if a pure CNG signal is detected, the calling equipment is considered to be a conventional facsimile machine having the capability of only T.30, and thus a CED signal and a NSF/CSI/DIS signal are transmitted. Then, the procedure according to T.30 is performed. If a CI signal is detected following a CNG signal, then the calling equipment is considered to be a facsimile machine having the capability of V.8, and thus an ANSam signal is transmitted. Then, the procedure according to V.8 is performed. In this example, the number of CI signals that are transmitted after the CNG signal is assumed to be one or two. Therefore, if the called equipment detects one CI signal following the CNG signal, the called equipment concludes that a CI signal is detected.

Figure 28:
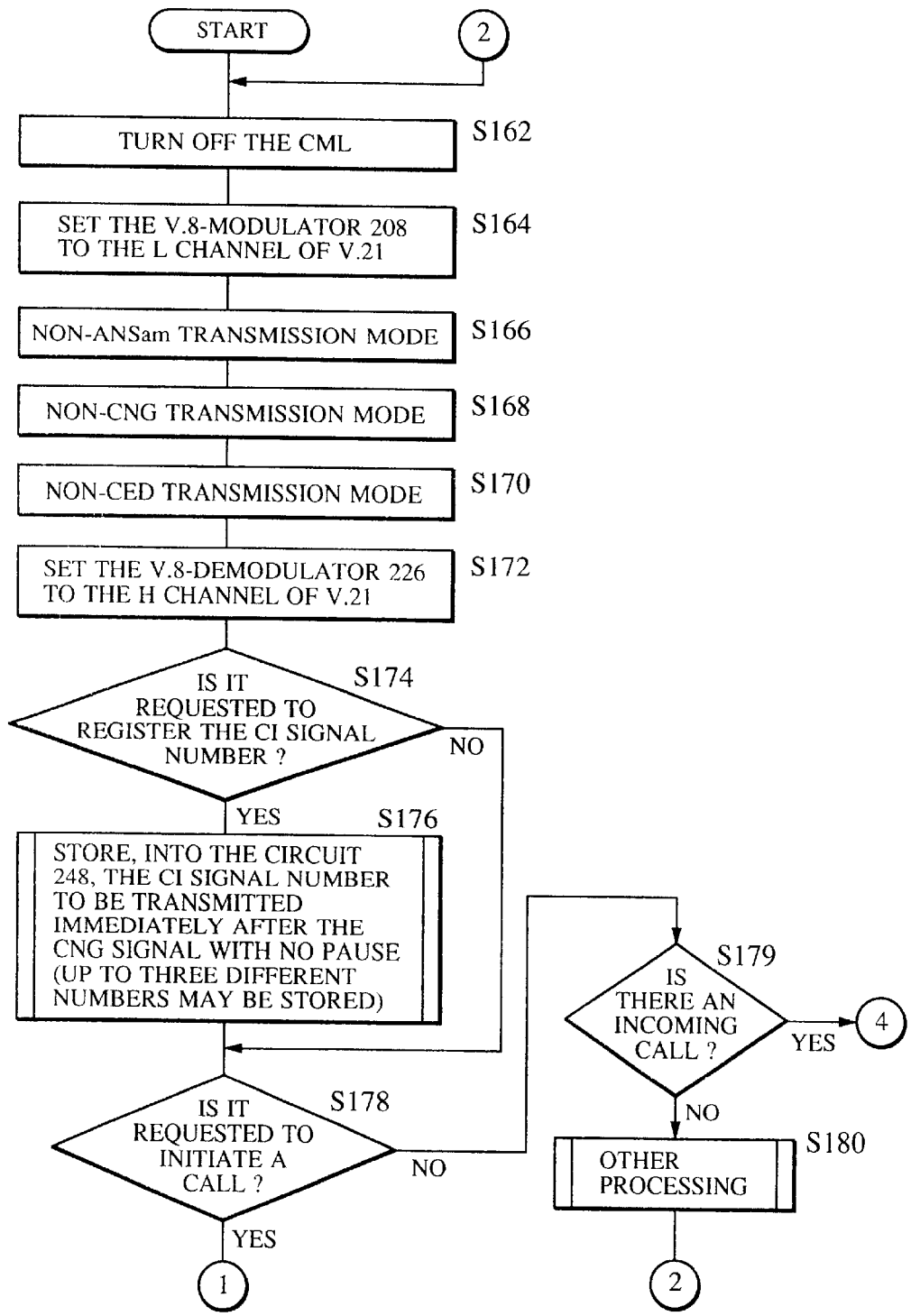
FIG. 28 is a flow chart illustrating an operation according to the sixth embodiment of the present invention.
Figure 29:
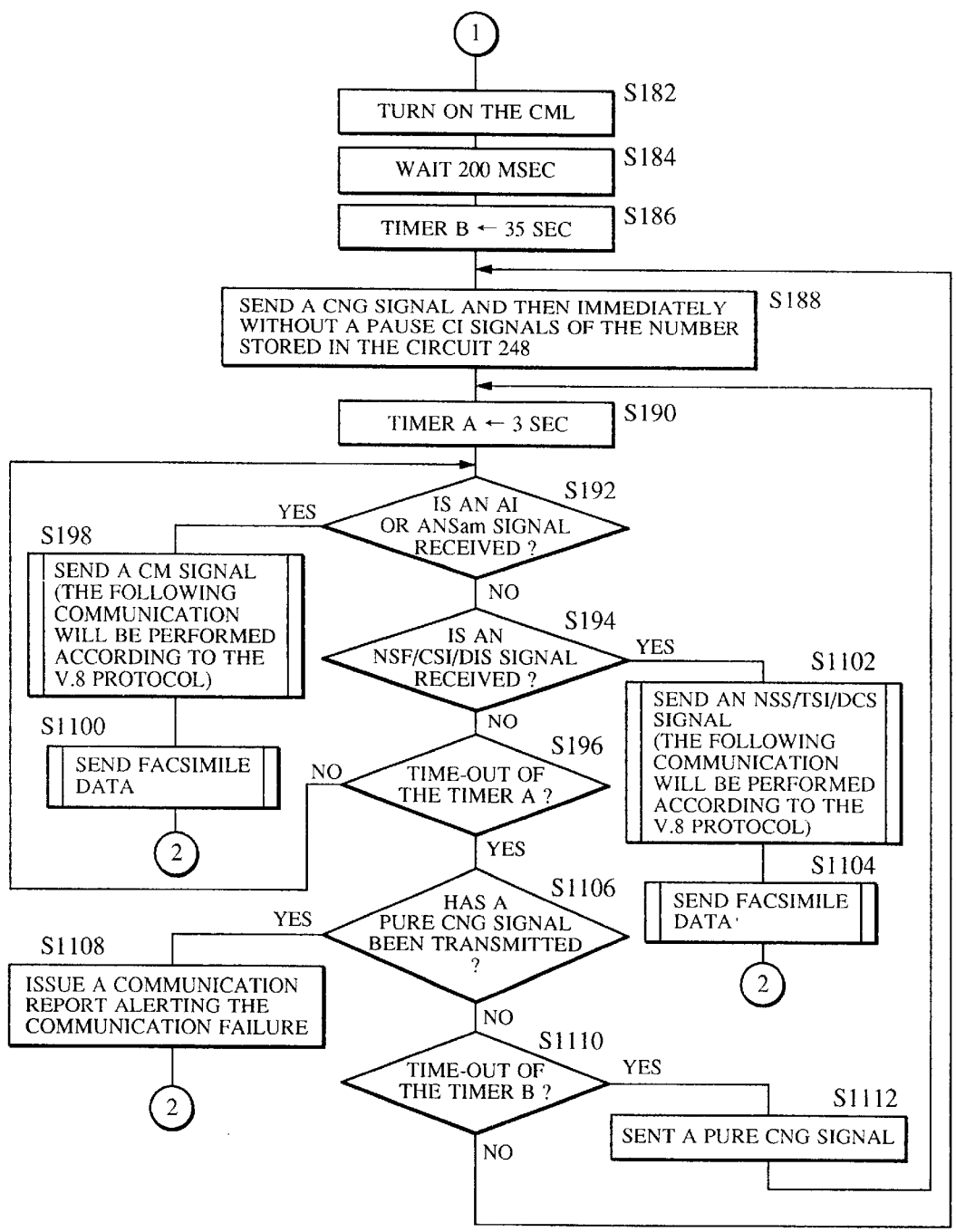
FIG. 29 is a flow chart illustrating an operation according to the sixth embodiment of the present invention.

FIGS. 28 and 29 are flow charts illustrating the operation of a facsimile machine at a calling end, according to the sixth embodiment of the invention.

In step S162, a "0" level signal is supplied on the signal line 250a thereby turning off the CML. In step S164, a "0" level signal is supplied on the signal line 250g so as to set the V.8 modulator 208 so that it performs modulation using the V.21-L channel.

In step S166, a "0" level signal is supplied on the signal line 250c so as to set the ANSam signal transmission circuit 210 so that it does not transmit a ANSam signal. In step S168, a "0" level signal is supplied on the signal line 250d so as to set the CNG signal transmission circuit 212 so that it does not transmit a CNG signal.

Furthermore, in step S170, a "0" level signal is supplied on the signal line 250e so as to set the CED signal transmission circuit 214 so that it does not transmit a CED signal. In step S172, a "1" level signal is supplied on the signal line 250h so as to set the V.8 demodulator 226 so that it performs demodulation using the V.21-H channel.

In step S174, it is judged whether a command is issued requesting to store the number of CI signals that will be transmitted immediately after the transmission of a CNG signal. If yes, then the procedure goes to step S176, in which the number of CI signals that will be transmitted immediately after the transmission of a CNG signal is stored in the storage circuit 248. If no, then the procedure goes to step S178.

In step S178, it is judged whether a request to start a call is issued. If yes, then the procedure goes to step S182, and if no the procedure goes to step S179 in which it is judged whether there is an incoming signal. If there is no incoming signal, then the procedure goes to step S180 so as to perform other processes. If it is concluded in step S179 that there is an incoming signal, then the procedure goes to step S1126 (FIG. 30) so as to perform required processing on the received signal. In step S182, a "1" level signal is supplied on the signal line 250a thereby turning on the CML. In step 184, the process waits 200 ms during which the equipment is connected to the line. Then, in step S186, a timer time of 35 sec is set in the timer B.

In step S188, a CNG signal is transmitted for 0.5 sec via the circuits 212 and 208. Then, with no break after the above CNG signal, the registered number of CI signals are transmitted wherein the number is registered in the storage circuit 248 (the registered number is for example 1 or 2). Then, in step S190, a timer time of 3 sec is set in the timer A.

In steps S192, S194, S196, it is judged whether an AI signal, ANSam signal, or NSF/CSI/DIS signal has been detected before the expiration of the timer A. If a AI signal or a ANSam signal has been detected, the procedure goes to step S198 in which an CM signal is transmitted via the circuit 208, and the procedure according to V.8 is performed. Then, facsimile data transmission is performed (S1100).

In the case where a NSF/CSI/DIS signal has been detected, the procedure goes to step S1102 in which an NSS/TSI/DCS signal is transmitted and the procedure according to T30 is performed. Then, facsimile data transmission is performed (S1104). In the case where the timer A has expired, the procedure goes to step S1106 in which it is judged whether a pure CNG signal (with no CI signal) has been transmitted. If yes, then the procedure goes to step S1108, in which a communication report is issued alerting that a failure has occurred in the communication. In the case where a pure CNG signal has not been transmitted, the procedure goes to step S1110.

In step S1110, it is judged whether the timer B has expired. If the timer has expired, the procedure goes to step S1112 in which a pure CNG signal is transmitted via the circuit 212. The transmission of a pure signal is performed so that the equipment can communicate with a facsimile machine that responds only to a pure signal.

If the timer B has not expired yet, then the procedure returns to step S88, and a CI signal is transmitted again. Then, the procedure is performed repeatedly.

Figure 30:
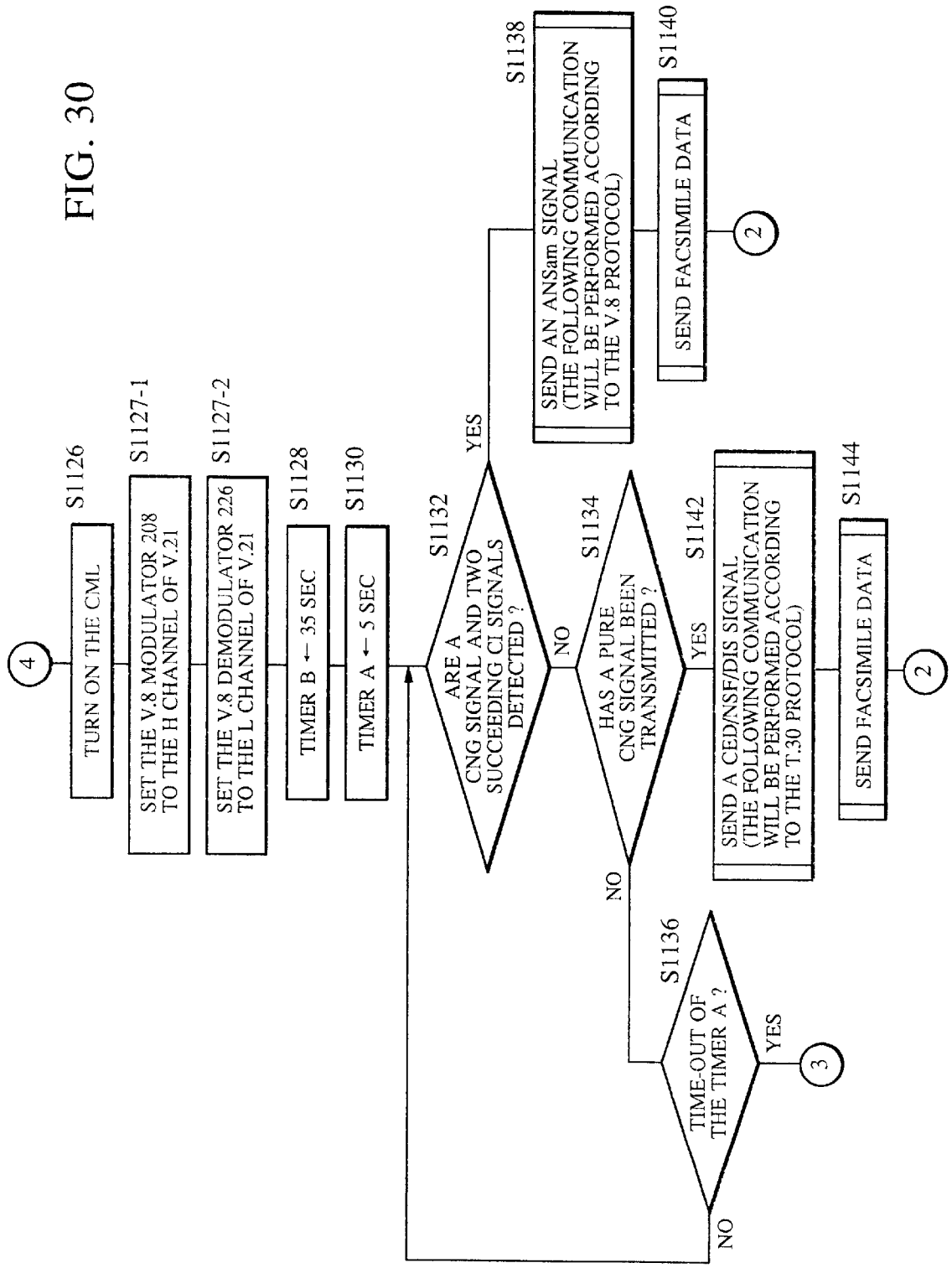
FIG. 30 is a flow chart illustrating an operation according to the sixth embodiment of the present invention.
Figure 31:
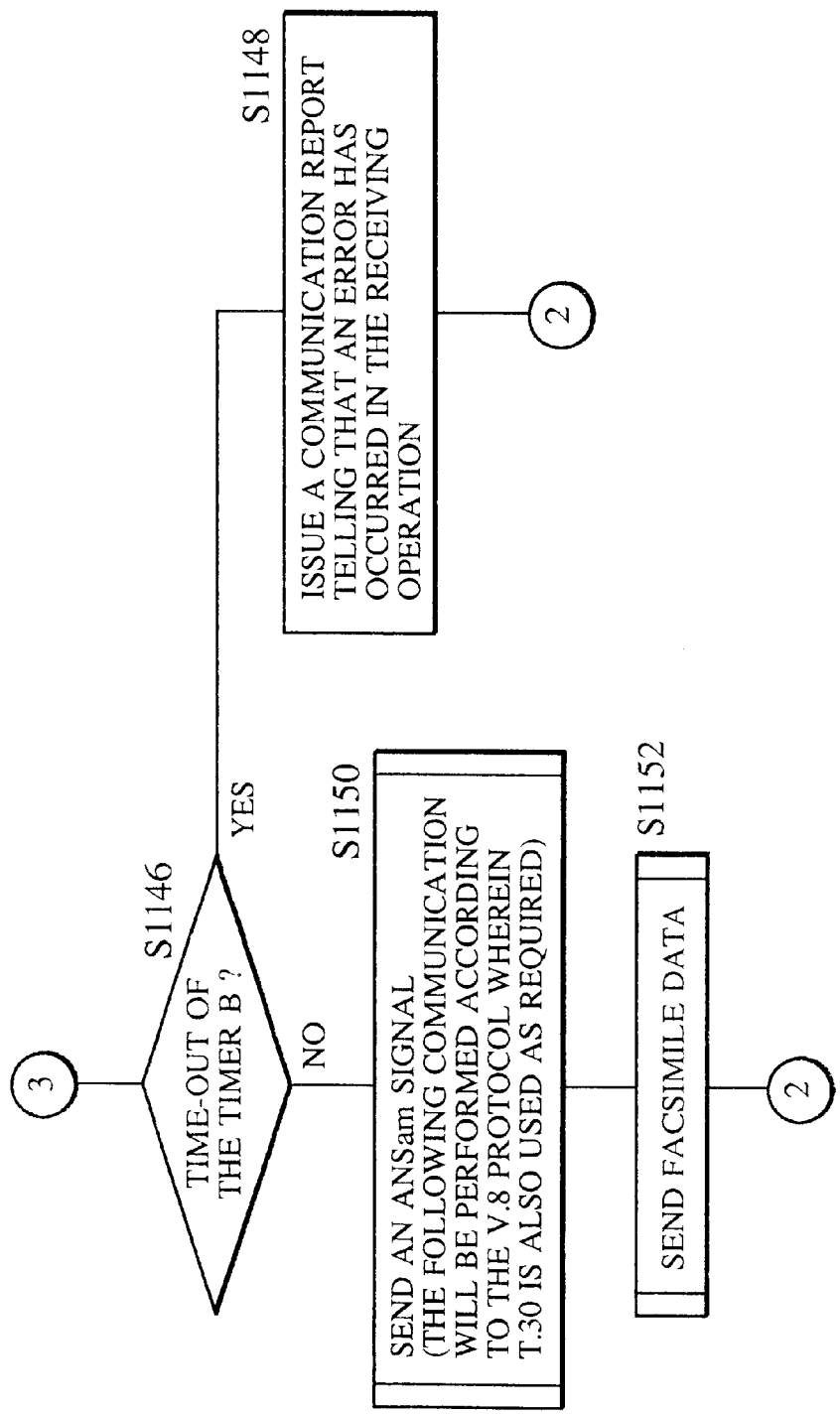
FIG. 31 is a flow chart illustrating an operation according to the sixth embodiment of the present invention.

FIGS. 30 and 31 are flow charts illustrating the operation of a facsimile machine at a receiving end, according to the sixth embodiment of the invention.

In FIG. 30, if there is an incoming call, the procedure goes to step S1126. If there is no incoming call, the procedure goes to step S1124 (step S180 of FIG. 28).

In step S1126, a "1" level signal is supplied on the signal line 250a thereby turning on the CML. In step S1127-1, a "1" level signal is supplied on the signal line 250g so as to set the V.8 modulator 208 so that it performs modulation using the V.21-H, channel. In step S1127-2, a "0" level signal is supplied on the signal line 250h so as to set the V.8 demodulator 226 so that it performs demodulation using the V.21-L channel.

In step S1128, a timer time of 35 sec is set in the timer B. In step S1130, a timer time of 5 sec is set in the timer A.

In steps S1132, S1134, S1136, information is input via the signal lines 226a and 228 and it is judged whether a pure CNG signal or at least one CI signal following a CNG signal has been detected before the expiration of the timer A. If a pure CNG signal has been detected, the procedure goes to step S1142 in which a CM signal and a NSF/CSI/DIS signal is transmitted via the circuits 214 and 216 and then the procedure according to T.30 is performed. Thus, facsimile data transmission is performed (S1144).

If at least one CI signal following a CNG signal is detected, the procedure goes to step S1138 in which an ANSam signal is transmitted via the circuit 210 and then the procedure according to V.8 is performed. Thus, facsimile data transmission is performed (S1140).

In the case where the timer A has expired, the procedure goes to step S1146 of FIG. 31 in which it is judged whether the timer B has expired. If yes, then the procedure goes to step S1148 in which a communication report is issued alerting that an error has occurred in the receiving operation. If the timer B has not expired, then the procedure goes to step S1150 in which an ANSam signal is transmitted. The following procedure is performed mainly according to V.8 while T.30 is also employed as required. Thus, facsimile data transmission is performed (S1152).

In the above procedure according to the sixth embodiment of the invention, in the case where equipment at a receiving end detects a pure CNG signal, only a NSF/CSI/DIS signal may be transmitted without transmitting a CED signal. More specifically, the step S1142 of FIG. 30 may be modified such that only a NSI/CSI/DIS signal is transmitted.

Furthermore, in the case where the number of CI signals that are transmitted immediately after a CNG signal is set to three, the judgement about the detection of the CNG signal may be made in such a manner that if a receiving facsimile machine has detected two CI signals following a CNG signal, then it is determined that the signal has been detected. More specifically, in step S176 of FIG. 28, three CI signal are transmitted, and in step S1132 of FIG. 30 it is judged whether two CI signals have been detected following a CNG signal. As described above, in the sixth embodiment of the invention, a calling facsimile machine can process both CNG and CI signals. Furthermore, a conventional facsimile machine at a receiving end that operates according to T.30 can correctly identify a CNG signal (because a CI signal following a CNG signal is transmitted only for a short time period). Thus, the facsimile machine at the receiving end can know instantly that a transmitting machine has the capability of V.8 in addition to T.30. That is, a machine at a calling end can instantly notify a machine at a receiving end that the calling machine has the capability of both V.8 and T.30. Thus, the total procedure is shortened.

A CNG signal is transmitted for 0.5 sec, and a CI signal is transmitted for 0.1 sec when one signal is transmitted and 0.2 sec for two signal, 0.3 sec for three signals. Thus, a conventional facsimile machine at a receiving end that operates according to T.30 can correctly recognize a CNG signal. Furthermore, when a facsimile machine having the capabilities of both V.8 and T.30 detects a CNG signal transmitted from a conventional T.30-machine, it is possible to quickly switch the procedure to T.30. When it detects both CNG and CI signals indicating the capabilities of both T.30 and V.8, it is possible to instantly switch the procedure to that according to the V.8. In any case, the required procedure is shortened. While the present invention has been described with reference to specific embodiments, the description is illustrative of the invention and is not to be construed as limiting the invention. Various modifications may occur to those skilled in the art without departing from the true spirit and scope of the invention as defined by the appended claims.

What is claimed is:

1. A communication apparatus with at least an answering machine mode and a facsimile mode that automatically selects from modems of different communication rates based on a capability of a partner apparatus, said communication apparatus comprising:

a connection unit adapted to connect to an answering machine, when in the answering machine mode, and a line, when in a facsimile mode;

a ringing signal detector circuit adapted to detect a ringing signal from the partner apparatus via the line;

a line closing circuit adapted to close the line in response to detection of the ringing signal;

a data communication unit adapted to communicate data by using a first ultra high speed modem or a G3 facsimile modem slower than the first ultra high speed modem;

an ultra high speed modem indication signal circuit, responsive to the closure of the line, adapted to generate a first indication signal for data communication by the first ultra high speed modem, and adapted to transmit the first indication signal to the partner apparatus via the line;

an ultra high speed modem capability signal detection circuit adapted to detect a first response signal to the transmitted first indication signal from the partner apparatus via the line before a predetermined time elapses from transmitting the first indication signal, the first response signal indicating a capability of a second ultra high speed modem of a data terminal at the partner apparatus at an opposite end of the line;

a generator circuit adapted to generate, in a case where any response signal to the first indication signal has not been detected before the predetermined time elapses, a G3 facsimile procedure signal for G3 facsimile communication by the G3 facsimile modem, and adapted to transmit the G3 facsimile procedure signal to the partner apparatus via the line;

a detector circuit adapted to detect a second response signal to the G3 facsimile procedure signal from the partner apparatus via the line; and a control circuit adapted to cause said data communication unit to perform data communication by using the first ultra high speed modem in accordance with the first response signal or by using the G3 facsimile modem in accordance with the second response signal, wherein said communication apparatus is adapted to perform data communication at a communication rate dependent on the capability of the partner apparatus.

2. A communication apparatus according to claim 1, wherein the first indication signal is for an exchanger connected to the line to select a high quality link as a communication link between said communication apparatus and the partner apparatus at the opposite end of the line.

3. A communication apparatus according to claim 1, wherein a function of the first ultra high speed modem is to operate at a modem rate of at least 28.8 kbps.

4. A communication apparatus according to claim 1, wherein a function of the G3 facsimile modem is to operate at a modem rate of at least 9600 bps.

5. A communication apparatus with at least an answering machine mode and a facsimile mode that automatically selects from modems of different communication rates based on a capability of a partner apparatus, said communication apparatus comprising:

a connection unit adapted to connect to an answering machine, when in the answering machine mode, and a line, when in the facsimile mode;

a manual instruction circuit adapted to generate an instruction to start data communication;

a data communication unit adapted to communicate data by using a first ultra high speed modem or a G3 facsimile modem slower than the first ultra high speed modem;

an ultra high speed modem indication signal generation circuit, responsive to the instruction by said manual instruction circuit, adapted to generate a first indication signal for data communication by the first ultra high speed modem, and adapted to transmit the first indication signal to the partner apparatus via the line;

an ultra high speed modem capability signal detection circuit adapted to detect a first response signal to the transmitted first indication signal from the partner apparatus via the line before a predetermined time elapses from transmitting the first indication signal, the first response signal indicating a capability of a second ultra high speed modem of a data terminal at the partner apparatus at an opposite end of the line;

a generator circuit adapted to generate, in a case where any response signal to the first indication signal has not been detected before the predetermined time elapses, a G3 facsimile procedure signal for G3 facsimile communication by the G3 facsimile modem, and adapted to transmit the G3 facsimile procedure signal to the partner apparatus via the line;

a detector circuit adapted to detect a second response signal to the G3 facsimile procedure signal from the partner apparatus via the line; and a control circuit adapted to cause said data communication unit to perform data communication by using the first ultra high speed modem in accordance with the first response signal or by using the G3 facsimile modem in accordance with the second response signal, wherein said communication apparatus is adapted to perform data communication at a communication rate dependent on the capability of the partner apparatus.

6. A communication apparatus according to claim 5, wherein the first indication signal is for an exchanger connected to the line to select a high quality link as a communication link between said communication apparatus and the partner apparatus at the opposite end of the line.

7. A communication apparatus according to claim 5, wherein a function of the first ultra high speed modem is to operate at a modem rate of at least 28.8 kbps.

8. A communication apparatus according to claim 5, wherein a function of the G3 facsimile modem is to operate at a modem rate of at least 9600 bps.

9. A communication apparatus according to claim 5, further comprising:

a ringing signal detection circuit adapted to detect a ringing signal from the line; and a line closing circuit adapted to close the line in response to detection of the ringing signal, wherein said ultra high speed modem indication signal generation circuit generates the first indication signal in response to closure of the line when said communication apparatus has been set in an automatic reception mode, and generates the first indication signal in response to the instruction when said communication apparatus has been set in a manual reception mode.

10. A data communication method of a communication apparatus with at least an answering machine mode and a facsimile mode that automatically selects from modems of different communication rates based on a capability of a partner apparatus, said method comprising the steps of:

connecting to an answering machine when in the answering machine mode; and connecting to a line when in the facsimile mode, wherein, when in the facsimile mode, said method further comprises the steps, at one end of the line, of;

detecting a ringing signal from the partner apparatus via the line;

closing the line in response to detection of the ringing signal;

generating a first indication signal for data communication by a first ultra high speed modem in response to closure of the line, and transmitting the first indication signal to the partner apparatus via the line;

detecting a first response signal to the transmitted first indication signal from the partner apparatus via the line before a predetermined time elapses from transmitting the first indication signal, the first response signal indicating a capability of a second ultra high speed modem of a data terminal at the partner apparatus at an opposite end of the line;

generating, in a case where any response signal to the first indication signal has not been detected before the predetermined time elapses, a G3 facsimile procedure signal for G3 facsimile communication by a G3 facsimile modem, and transmitting the G3 facsimile procedure signal to the partner apparatus via the line;

detecting a second response signal to the G3 facsimile procedure signal from the partner apparatus via the line; and performing data communication by using the first ultra high speed modem in accordance with the first response signal or G3 facsimile communication by using the G3 facsimile modem in accordance with the second response signal, and wherein the communication apparatus performs data communication at a communication rate dependent on the capability of the partner apparatus.

11. A data communication method according to claim 10, wherein the first indication signal is for an exchanger connected to the line to select a high quality link as a communication link between the communication apparatus at the one end of the line and the partner apparatus at the opposite end of the line.

12. A data communication method according to claim 10, wherein a function of the first ultra high speed modem is to operate at a modem rate of at least 28.8 kbps.

13. A data communication method according to claim 10, wherein a function of the G3 facsimile modem is to operate at a modem rate of at least 9600 bps.

14. A data communication method of a communication apparatus with at least an answering machine mode and a facsimile mode that automatically selects from modems of different communication rates based on a capability of a partner apparatus, said method comprising the steps of:

connecting to an answering machine when in the answering machine mode; and connecting to a line when in the facsimile mode, wherein, when in the facsimile mode, said method further comprises the steps, at one end of the line, of:

generating an instruction to start data communication in response to a manual operation;

generating a first indication signal for data communication by a first ultra high speed modem in response to the manual instruction, and transmitting the first indication signal to the partner apparatus via the line;

detecting a first response signal to the transmitted first indication signal from the partner apparatus via the line before a predetermined time elapses from transmitting the first indication signal, the first response signal indicating a capability of a second ultra high speed modem of a data terminal at the partner apparatus at an opposite end of the line;

generating, in a case where any response signal to the first indication signal has not been detected before the predetermined time elapses, a G3 facsimile procedure signal for G3 facsimile communication by a G3 facsimile modem, and transmitting the G3 facsimile procedure signal to the partner apparatus via the line;

detecting a second response signal to the G3 facsimile procedure signal from the partner apparatus via the line; and performing data communication by using the first ultra high speed modem in accordance with the first response signal or by using the G3 facsimile modem in accordance with the second response signal, and wherein the communication apparatus performs data communication at a communication rate dependent on the capability of the partner apparatus.

15. A data communication method according to claim 14, wherein the first indication signal is for an exchanger connected to the line to select a high quality link as a communication link between the communication apparatus at the one end of the line and the partner apparatus at the opposite end of the line.

16. A data communication method according to claim 14, wherein a function of the first ultra high speed modem is to operate at a modem rate of at least 28.8 kbps.

17. A data communication method according to claim 14, wherein a function of the G3 facsimile modem is to operate at a modem rate of at least 9600 bps.

18. A data communication method according to claim 14, said method, when in the facsimile mode, further comprising the steps of:

detecting a ringing signal from the line; and closing the line in response to detection of the ringing signal, wherein said ultra high speed modem indication signal generation step generates the first indication signal in response to closure of the line in an automatic reception mode, and generates the first indication signal in response to the instruction in a manual reception mode.

19. A communication apparatus with at least an answering machine mode and a facsimile mode, said communication apparatus adapted to communicate with a partner apparatus at an opposite end of a line using a first protocol according to a T.30 recommendation and a second protocol, said communication apparatus automatically selecting from modems of different communication rates based on a capability of the partner apparatus, said communication apparatus comprising:

a connection unit adapted to connect to an answering machine, when in the answering machine mode, and the line, when in the facsimile mode;

a first detection circuit adapted to detect a signal associated with the second protocol from the partner apparatus via the line;

a second circuit adapted to detect a signal associated with the first protocol from the partner apparatus via the line;

an execution circuit adapted to select one of the first protocol and the second protocol in accordance with detection results provided by said first and second detection circuits, and adapted to execute data communication in accordance with the selected protocol; and a transmitter circuit adapted to transmit a signal that includes information regarding the second protocol to the partner apparatus, wherein, if said first detection circuit does not detect any signal from the partner apparatus within a predetermined time after transmission of the signal that includes information regarding the second protocol, said execution circuit selects the first protocol, and wherein said communication apparatus is adapted to perform data communication at a communication rate dependent on the capability of the partner apparatus.

20. A communication apparatus according to claim 19, wherein said first detection circuit detects a tone signal from the partner apparatus indicating the second protocol.

21. A communication apparatus according to claim 19, wherein said second detection circuit detects a CED signal from the partner apparatus.

22. A communication apparatus according to claim 19, wherein said second detection circuit detects a DIS signal from the partner apparatus.

23. A communication apparatus according to claim 19, wherein said first detection circuit detects a protocol signal from the partner apparatus indicating the second protocol.

24. A communication apparatus according to claim 19, wherein said second detection circuit detects a CNG signal from the partner apparatus.

25. A communication apparatus according to claim 19, further comprising a transmitter circuit adapted to transmit a signal that includes information regarding the second protocol to the partner apparatus, wherein, if said first detection circuit detects a signal associated with the second protocol from the partner apparatus in a predetermined time after transmission of the signal that includes information regarding the second protocol, said execution circuit selects the second protocol.

26. A communication apparatus according to claim 25, wherein said transmission circuit transmits a protocol signal indicating the second protocol to the partner apparatus.

27. A communication apparatus according to claim 25, wherein said transmission circuit transmits a protocol signal indicating the second protocol to the partner apparatus following a CNG signal.

28. A communication apparatus according to claim 19, wherein the first protocol is according to the T.30 recommendation and specifies a type of modem to be used in a communication between said communication apparatus and the partner apparatus at the opposite end of the line.

29. A communication method of a communication apparatus with at least an answering machine mode and a facsimile mode, the apparatus being adapted to communicate with a partner apparatus at an opposite end of a line using a first protocol according to a T.30 recommendation and a second protocol, the communication apparatus automatically selecting from modems of different communication rates based on a capability of the partner apparatus, said method comprising:

connecting to an answering machine, when in the answering machine mode; and connecting to the line, when in the facsimile mode, wherein, when in the facsimile mode, said method further comprises:

a first detecting step of detecting a first signal associated with the second protocol from the partner apparatus via the line;

a second detecting step of detecting a second signal associated with the first protocol from the partner apparatus via the line;

a selecting step of selecting one of the first protocol and the second protocol in accordance with detection results of said first and second detecting steps;

an executing step of executing data communication in accordance with the selected protocol; and a transmitting step of transmitting a signal that includes information regarding the second protocol to the partner apparatus, and wherein, if said first detecting step does not detect any signal from the partner apparatus within a predetermined time after transmission of the signal that includes information regarding the second protocol, said selecting step selects the first protocol, and wherein the communication apparatus performs data communication at a communication rate dependent on the capability of the partner apparatus.

30. A communication method according to claim 29, wherein the first signal is a tone signal indicating the second protocol.

31. A communication method according to claim 29, wherein the second signal is a CED signal.

32. A communication method according to claim 29, wherein the second signal is a DIS signal.

33. A communication method apparatus according to claim 29, wherein the first signal is a protocol signal indicating the second protocol.

34. A communication method according to claim 29, wherein the second signal is a CNG signal.

35. A communication method according to claim 29, said method, when in the facsimile mode, further comprising a transmission step of transmitting a signal that includes information regarding the second protocol to the partner apparatus, wherein, if the first signal is detected within a predetermined time after transmission of the signal that includes information regarding the second protocol, said selecting step selects the second protocol.

36. A communication method according to claim 35, wherein said transmission step transmits a protocol signal indicating the second protocol to the partner apparatus.

37. A communication method according to claim 35, wherein said transmission step transmits to the partner apparatus a protocol signal indicating the second protocol following a CNG signal.

38. A communication method according to claim 29, wherein the first protocol is according to the T.30 recommendation and specifies a type of modem to be used in a communication between the communication apparatus and the partner apparatus at the opposite end of the line.

* * * * *

UNITED STATES PATENT AND TRADEMARK OFFICE
CERTIFICATE OF CORRECTION

PATENT NO. : 6,463,132 B1
DATED : October 8, 2002
INVENTOR(S) : Takehiro Yoshida et al.

It is certified that error appears in the above-identified patent and that said Letters Patent is hereby corrected as shown below:

Column 1,
Line 56, "operate" should read -- operator --.

Column 2,
Line 19, "that;" should read -- that --.

Column 5,
Line 24, "judges-whether" should read -- judges whether --.

Column 6,
Line 55, ": and" should read -- and --.
Line 58, "the;calling" should read -- the calling --.

Column 7,
Line 38, "switch." should read -- switch --.

Column 8,
Line 48, "is-monitored" should read -- is monitored --.

Column 9,
Line 55, "a" should read -- an --.

Column 14,
Line 10, "procedure,leven" should read -- procedure, even --.
Line 36, "in-the" should read -- in the --.

Column 15,
Line 27, "cannot not" should read -- cannot --.

Column 16,
Line 2, "telephone,is" should read -- telephone is --.

Column 17,
Line 20, "B" should read -- B. --.
Line 32, "monitor,ed" should read -- monitored --.
Line 35, "be en" should read -- been --.

UNITED STATES PATENT AND TRADEMARK OFFICE
CERTIFICATE OF CORRECTION

PATENT NO. : 6,463,132 B1
DATED : October 8, 2002
INVENTOR(S) : Takehiro Yoshida et al.

It is certified that error appears in the above-identified patent and that said Letters Patent is hereby corrected as shown below:

Column 18,
Line 35, "is;received" should read -- is received --.
Line 65, "has-arrived" should read -- has arrived --.

Column 19,
Line 5, "third-embodiment," should read -- third embodiment, --.

Column 21,
Line 54, "in;" should read -- in --; and "are" should read -- being --.

Column 26,
Line 52, "AN am" should read -- ANSam --.

Column 27,
Line 55, "call ed" should read -- called --.
Line 63, "an" should read -- a --.

Column 29,
Line 20, "standards." should read -- standard. --.

Column 32,
Line 51, "signal," should read -- signals, --.

Signed and Sealed this

Thirteenth Day of May, 2003

JAMES E. ROGAN
*Director of the United States Patent and Trademark Office*